United States Patent
Snider et al.

(10) Patent No.: US 11,425,798 B2
(45) Date of Patent: Aug. 23, 2022

(54) REAR SLIDER WINDOW ASSEMBLY

(71) Applicant: MAGNA MIRRORS OF AMERICA, INC., Holland, MI (US)

(72) Inventors: Darin J. Snider, Holland, MI (US); Michael J. Hulst, Holland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

(21) Appl. No.: 16/949,814

(22) Filed: Nov. 16, 2020

(65) Prior Publication Data

US 2021/0068207 A1    Mar. 4, 2021

Related U.S. Application Data

(60) Continuation of application No. 16/283,924, filed on Feb. 25, 2019, now Pat. No. 10,841,983, which is a
(Continued)

(51) Int. Cl.
*E06B 1/00* (2006.01)
*H05B 3/84* (2006.01)
(Continued)

(52) U.S. Cl.
CPC ............... *H05B 3/84* (2013.01); *B60J 1/002* (2013.01); *B60J 1/007* (2013.01); *B60J 1/1853* (2013.01);
(Continued)

(58) Field of Classification Search
CPC .................... H05B 3/84; H05B 1/0227; H05B 2203/016; E05B 83/00; E05C 1/08; E05C 9/042;
(Continued)

(56) References Cited

U.S. PATENT DOCUMENTS 957,728 A    5/1910  Bliss
1,204,702 A  11/1916 Schupp
(Continued)

FOREIGN PATENT DOCUMENTS

GB    2170251 A    7/1986
GB    2209787 A    5/1989
(Continued)

OTHER PUBLICATIONS

International Search Report and Written Opinion dated Feb. 16, 2012 from corresponding PCT Application No. PCT/US2011/051506 filed Sep. 14, 2011.

*Primary Examiner* — Jerry E Redman
(74) *Attorney, Agent, or Firm* — Honigman LLP

(57) ABSTRACT

A vehicular rear slider window assembly includes a movable window panel that is movable along upper and lower rails of a fixed window panel. A first heater grid is disposed at a first fixed panel, a second heater grid is disposed at a second fixed panel, and a third heater grid disposed at the movable window panel. A jumper electrical connector electrically connects between the first and second fixed panels, and a flexible electrical connector electrically connects between the first or second fixed panel and the movable window panel. The first fixed panel has positive and negative terminals configured to electrically connect to at least one electrical connector of a vehicle wire harness when the vehicular rear slider window assembly is installed at a vehicle. When the positive and negative terminals are electrically powered, electrical current may flow in a single direction across the first and second heater grids.

23 Claims, 73 Drawing Sheets

Related U.S. Application Data division of application No. 15/583,115, filed on May 1, 2017, now Pat. No. 10,219,324, which is a continuation of application No. 14/997,829, filed on Jan. 18, 2016, now Pat. No. 9,642,187, which is a continuation of application No. 14/528,574, filed on Oct. 30, 2014, now Pat. No. 9,242,533, which is a division of application No. 13/823,963, filed as application No. PCT/US2011/051506 on Sep. 14, 2011, now Pat. No. 8,881,458, and a continuation-in-part of application No. 12/850,864, filed on Aug. 5, 2010, now Pat. No. 8,402,695.

(60) Provisional application No. 61/524,977, filed on Aug. 18, 2011, provisional application No. 61/488,946, filed on May 23, 2011, provisional application No. 61/483,546, filed on May 6, 2011, provisional application No. 61/434,555, filed on Jan. 20, 2011, provisional application No. 61/383,055, filed on Sep. 15, 2010, provisional application No. 61/347,920, filed on May 25, 2010, provisional application No. 61/296,174, filed on Jan. 19, 2010, provisional application No. 61/231,854, filed on Aug. 6, 2009.

(51) Int. Cl.

| | | |
|---|---|---|
| *B60J 1/18* | (2006.01) | |
| *E05B 83/00* | (2014.01) | |
| *E05C 1/08* | (2006.01) | |
| *E06B 3/46* | (2006.01) | |
| *B60J 1/00* | (2006.01) | |
| *H05B 1/02* | (2006.01) | |
| *E05C 9/04* | (2006.01) | |
| *E05D 15/06* | (2006.01) | |

(52) U.S. Cl.
CPC ............... *E05B 83/00* (2013.01); *E05C 1/08* (2013.01); *E05C 9/042* (2013.01); *E05D 15/0608* (2013.01); *E06B 3/4618* (2013.01); *H05B 1/0227* (2013.01); *E05Y 2900/55* (2013.01); *H05B 2203/016* (2013.01)

(58) Field of Classification Search
CPC ............... E05D 15/0608; E06B 3/4618; E05Y 2900/55
USPC .................................................... 49/380, 413
See application file for complete search history.

(56) References Cited

U.S. PATENT DOCUMENTS

| | | |
|---|---|---|
| 2,762,675 A | 9/1956 | Janows |
| 2,858,408 A | 10/1958 | Barroero |
| 2,912,714 A | 11/1959 | Rich |
| 2,962,773 A | 12/1960 | Heller |
| 3,177,989 A | 4/1965 | Di Chiaro |
| 3,237,250 A | 3/1966 | Scoville |
| 3,379,859 A | 4/1968 | Marriott |
| 3,508,361 A | 4/1970 | Ryder |
| 3,715,707 A | 2/1973 | Anderson |
| 3,893,260 A | 7/1975 | Cadiou |
| 3,898,427 A | 8/1975 | Levin et al. |
| 3,911,245 A | 10/1975 | O'Shaughnessy |
| 3,964,068 A | 6/1976 | Torii et al. |
| 3,995,142 A | 11/1976 | Ciardelli et al. |
| 4,023,008 A | 5/1977 | Durussel |
| 4,065,848 A | 1/1978 | Dery |
| 4,081,926 A | 4/1978 | Jardin |
| 4,124,054 A | 11/1978 | Spretnjak |
| 4,137,447 A | 1/1979 | Boaz |
| 4,158,270 A | 6/1979 | Cherbourg et al. |
| 4,171,594 A | 10/1979 | Colanzi |
| 4,244,774 A | 1/1981 | Dery |
| RE30,663 E | 6/1981 | Schnitzius |
| 4,388,522 A * | 6/1983 | Boaz ................. H05B 3/84 219/203 |
| 4,410,843 A | 10/1983 | Sauer et al. |
| 4,415,196 A | 11/1983 | Baum et al. |
| 4,450,346 A | 5/1984 | Boaz |
| 4,458,445 A | 7/1984 | Sauer et al. |
| 4,519,443 A | 5/1985 | Sutoh et al. |
| 4,552,611 A | 11/1985 | Dery et al. |
| 4,606,159 A | 8/1986 | Kunert |
| 4,611,849 A | 9/1986 | Frenkler |
| 4,635,398 A | 1/1987 | Nakamura |
| 4,674,231 A | 6/1987 | Radek et al. |
| 4,723,809 A | 2/1988 | Kida et al. |
| 4,738,052 A | 4/1988 | Yoshida |
| 4,785,583 A | 11/1988 | Kawagoe et al. |
| 4,883,940 A | 11/1989 | Fokarz |
| 4,920,698 A | 5/1990 | Friese et al. |
| 4,934,098 A | 6/1990 | Prouteau et al. |
| 4,970,911 A | 11/1990 | Ujihara et al. |
| 4,995,195 A | 2/1991 | Olberding et al. |
| 5,046,283 A | 9/1991 | Compeau et al. |
| 5,146,712 A | 9/1992 | Hlavaty |
| 5,228,740 A | 7/1993 | Saltzman |
| 5,245,788 A | 9/1993 | Riegelman |
| 5,294,168 A | 3/1994 | Kronbetter |
| 5,308,247 A | 5/1994 | Dyrdek |
| 5,333,411 A | 8/1994 | Tschirschwitz et al. |
| 5,345,717 A | 9/1994 | Mori et al. |
| 5,363,596 A | 11/1994 | Kronbetter |
| 5,367,827 A | 11/1994 | Tajima et al. |
| 5,442,880 A | 8/1995 | Gipson |
| 5,466,911 A | 11/1995 | Spagnoli et al. |
| 5,467,560 A | 11/1995 | Camp et al. |
| 5,473,840 A | 12/1995 | Gillen et al. |
| 5,505,023 A | 4/1996 | Gillen et al. |
| 5,522,191 A | 6/1996 | Wenner et al. |
| 5,525,401 A | 6/1996 | Hirmer |
| 5,531,046 A | 7/1996 | Kollar et al. |
| 5,542,214 A | 8/1996 | Buening |
| 5,572,376 A | 11/1996 | Pace |
| 5,613,323 A | 3/1997 | Buening |
| 5,617,675 A | 4/1997 | Kobrehel |
| 5,711,112 A | 1/1998 | Barten et al. |
| 5,716,536 A | 2/1998 | Yokoto et al. |
| 5,724,769 A | 3/1998 | Cripe et al. |
| 5,724,771 A | 3/1998 | Gipson |
| 5,784,833 A | 7/1998 | Sponable et al. |
| 5,799,444 A | 9/1998 | Freimark et al. |
| 5,799,449 A | 9/1998 | Lyons et al. |
| 5,822,922 A | 10/1998 | Grumm et al. |
| 5,836,110 A | 11/1998 | Buening |
| 5,853,895 A | 12/1998 | Lewno |
| 5,890,321 A | 4/1999 | Staser et al. |
| 5,953,887 A | 9/1999 | Lucas et al. |
| 5,996,284 A | 12/1999 | Freimark et al. |
| 5,997,793 A | 12/1999 | Lahnala |
| 6,014,840 A * | 1/2000 | Ray ................. B60J 1/1853 49/360 |
| 6,026,611 A | 2/2000 | Ralston et al. |
| 6,038,819 A | 3/2000 | Klein |
| 6,054,195 A | 4/2000 | Collins et al. |
| 6,086,138 A | 7/2000 | Xu et al. |
| 6,112,462 A | 9/2000 | Kolar |
| 6,119,401 A | 9/2000 | Lin et al. |
| 6,119,402 A | 9/2000 | Wisner |
| 6,125,585 A | 10/2000 | Koneval et al. |
| 6,161,894 A | 12/2000 | Chapman |
| 6,223,470 B1 | 5/2001 | Millard et al. |
| 6,225,904 B1 | 5/2001 | Jaffe et al. |
| 6,293,609 B1 | 9/2001 | Xu et al. |
| 6,324,788 B1 | 12/2001 | Koneval et al. |
| 6,328,243 B1 | 12/2001 | Yamamoto |
| 6,490,832 B1 | 12/2002 | Fischbach et al. |
| 6,525,659 B2 | 2/2003 | Jaffe et al. |
| 6,591,552 B1 | 7/2003 | Rasmussen |
| 6,598,931 B2 | 7/2003 | Tamura |

(56) References Cited

U.S. PATENT DOCUMENTS

| | | |
|---|---|---|
| 6,691,464 B2 | 2/2004 | Nestell et al. |
| 6,742,819 B2 | 6/2004 | So et al. |
| 6,766,617 B2 | 7/2004 | Purcell |
| 6,955,009 B2 | 10/2005 | Rasmussen |
| 7,003,916 B2 | 2/2006 | Nestell et al. |
| 7,010,883 B2 | 3/2006 | Jaerpsten et al. |
| 7,051,478 B2 | 5/2006 | Bourque et al. |
| 7,073,293 B2 | 7/2006 | Galer |
| 7,155,863 B2 | 1/2007 | Daniel et al. |
| 7,184,190 B2 | 2/2007 | McCabe et al. |
| 7,186,118 B2 | 3/2007 | Hansen et al. |
| 7,219,470 B2 | 5/2007 | Lahnala |
| 7,255,451 B2 | 8/2007 | McCabe et al. |
| 7,259,359 B2 | 8/2007 | Davey et al. |
| 7,395,631 B2 | 7/2008 | Lahnala |
| 7,400,435 B2 | 7/2008 | Byers et al. |
| 7,437,852 B2 | 10/2008 | Dufour et al. |
| 7,608,949 B2 | 10/2009 | Busch |
| 7,626,749 B2 | 12/2009 | Baur et al. |
| 7,871,272 B2 | 1/2011 | Firman, II et al. |
| 7,900,863 B1 | 3/2011 | Cheng |
| 7,934,342 B2 | 5/2011 | Lahnala |
| 7,963,070 B2 | 6/2011 | Recker |
| 8,042,664 B2 | 10/2011 | Rutkowski et al. |
| 8,069,615 B2 | 12/2011 | Heiman et al. |
| 8,127,498 B2 | 3/2012 | Lahnala |
| 8,151,519 B2 | 4/2012 | Bello et al. |
| 8,250,812 B2 | 8/2012 | Hebert et al. |
| 8,272,168 B2 | 9/2012 | Lahnala |
| 8,402,695 B2 * | 3/2013 | Smith ................. H01R 35/02 49/380 |
| 8,707,624 B2 * | 4/2014 | Gipson ............... E05F 15/632 49/380 |
| 8,881,458 B2 * | 11/2014 | Snider ................. E05B 83/00 49/380 |
| 8,915,018 B2 | 12/2014 | Snider |
| 8,938,914 B2 | 1/2015 | Hulst et al. |
| 9,242,533 B2 * | 1/2016 | Snider ................. H05B 3/84 |
| 9,579,955 B2 | 2/2017 | Snider |
| 9,624,707 B2 * | 4/2017 | Gipson ............... E05D 15/0621 |
| 9,642,187 B2 * | 5/2017 | Snider ................. E05C 1/08 |
| 9,688,122 B2 * | 6/2017 | Gipson ............... B60S 1/026 |
| 9,731,580 B2 * | 8/2017 | Snider ................. E05F 15/643 |
| 9,797,177 B2 * | 10/2017 | Gipson ............... B60J 1/1853 |
| 9,894,717 B2 * | 2/2018 | Ash, Jr. ............... H05B 3/84 |
| 9,920,560 B2 | 3/2018 | Gipson et al. |
| 10,015,842 B2 * | 7/2018 | Bennett ............... B60J 1/1853 |
| 10,015,843 B2 * | 7/2018 | Ackerman ........... E05F 15/643 |
| 10,155,432 B2 * | 12/2018 | Lahnala .............. H05B 3/84 |
| 10,219,324 B2 * | 2/2019 | Snider ................. B60J 1/002 |
| 10,668,868 B2 * | 6/2020 | Snider ................. B60J 1/003 |
| 10,797,374 B1 * | 10/2020 | Tengler .............. B60J 1/1846 |
| 10,841,983 B2 * | 11/2020 | Snider ................. E05B 83/00 |
| 10,843,644 B2 * | 11/2020 | Snider ................. B60R 16/03 |
| 11,013,069 B2 * | 5/2021 | Lahnala .............. B60S 1/026 |
| 2003/0074842 A1 | 4/2003 | Eckhardt et al. |
| 2003/0140562 A1 | 7/2003 | Staser et al. |
| 2003/0188487 A1 | 10/2003 | Rasmussen |
| 2003/0188490 A1 | 10/2003 | Kraus et al. |
| 2003/0213179 A1 | 11/2003 | Galer |
| 2004/0020131 A1 | 2/2004 | Galer et al. |
| 2004/0065017 A1 | 4/2004 | Priest et al. |
| 2004/0065018 A1 | 4/2004 | Regnier et al. |
| 2004/0098918 A1 | 5/2004 | Bourque et al. |
| 2005/0076573 A1 | 4/2005 | Rivera |
| 2006/0032140 A1 | 2/2006 | Arimoto et al. |
| 2006/0061008 A1 | 3/2006 | Karner et al. |
| 2006/0107600 A1 | 5/2006 | Nestell et al. |
| 2006/0130405 A1 | 6/2006 | Hemond et al. |
| 2007/0157522 A1 | 7/2007 | Hebert et al. |
| 2007/0209283 A1 | 9/2007 | Ostrowski et al. |
| 2007/0277443 A1 | 12/2007 | Dery et al. |
| 2008/0060275 A1 | 3/2008 | Recker |
| 2008/0100093 A1 | 5/2008 | Seiple et al. |
| 2008/0122262 A1 | 5/2008 | Cicala |
| 2008/0127563 A1 | 6/2008 | Tooker |
| 2008/0155902 A1 | 7/2008 | Kaiser |
| 2008/0202032 A1 | 8/2008 | Loidolt |
| 2008/0263960 A1 | 10/2008 | Murphy et al. |
| 2009/0212591 A1 | 8/2009 | Seiple et al. |
| 2009/0322705 A1 * | 12/2009 | Halsey, IV ......... H03K 17/9622 345/174 |
| 2010/0122494 A1 | 5/2010 | Lahnala |
| 2010/0122495 A1 | 5/2010 | Lahnala |
| 2010/0146859 A1 * | 6/2010 | Gipson ................. E05F 15/632 49/348 |
| 2010/0154312 A1 * | 6/2010 | Gipson ............... E05D 15/0621 49/360 |
| 2010/0182143 A1 | 7/2010 | Lynam |
| 2010/0240229 A1 | 9/2010 | Firman, II et al. |
| 2010/0263290 A1 | 10/2010 | Pawloski et al. |
| 2011/0030276 A1 * | 2/2011 | Smith ................. H01R 35/02 49/70 |
| 2011/0233182 A1 | 9/2011 | Baranski |
| 2012/0091113 A1 | 4/2012 | Bennei, I et al. |
| 2012/0091114 A1 | 4/2012 | Ackerman et al. |
| 2012/0117880 A1 | 5/2012 | Lahnala et al. |
| 2012/0139289 A1 | 6/2012 | Lahnala |
| 2012/0291353 A1 * | 11/2012 | Gipson ................. B60J 1/1853 49/70 |
| 2013/0174488 A1 | 7/2013 | Snider et al. |
| 2013/0255156 A1 | 10/2013 | Snider |
| 2013/0277352 A1 | 10/2013 | Degen et al. |
| 2013/0283693 A1 * | 10/2013 | Huizen ................. E05F 11/488 49/123 |
| 2014/0047772 A1 | 2/2014 | Hulst |
| 2014/0091074 A1 | 4/2014 | Lisinski et al. |
| 2015/0101254 A1 | 4/2015 | Tooker et al. |
| 2015/0115649 A1 | 4/2015 | Tooker et al. |
| 2015/0167372 A1 | 6/2015 | Hulst et al. |
| 2016/0059675 A1 | 3/2016 | Snider |
| 2016/0121699 A1 * | 5/2016 | Snider ................. E05F 15/60 49/13 |
| 2016/0167487 A1 * | 6/2016 | Tamarapoo ......... B60J 1/1853 296/146.16 |
| 2017/0268272 A1 * | 9/2017 | Gipson ............... E05D 15/0691 |
| 2018/0010374 A1 | 1/2018 | Gipson et al. |
| 2018/0227986 A1 * | 8/2018 | Snider ................. B60J 1/1853 |
| 2020/0040641 A1 | 2/2020 | Eck et al. |
| 2020/0079186 A1 * | 3/2020 | Snider ................. B60J 1/007 |
| 2020/0079187 A1 | 3/2020 | Tooker et al. |

FOREIGN PATENT DOCUMENTS

| | | |
|---|---|---|
| GB | 2229479 A | 9/1990 |
| WO | 2013043899 A1 | 3/2013 |

* cited by examiner

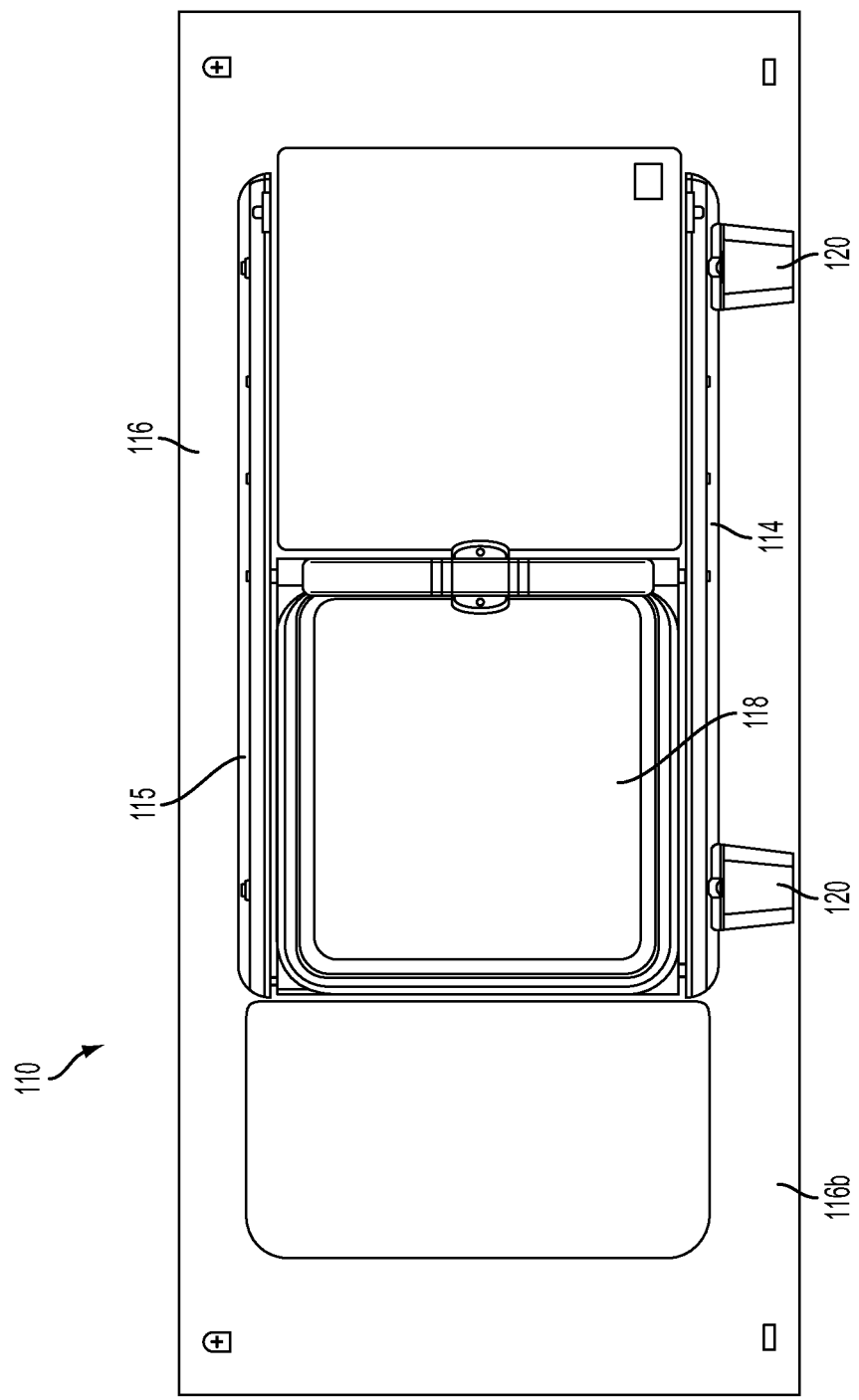

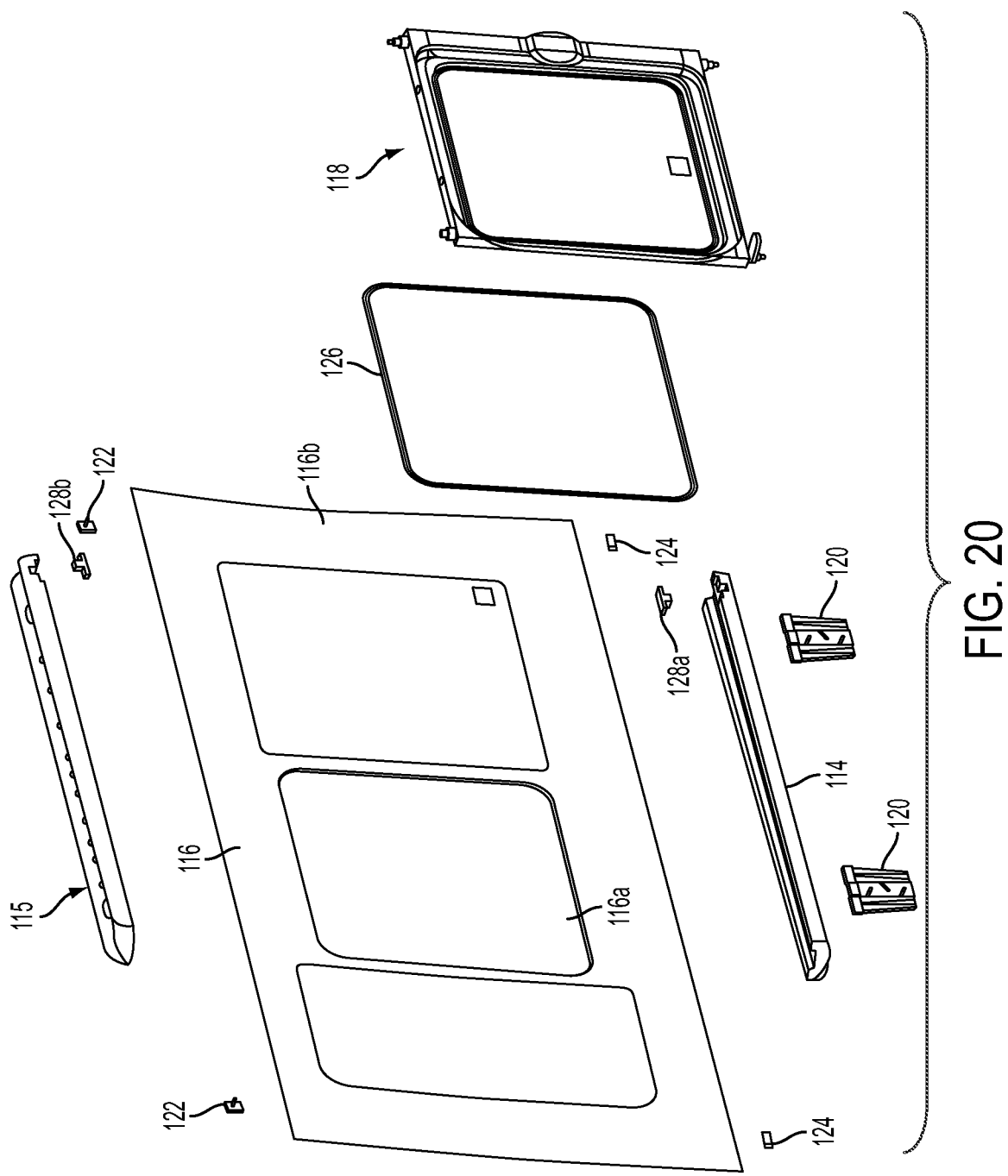

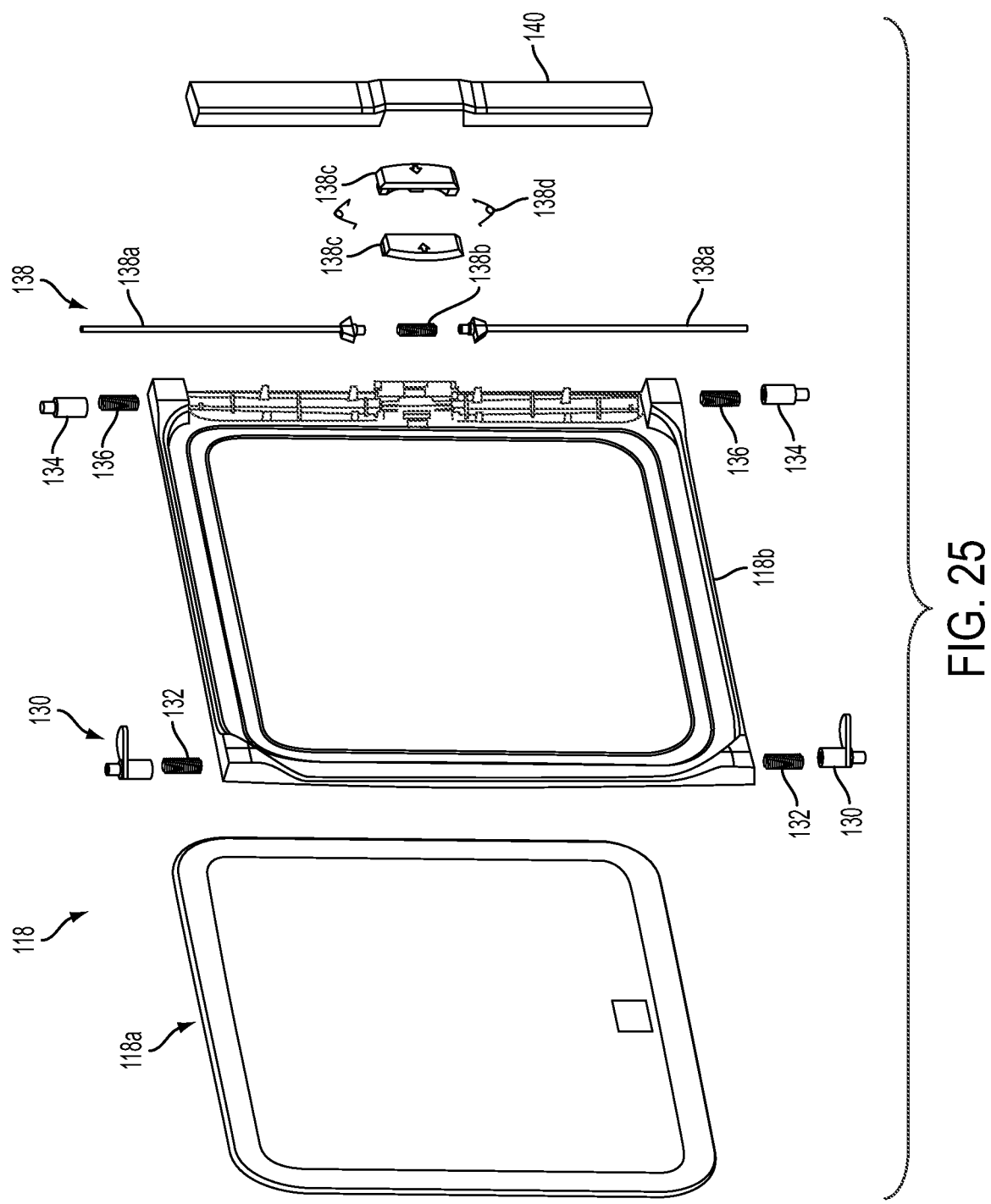

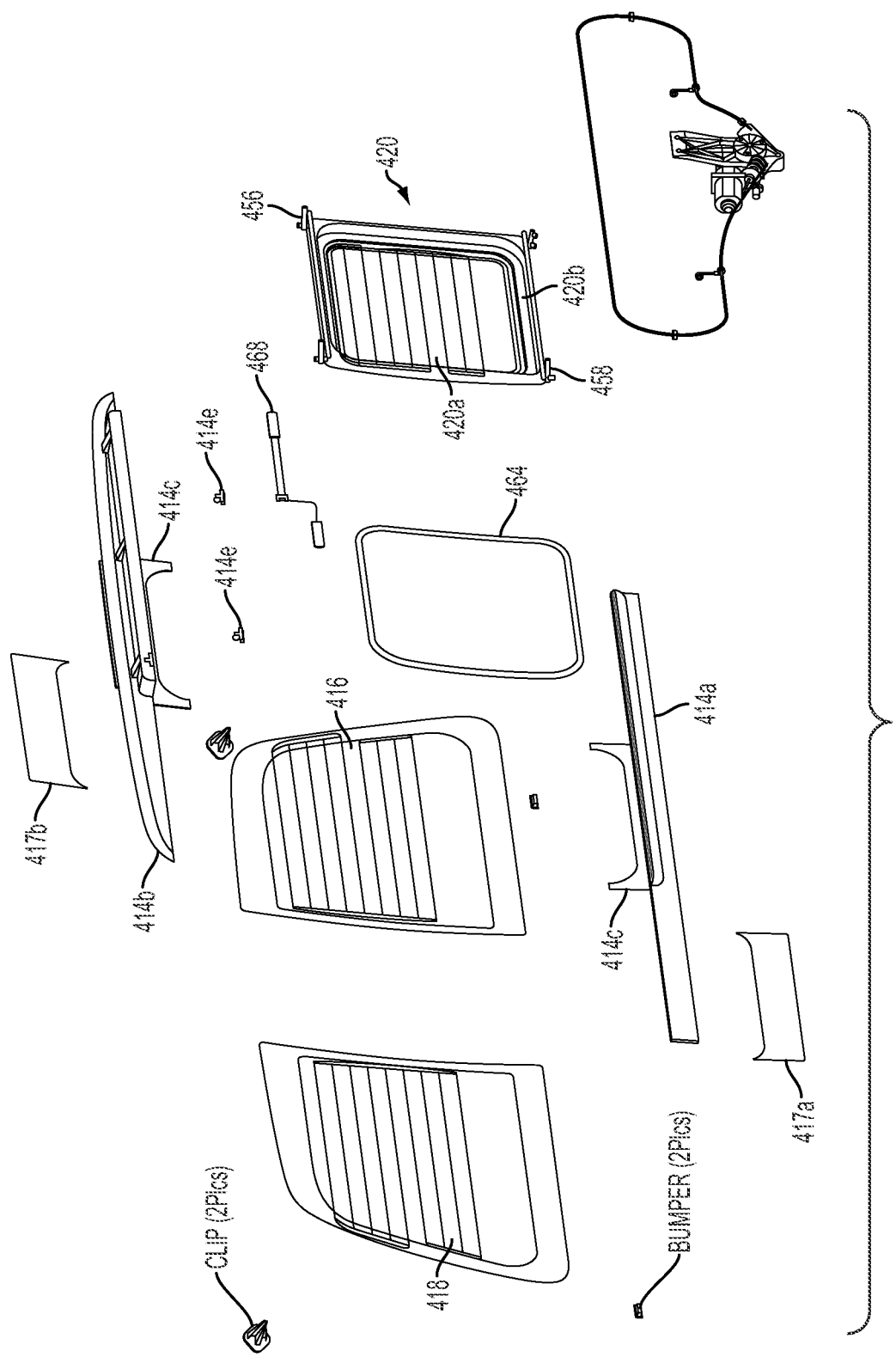

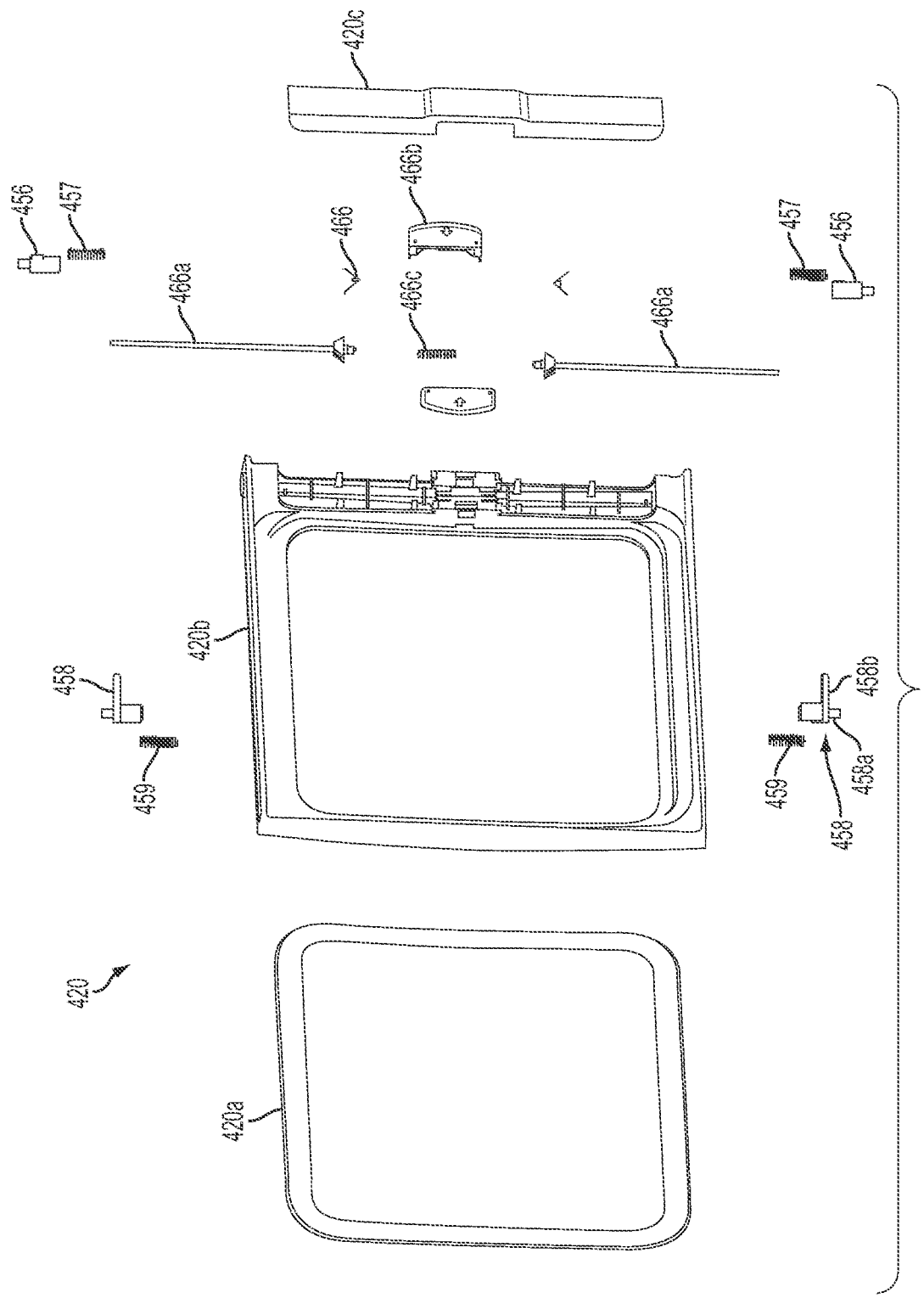

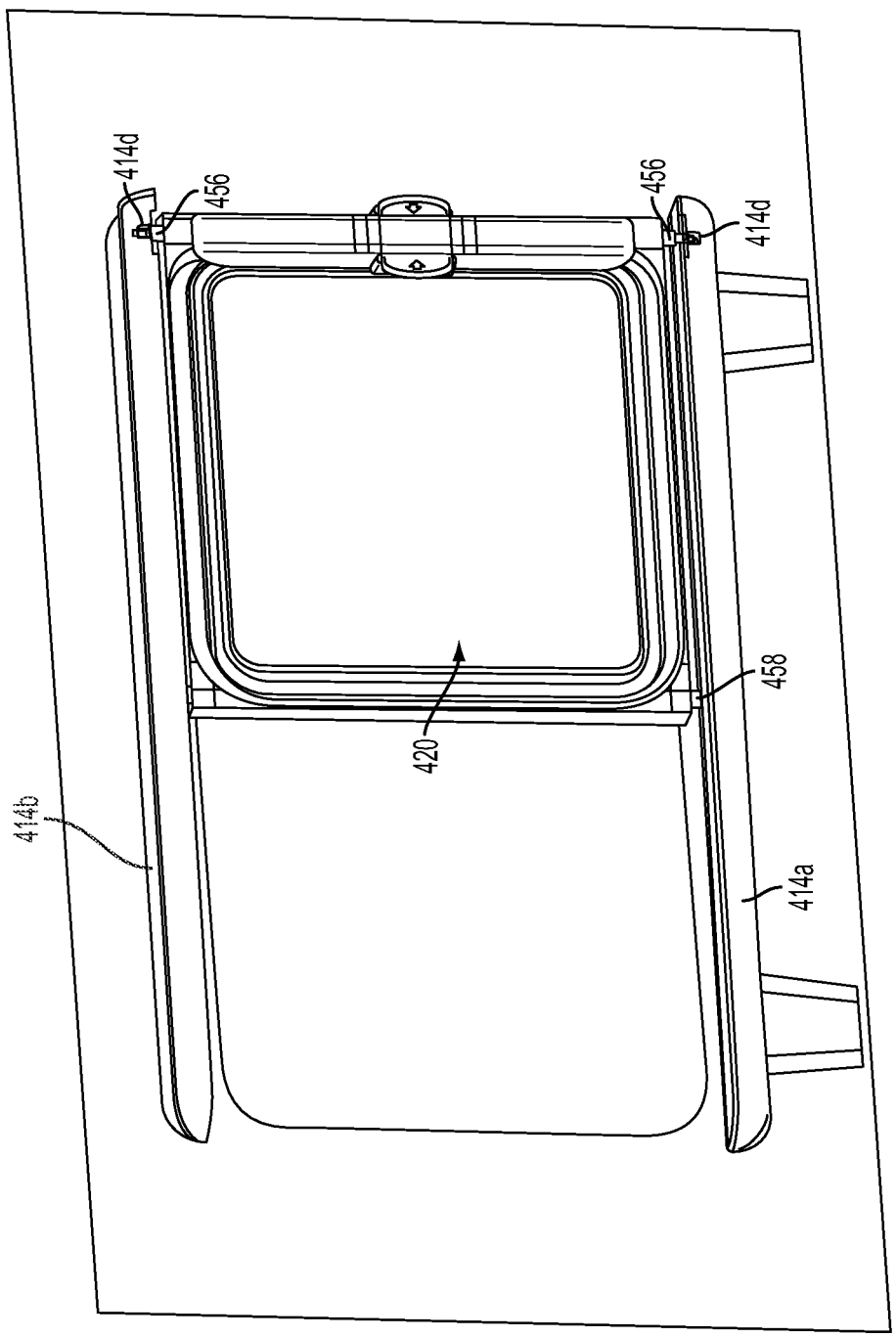

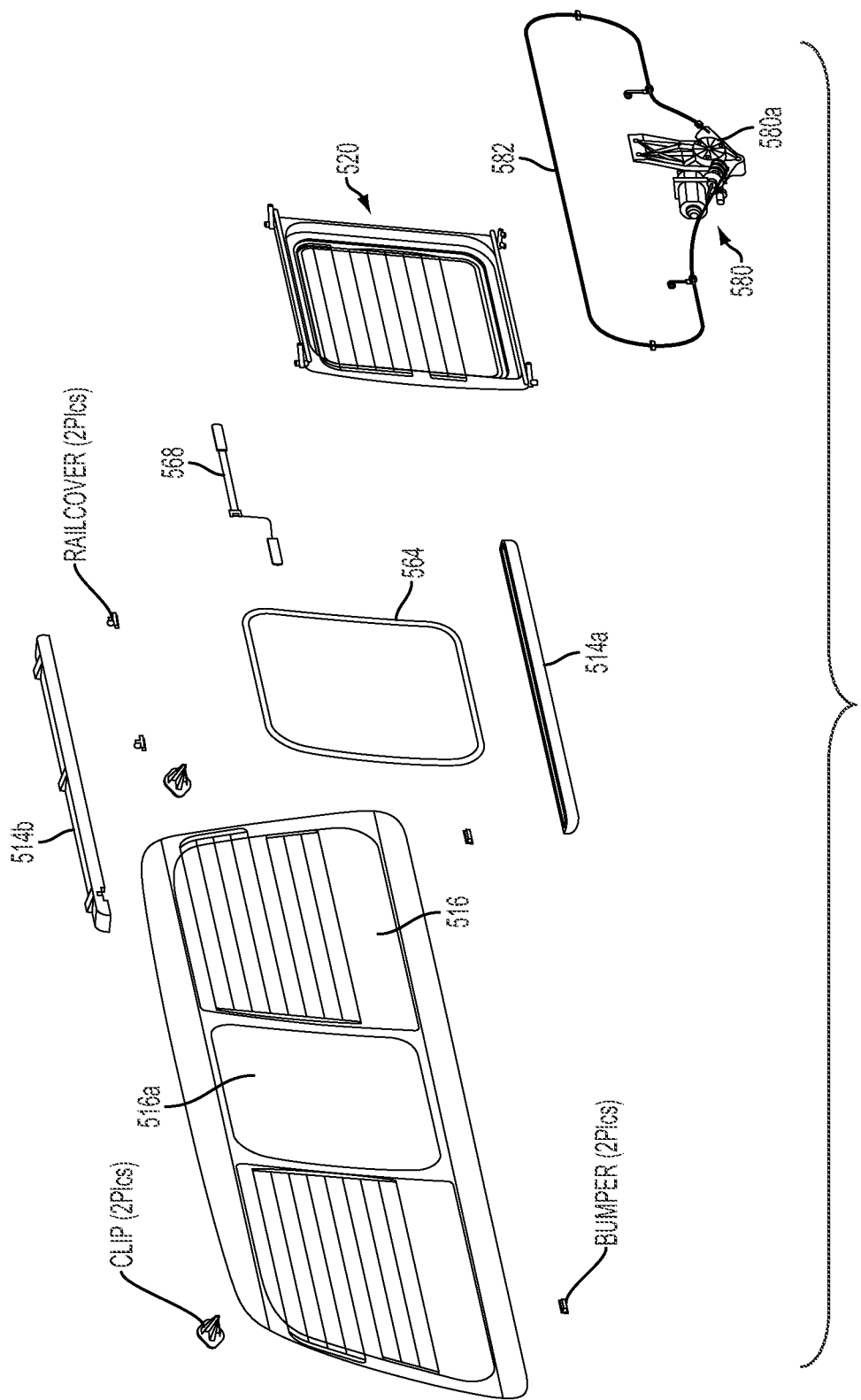

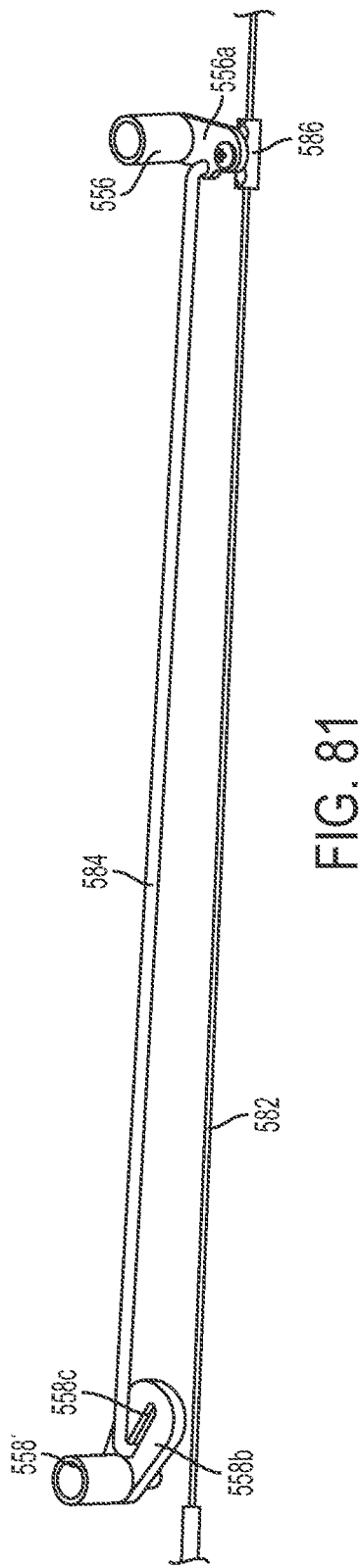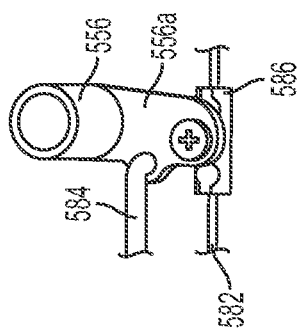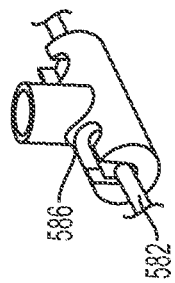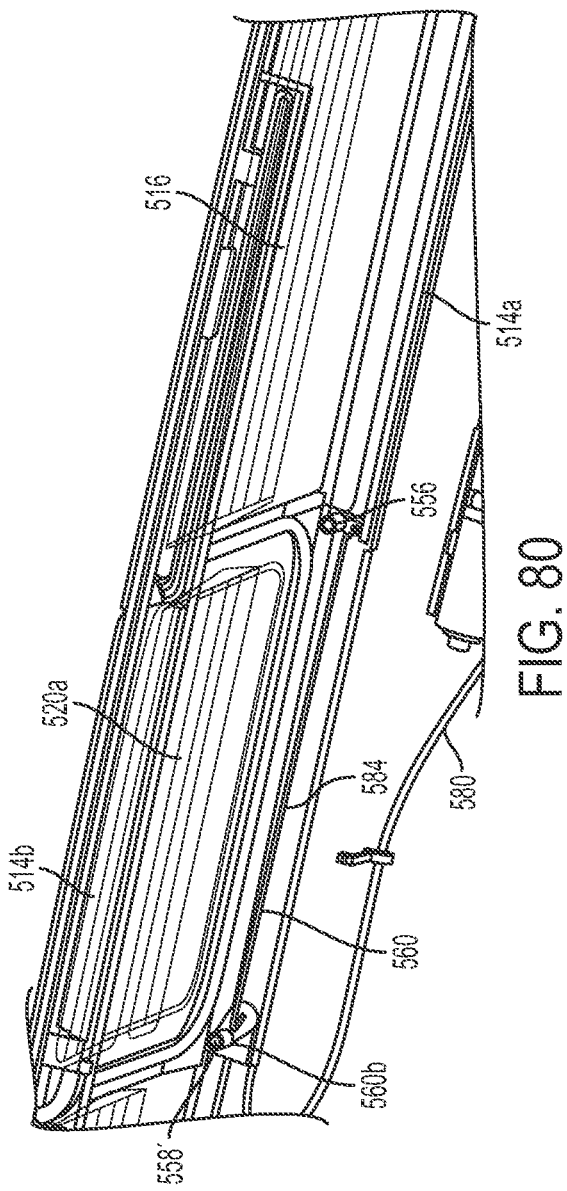

REAR SLIDER WINDOW ASSEMBLY

CROSS REFERENCE TO RELATED APPLICATIONS

The present application is a continuation of U.S. patent application Ser. No. 16/283,924, filed Feb. 25, 2019, now U.S. Pat. No. 10,841,983, which is a division of U.S. patent application Ser. No. 15/583,115, filed May 1, 2017, now U.S. Pat. No. 10,219,324, which is a continuation application of U.S. patent application Ser. No. 14/997,829, filed Jan. 18, 2016, now U.S. Pat. No. 9,642,187, which is a continuation application of U.S. patent application Ser. No. 14/528,574, filed Oct. 30, 2014, now U.S. Pat. No. 9,242,533, which is a division of U.S. patent application Ser. No. 13/823,963, filed Mar. 15, 2013, now U.S. Pat. No. 8,881,458, which is a 371 U.S. national phase filing of PCT Application No. PCT/US2011/051506, filed Sep. 14, 2011, which claims the benefit of U.S. provisional applications, Ser. No. 61/524,977, filed Aug. 18, 2011; Ser. No. 61/488,946, filed May 23, 2011; Ser. No. 61/483,546, filed May 6, 2011; Ser. No. 61/434,555, filed Jan. 20, 2011; and Ser. No. 61/383,055, filed Sep. 15, 2010, which are hereby incorporated herein by reference in their entireties. U.S. patent application Ser. No. 13/823,963 is also a continuation-in-part of U.S. patent application Ser. No. 12/850,864, filed Aug. 5, 2010, now U.S. Pat. No. 8,402,695, which claims the benefit of U.S. provisional applications, Ser. No. 61/347,920, filed May 25, 2010; Ser. No. 61/296,174, filed Jan. 19, 2010 and Ser. No. 61/231,854, filed Aug. 6, 2009.

FIELD OF THE INVENTION

The present invention relates to movable or slider window assemblies for vehicles and, more particularly to a side or rear slider window assembly for a vehicle.

BACKGROUND OF THE INVENTION

It is known to provide a slider window assembly for an opening of a vehicle, such as a rear slider window assembly for a rear opening of a pickup truck. Conventional slider window assemblies for rear openings of trucks or the like typically include three or more panels, such as two fixed window panels and a slidable window panel. The slidable window panel is supported by rails and may be moved along the rails to open and close the window.

It is also known to provide a slider window assembly for a rear opening of a pickup truck. Conventional slider window assemblies for rear openings of trucks or the like typically include three or more panels, such as two fixed window panels (or a single fixed panel with an opening formed therethrough) and a slidable window panel. The slidable window panel is supported by rails and may be moved along the rails to open and close the window. It is known to provide a heating element at the window assembly to defog or defrost the window panels. The fixed window panels typically include respective heater grids that are electrically connected to a power source and are heated responsive to actuation of a user input. The movable window panel typically includes a heater grid that is electrically connected the power source when the movable window panel is closed, whereby electrical terminals at the movable window panel may be electrically connected to or in electrical contact with electrical terminals at the frame or latch, and whereby the movable window panel is not electrically connected to the power source when the movable window panel is opened or partially opened.

SUMMARY OF THE INVENTION

The present invention provides a rear slider window assembly that has unitarily formed channels or frame portions and that has a carrier portion integrally formed with the movable window panel. The channels or frame portions may be integrally formed with the fixed window panels (such as via molding or forming the panel and frame portions in a single or common molding or forming operation and out of a single or common material, such as a polymeric material or polycarbonate material or acrylic material or the like) so that the entire assembly may comprise fewer components. The panel portions may be clear or transparent or substantially transparent, while the channels or frame portions and/or other components may be colored, such as via molding in a dark color or painting or coating those portions with a desired colored paint or coating or the like.

According to an aspect of the present invention, a rear slider window assembly of a vehicle (such as a pickup truck or the like) includes a frame portion having an upper rail and a lower rail, at least one fixed window panel that is fixed relative to the frame portion, and a movable window panel that is movable along the upper and lower rails. The movable window panel is movable between a closed position and an opened position.

Optionally, the movable window panel may include a panel portion and a carrier element integrally formed with the panel portion (such as via a common molding or forming process), with the carrier portion slidably received in the lower rail and movable along the lower rail as the movable window panel is moved between its closed and opened positions. Optionally, the movable window panel may comprise a polycarbonate material or other suitable moldable material.

Optionally, the fixed window panel or panels may be integrally formed with the frame portion (such as via a common molding or forming process). The fixed window panel may comprise a polymeric material, such as a polycarbonate material or an acrylic material or the like. Optionally, a panel portion or panel portions of the fixed window panel/panels may be substantially transparent and the frame portion may comprise a darkened color that is not transparent. Optionally, the darkened color may be molded in the frame portion. Optionally, a catch or latch element may be integrally molded with the fixed window panel, and the latch element may be colored or darkened.

The present invention also provides a rear slider window assembly that may provide for defogging or defrosting of the fixed and movable window panels of the rear slider window assembly. The window assembly of the present invention is operable to heat or defog or defrost the movable window panel irrespective of whether the movable window panel is opened or partially opened or closed. The present invention thus provides enhanced capability of heating or defogging or defrosting (or providing electrical power to) the movable window panel (typically the center window panel).

According to an aspect of the present invention, a rear slider window assembly of a vehicle (such as a pickup truck or the like) includes a frame portion having an upper rail and a lower rail, at least one fixed window panel that is fixed relative to the frame portion, and a movable window panel that is movable along the upper and lower rails. The movable window panel is movable between a closed position and an opened position. The at least one fixed window panel has a first electrical element established thereon and the movable window panel has a second electrical element established thereon.

The second electrical element may be electrically connected to the power source of the vehicle via a flexible connector or flexible cable that is connected at one end to the second electrical element at the movable window panel and to another end to an electrical connector. The electrical connector may be disposed at the fixed window panel and may be electrically conductively connected to the first electrical element. The first electrical element may be electrically conductively connected to the vehicle power source via a vehicle wiring harness or the like. The first and second electrical elements may comprise first and second heater grids established on the fixed window panel and the movable window panel, respectively. The movable window panel may include a guide or guiding element at or near the attachment of the flexible connector to the second electrical element, whereby the guide element is configured to move along the flexible connector as the movable window is moved to flatten or smooth the flexible connector or cable and to limit unwanted bending of the flexible connector during movement of the movable window, such as towards its opened position.

In one form, the first and second electrical elements may comprise first and second heater grids disposed at the respective window panels. The heater grids may be established or configured to provide enhanced heating of the window panels.

The present invention also provides a flush rear slider window assembly that has a movable window panel that is movable relative to a fixed window panel between an open position, where the movable window panel is disposed along a surface of the fixed window panel, and a closed position, where the movable window panel is disposed at an opening in the fixed window panel (or at an opening between a pair of spaced apart fixed window panels), with an outer surface of the movable window panel being generally flush or coplanar with the outer surface of the fixed window panel or panels.

According to another aspect of the present invention, a rear slider window assembly of a vehicle (such as a pickup truck or the like) includes a frame portion having an upper rail and a lower rail, at least one fixed window panel that is fixed relative to the frame portion, and a movable window panel that is movable along the upper and lower rails. The movable window panel is movable between a closed position and an opened position. The outer surface of the movable window panel is substantially flush or coplanar with the outer surface of the fixed panel or panels when the movable window panel is in its closed position. The window assembly may comprise a powered window assembly that includes a cable drive system for opening and closing the movable window panel.

Optionally, the window assembly may comprise a heater rear slider window assembly and power may be provided to an electrically powered heating grid at the movable window panel irrespective of the degree of opening of the movable window panel relative to the fixed window panel or panels. For example, a flexible cable or wiring may be routed along one of the rails of the window assembly and through a channel or rail follower or pin, whereby the end of the cable may be connected to terminals at the heater grid of the movable window panel.

Optionally, the window assembly may comprise a single fixed window panel with a hole or opening established therethrough, and with the movable window panel moving between a closed position, where the movable window panel substantially closes the opening, and an opened position, where the movable window panel is at least partially removed from the opening. The fixed window panel has a first heater grid established at a surface thereof, with the first heater grid comprising (a) a plurality of generally vertical heater traces at each side of the opening, (b) an upper horizontal busbar extending across the fixed window panel and electrically connecting at upper ends of the heater traces and (c) a lower horizontal busbar extending across the fixed window panel and electrically connecting at lower ends of the heater traces. A vehicle power source or vehicle wiring may connect to each of said busbars to provide electrical connection to the heater grid. The movable window panel may have a second heater grid with generally vertical heater traces and upper and lower busbars.

These and other objects, advantages, purposes and features of the present invention will become apparent upon review of the following specification in conjunction with the drawings.

BRIEF DESCRIPTION OF THE DRAWINGS

FIG. 19 is an interior plan view of the slider window assembly of FIGS. 18A and 18B;

FIG. 20 is an exploded perspective view of the slider window assembly of FIGS. 18A, 18B and 19;

FIG. 25 is an exploded perspective view of the movable window panel assembly of the slider window assembly of FIGS. 18 and 19;

FIG. 54 is an exploded perspective view of the flush rear slider window assembly of FIGS. 52 and 53;

FIG. 55 is an exploded perspective view of the movable panel and carrier assembly of the flush rear slider window assembly of FIGS. 52 and 53;

FIGS. 64A-D are perspective views showing the installation process of loading the movable window panel assembly into the rails of the window assembly;

FIG. 78 is an exploded perspective view of the flush rear slider window assembly of FIGS. 76 and 77;

FIG. 80 is a perspective view of the rear slider window assembly of FIGS. 76 and 77, showing a power linkage system for connecting the movable window panel to a cable drive system;

FIG. 81 is a perspective view of the linkage connection between the lower pin and lower channel follower of the rear slider window assembly;

FIGS. 82 and 83 are enlarged perspective views of the connector follower and cable connector for the power linkage system of FIG. 80;

DESCRIPTION OF THE PREFERRED EMBODIMENTS

Figure 1:
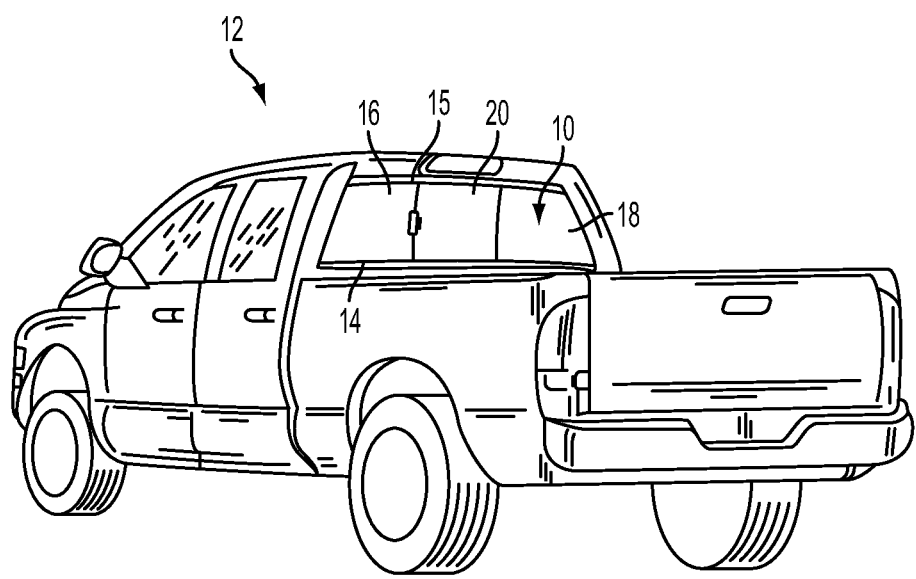
FIG. 1 is a rear perspective view of a pickup truck having a rear slider window assembly in accordance with the present invention.
Figure 2:
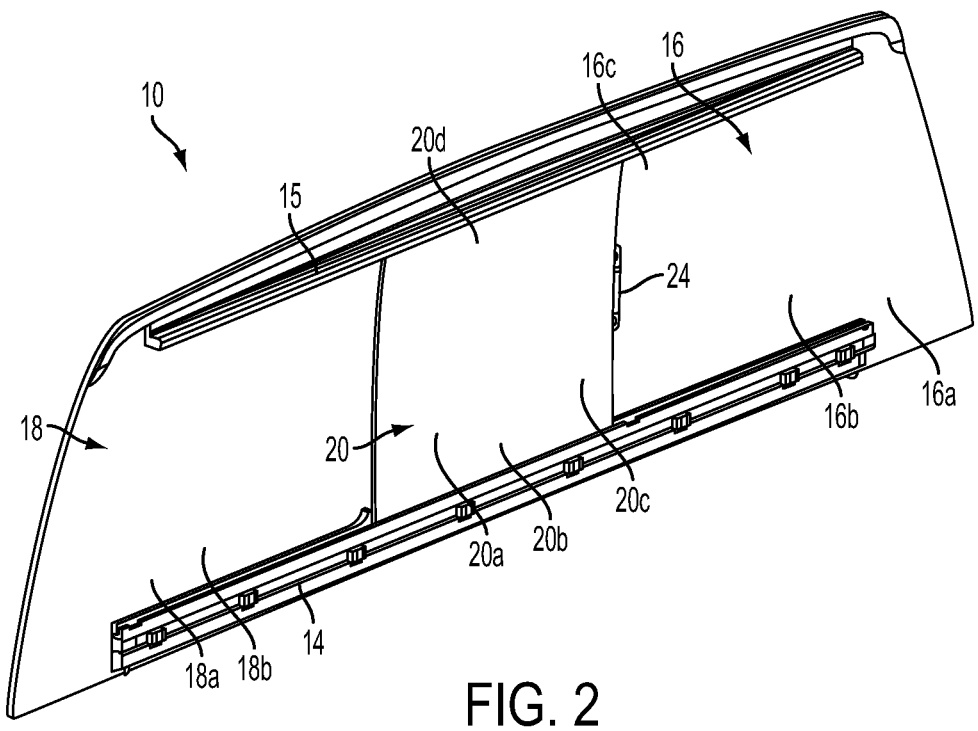
FIG. 2 is a perspective view of the rear slider window assembly of the present invention.
Figure 3:
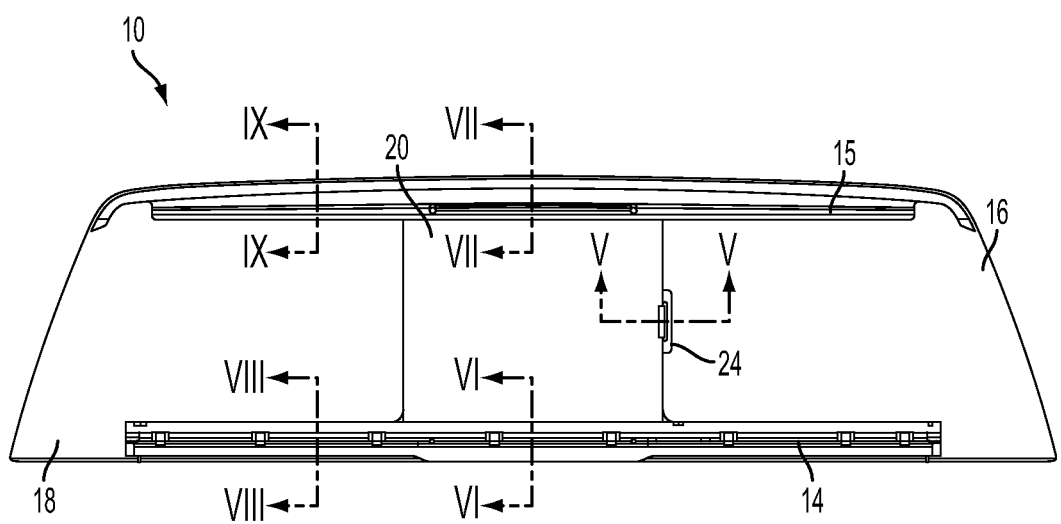
FIG. 3 is a front elevation of the rear slider window assembly of FIG. 2, as viewed from the forward or interior side of the window assembly when the window assembly is normally mounted to a vehicle.

Referring now to the drawings and the illustrative embodiments depicted therein, a rear slider window assembly 10 of a vehicle 12 (such as a pickup truck or the like) includes a window frame having a lower channel portion or rail 14 and an upper channel portion or rail 15, a pair of side fixed windows 16, 18 and a movable window 20 that is movable relative to frame 13 and fixed window 16, 18 between an opened position and a closed position (FIGS. 1-3). The lower channel portion or rail 14 and upper channel portion or rail 15 are disposed at and along inner surfaces 16b, 18b of fixed window 16, 18 to facilitate sliding of movable window 20 horizontally across window assembly 10 between its opened and closed positions. The fixed panel may comprise a transparent polymeric material, such as a transparent acrylic material or a transparent polycarbonate material, preferably a polycarbonate material, and optionally and preferably hard-coated for abrasion resistance, UV resistance and/or the like, such as by utilizing coatings and the like as known in the transparent polymeric window art. The channel portions 14, 15 may be integrally formed with the panel portions 16a, 18a of fixed window 16, 18, such as by molding the panels and channel portions of a polymeric material, such as a polycarbonate or acrylic material or the like, while the movable window 20 may have a panel portion 20a that is integrally formed or molded with a carrier portion 22 (FIG. 4) formed or molded or established along a lower edge portion 20b of the panel portion 20a, such as by molding the panel and carrier portion of a polymeric material, such as a polycarbonate or acrylic material or the like, as discussed below.

In the illustrated embodiment, window assembly 10 includes two fixed window panels 16a, 18a that are spaced apart so as to define an opening therebetween. Slider or movable window 20 is movable along lower rail 14 and upper rail 15 of the fixed window panels 16a, 18a to open and close the opening, such as in a manner similar to known slider window assemblies. Optionally, the slider window 20 may be disposed at or be formed with a lower carrier 22 at the lower perimeter edge region 20b of the slider window panel 20a and that is slidably or movably received in the lower rail 14 of the frame portion. The movable or slider window 20 is movable such as via manual pushing or pulling at the window panel or in response to actuation of a drive motor of a drive motor assembly or system, which may move cables or the like to impart horizontal movement of the slider window 20 along the rails 14, 15. Optionally, the drive motor assembly may utilize aspects of the drive assemblies of the types described in U.S. Pat. Nos. 4,920,698; 4,995,195; 5,146,712; 5,531,046; 5,572,376; 6,119, 401; 6,955,009 and/or 7,073,293, and/or U.S. Publication Nos. US-2004-0020131 and/or US-2008-0127563, which are all hereby incorporated herein by reference in their entireties.

Optionally, the window assembly or assemblies of the present invention may utilize aspects of the window assemblies described in U.S. Pat. Nos. 8,402,695; 7,073,293; 7,003,916 and/or 6,691,464, and/or U.S. Publication Nos. US-2006-0107600; US-2008-0127563; US-2004-0020131 and/or US-2003-0213179, which are hereby incorporated herein by reference in their entireties. Optionally, the fixed window panels and movable window panel may include one or more electrically conductive elements, such as heater grids or the like, which may be powered utilizing aspects of the window assemblies described in U.S. Pat. No. 8,402,695, which is hereby incorporated herein by reference in its entirety. Although shown and described as a horizontally movable center window that moves relative to a pair of opposite side windows (such as for applications at the rear of a cab of a pickup truck or the like), it is envisioned that the present invention is applicable to other types of movable window assemblies, such as horizontally movable window panels that move relative to a single fixed window panel and/or frames (such as for a rear or side opening of a vehicle or the like), and/or such as vertically movable window panels that move relative to one or more fixed panels and/or frames (such as for a rear or side opening of a vehicle or the like), while remaining within the spirit and scope of the present invention.

Figure 13:
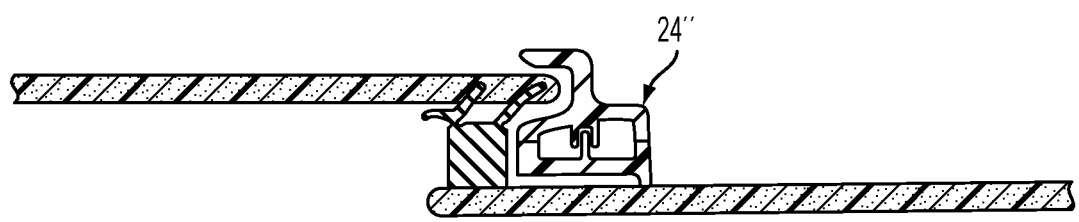
Figure 15:
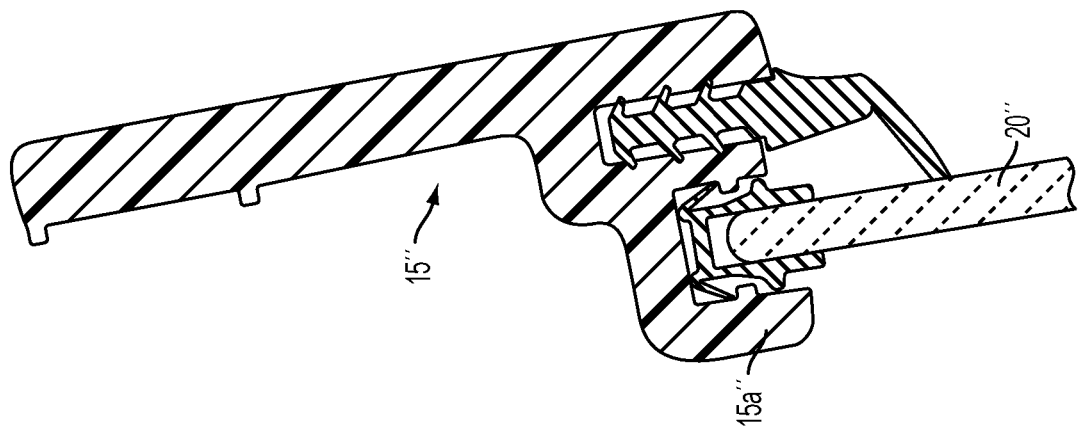
Figure 14:
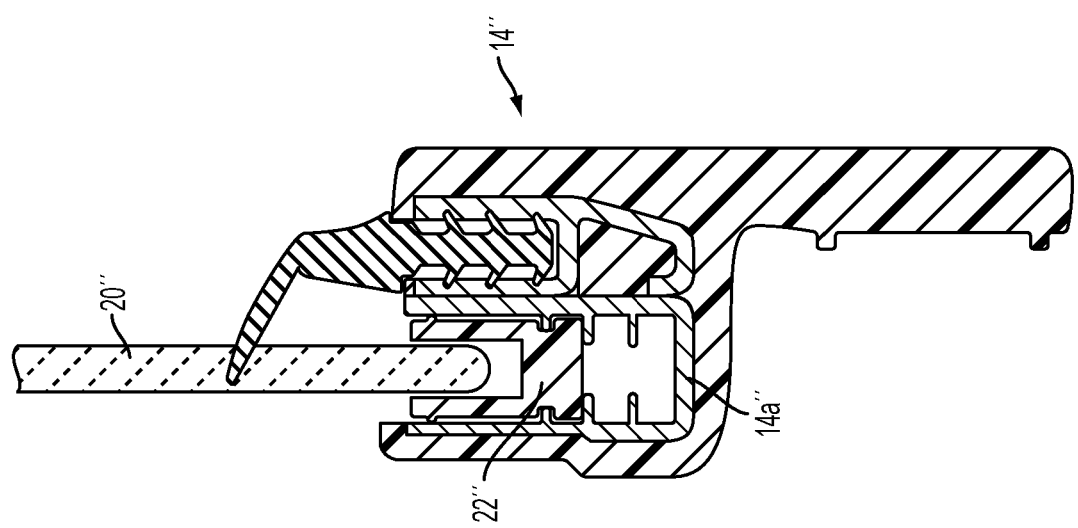
Figure 17:
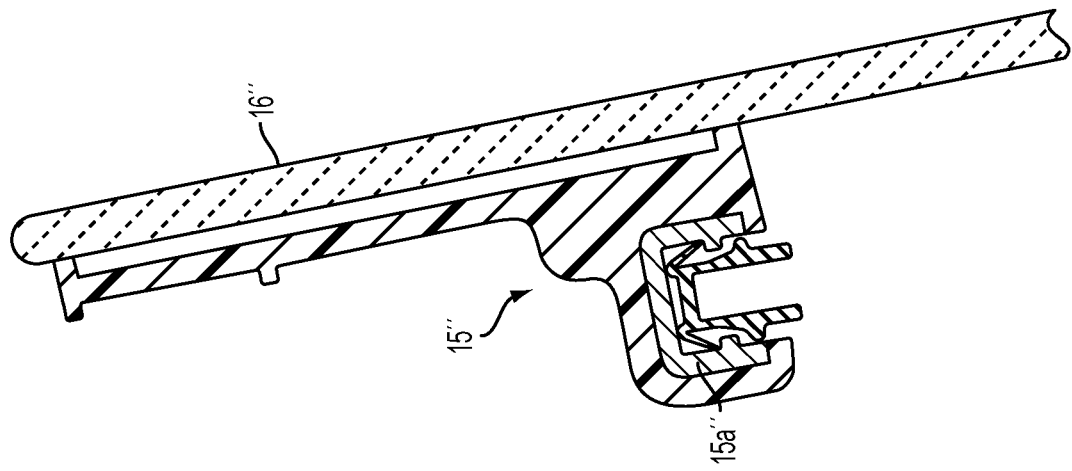
Figure 16:
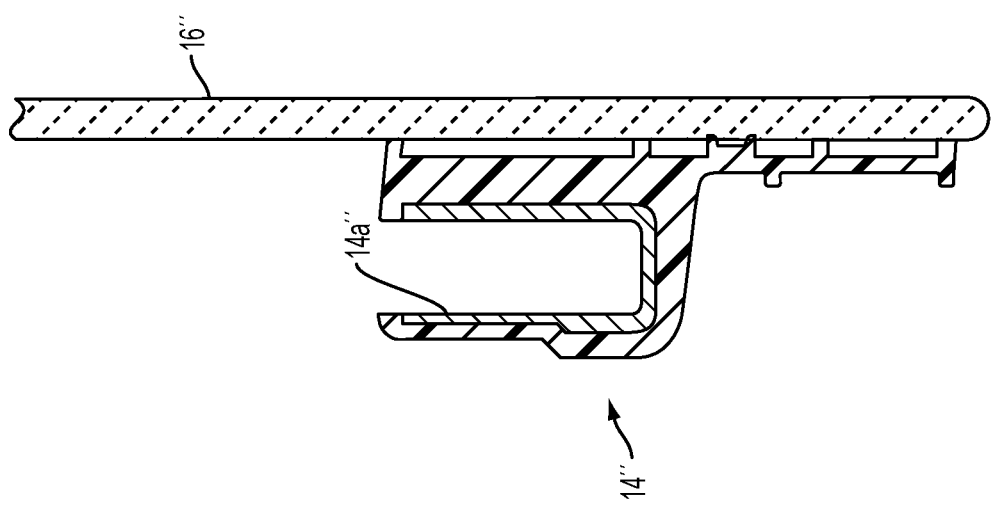

As shown in FIGS. 12-17, a rear slider window assembly may typically include a lower channel portion 14" and an upper channel portion 15" bonded to an inner surface of a fixed window panel 16". The channel portions 14", 15" may comprise plastic molded channel portions and may receive respective metallic guide elements 14a", 15a" disposed therein for receiving a lower carrier 22" (FIG. 12) adhered along a lower edge region of the movable window panel 20" (such as via an adhesive 23" disposed within a channel of carrier 22" that receives the lower edge of the movable window panel 20"). The catch or latching element 24" may be bonded at an inner surface of the fixed panel 16" for latching or locking the movable window panel 20" in its closed position (FIG. 13). The channel portions are molded or formed with the guide elements disposed therein, and require adhering or insert molding or the like to form the channel or frame portions and to adhere or bond the channel or frame portions and the carrier portion and the latching element to the respective glass window panels.

In accordance with the present invention, the rear slider window assembly includes channel portions 14, 15 that are formed or molded out of a plastic or polymeric or polycarbonate or acrylic material and that obviate the need for the additional guides or channel elements received in and along the channels for engaging the movable window panel and/or carrier as it moves relative to the channel portions and fixed window panels. For example, the rails or channel portions may be molded or formed with the fixed window panel or panels via a common molding or forming operation, such as injection molding of the channel portions and fixed window panel or panels (and optionally the latching element) in a single mold and/or such as a single shot molding operation or a multi-shot or dual shot molding operation in a single mold (with the multi-shot molding operations optionally providing different colors, such as a clear or transparent panel or panels and colored or darkened channels and latch or the like). The operator thus may, after the molding process is completed and the material is cured or hardened, remove the unitarily formed channel portions, latching element and fixed window panel/panels from the mold, with no further processes (but optionally the unitary construction or panel portion of the unitary construction may be hard-coated or the like) or adhesives and/or the like required to complete the channel/latch/panel construction. Likewise, for example, the carrier may be molded or formed with the movable window panel via a common molding or forming operation, such as injection molding of the carrier and movable window panel in a single mold and/or such as a single shot molding operation or a multi-shot or dual shot molding operation in a single mold (with the multi-shot molding operations optionally providing different colors, such as a clear or transparent panel and a colored or darkened carrier or the like). The operator thus may, after the molding process is completed and the material is cured or hardened, remove the unitarily formed carrier and movable window panel from the mold, with no further processes (but optionally the unitary construction or panel portion of the unitary construction may be hard-coated or the like) or adhesives and/or the like required to complete the carrier/panel construction.

Figure 4:
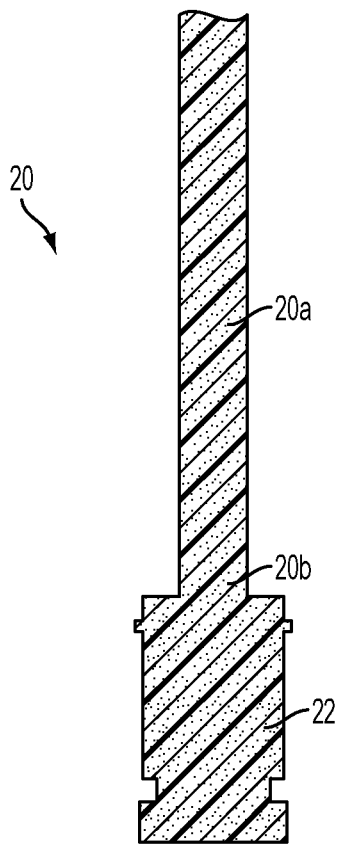
FIG. 4 is a sectional view of a lower portion of the movable window panel of the rear slider window assembly of the present invention, showing the panel and carrier unitarily formed as a single component.

As shown in FIG. 4, movable window 20 includes carrier 22 integrally formed or molded with the panel portion 20a of movable window 20 and along the lower edge region 20b of panel portion 20a. The window panel portion 20a and carrier 22 of movable window 20 may be unitarily molded or otherwise integrally formed together out of any suitable material, such as polycarbonate or the like, or such as a polymeric or plastic material or an acrylic material or other material that may be sufficiently transparent and durable, and that may be formable or moldable to the desired configurations. The panel 20a may be coated with an anti-scratch coating or the like to enhance the durability and scratch resistance of the window panel. Optionally, the carrier 22 may be colored or darkened, such as via molding the carrier portion of the panel construction in a different color while molding the panel portion 20a to be transparent or translucent or the like (such as via a dual shot molding operation of the carrier and panel portion in a single mold). Optionally, the carrier and panel portion may be unitarily molded or formed of a transparent material, and the carrier may, after molding and curing, be painted or coated with a colored or dark coating or ink or the like to provide the desired appearance. Optionally, the molded and cured unitary construction or at least the panel portion of the unitary construction may be hard-coated for abrasion resistance, UV resistance and/or the like, such as by utilizing coatings and the like as known in the transparent polymeric window art.

Figure 5:
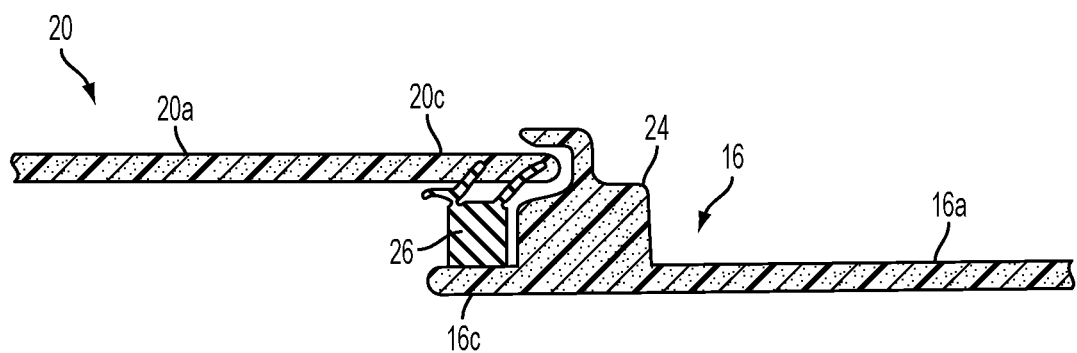
FIG. 5 is a sectional view of the rear slider window assembly taken along the line V-V in FIG. 3.

Optionally, and as shown in FIG. 5, fixed window 16 may include a catch or latching element 24 integrally formed therewith at an inboard edge region 16c of the panel portion 16a of fixed window 16. The panel portion 16a and latching element 24 of fixed window 16 may be molded or otherwise integrally formed together out of any suitable material, such as polycarbonate or the like, or such as an acrylic material or other material that may be sufficiently transparent and durable. The panel portion 16a of fixed window 16 may be coated with an anti-scratch coating or the like to enhance the durability and scratch resistance of the window panel.

Optionally, the latching element 24 may be colored or darkened, such as via molding the latching element portion of the panel construction in a different color while molding the panel portion 16a to be transparent or translucent or the like (such as via a dual shot molding operation of the latching element and panel in a single mold. Optionally, the latching element and panel portion may be unitarily molded or formed of a transparent material, and the latching element may, after molding and curing, be painted or coated with a colored or dark coating or ink or the like to provide the desired appearance. Optionally, the molded and cured unitary construction or at least the panel portion of the unitary construction may be hard-coated for abrasion resistance, UV resistance and/or the like, such as by utilizing coatings and the like as known in the transparent polymeric window art. As also shown in FIG. 5, the window panel 16a may include a sliding or wiping seal 26 disposed vertically along the inboard edge region 16c of the window panel 16a for sliding or wiping engagement with the edge region 20c of movable window panel 20a as the movable window panel is moved to its closed position and engages latching element 24 of fixed window 16.

Figure 6:
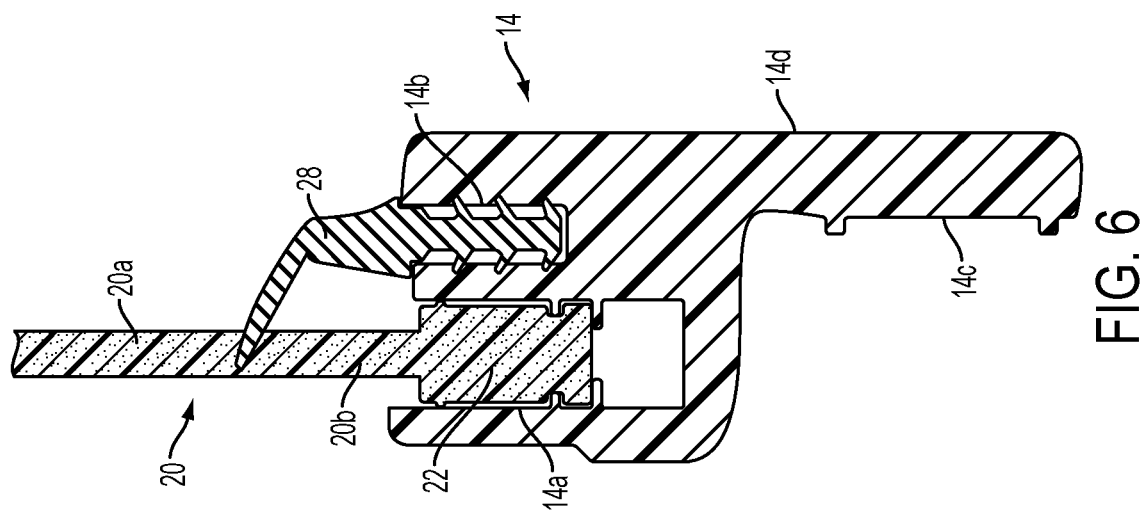
FIG. 6 is a sectional view of the rear slider window assembly taken along the line VI-VI in FIG. 3.

With reference to FIG. 6, the lower channel portion 14 comprises a unitarily formed construction, with a receiving channel 14a that slidably receives carrier portion 22 of movable window 20 therein. A wiping seal 28 is disposed in or received in another channel 14b of the channel portion 14 for sliding or wiping engagement with the surface of the lower edge region 20b of movable window panel 20a as the movable window panel moves along the channel portion between its opened and closed positions. The channel portion 14 includes an attaching surface 14c for attaching (such as via adhering or bonding) the channel portion to the vehicle frame or sheet metal when the window assembly 10 is installed in the vehicle. The channel portion 14 provides a substantially continuous outer surface 14d and may be colored or darkened to provide the desired appearance and to render covert the seal 28 and carrier portion 22 to a person viewing the window assembly from the outside of the vehicle.

Figure 7:
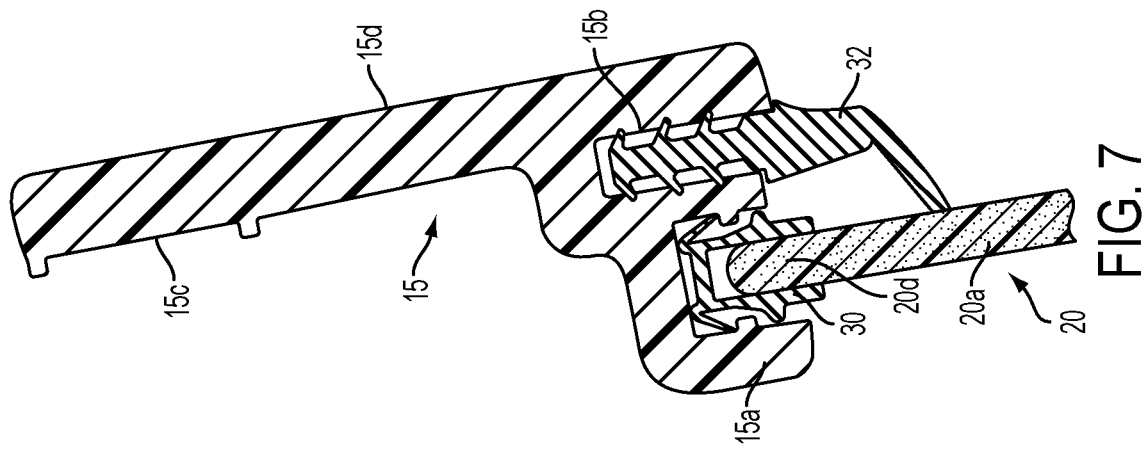
FIG. 7 is a sectional view of the rear slider window assembly taken along the line VII-VII in FIG. 3.

Similarly, and with reference to FIG. 7, the upper channel portion 15 comprises a unitarily formed construction, with a channel 15a that receives a guide element 30 that slidably receives an upper edge region 20d of movable window panel 20a therein. A wiping seal 32 is disposed in or received in another channel 15b of the channel portion 15 for sliding or wiping engagement with the movable window panel 20a as the movable window panel moves along the channel portion between its opened and closed positions. The channel portion 15 includes an attaching surface 15c for attaching (such as via adhering or bonding) the channel portion to the vehicle frame or sheet metal when the window assembly 10 is installed in the vehicle. The channel portion 15 provides a substantially continuous outer surface 15d and may be colored or darkened to provide the desired appearance and to render covert the attaching portion of the seal 32 and the guide element 30 to a person viewing the window assembly from the outside of the vehicle.

Figure 9:
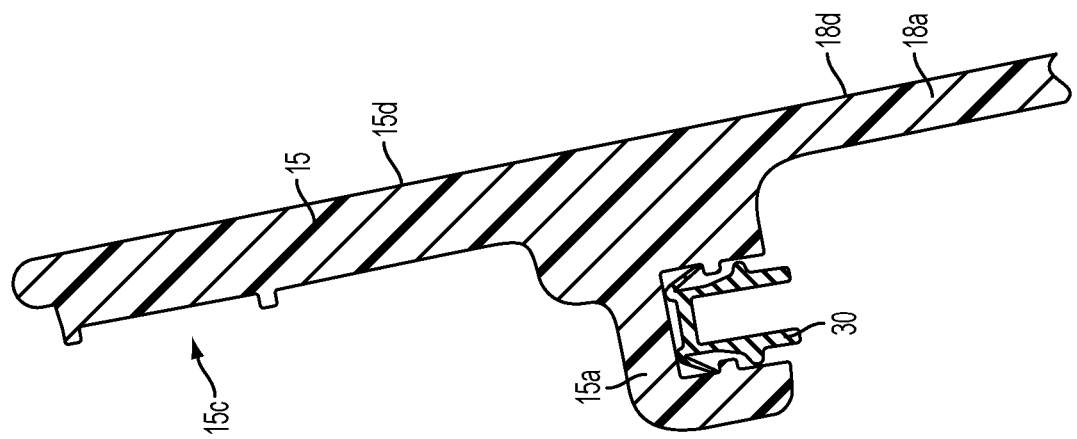
FIG. 9 is a sectional view of the rear slider window assembly taken along the line IX-IX in FIG. 3.
Figure 8:
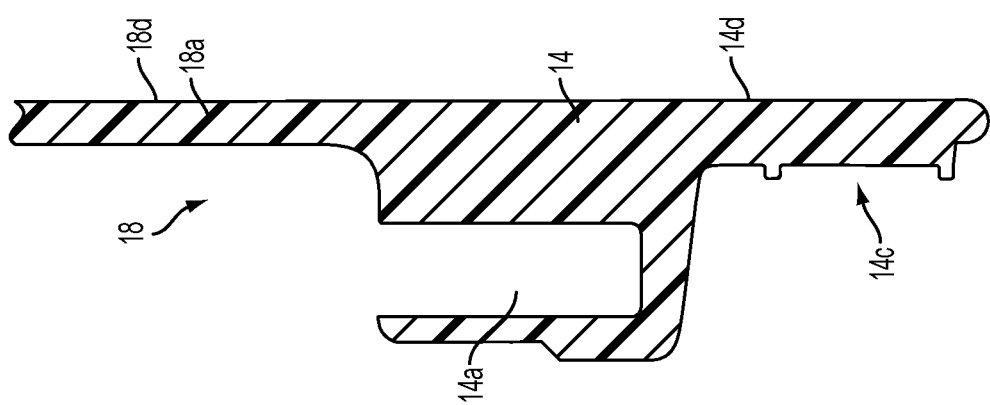
FIG. 8 is a sectional view of the rear slider window assembly taken along the line VIII-VIII in FIG. 3.

Optionally, and desirably, and with reference to FIGS. 8 and 9, the lower channel 14 and the upper channel 15 may be integrally formed or molded with fixed window panels 16a, 18a (FIGS. 8 and 9 show the channel as formed with fixed window panel 18, and the channel may be similarly unitarily formed with fixed window panel 16). The panel portions 16a, 18a of fixed windows 16, 18 may be molded as transparent or substantially transparent or translucent panels and may be coated with an anti-scratch coating or the like to enhance the durability and scratch resistance of the window panels. Optionally, the channel portions 14, 15 may be colored or darkened, such as via molding the channel portions (and outer surfaces 14d, 15d) in a different color or darkened color while molding the panel portions 16a, 18a to be transparent or translucent or the like (such as via molding the channel portions in a different color while molding the panel portions to be transparent or translucent or the like, such as via a dual shot molding operation of the channel portions and panel portions in a single mold). Optionally, the channel portion 14, 15 may be painted or coated with a colored or dark coating or ink or the like to provide the desired appearance (such as via unitarily molding or forming the channel portions and panel portions of a transparent material, whereby the channel portions may, after molding and curing, be painted or coated with a colored or dark coating or ink or the like to provide the desired appearance). Optionally, the molded and cured unitary construction or at least the panel portion of the unitary construction may be hard-coated for abrasion resistance, UV resistance and/or the like, such as by utilizing coatings and the like as known in the transparent polymeric window art.

Figure 11:
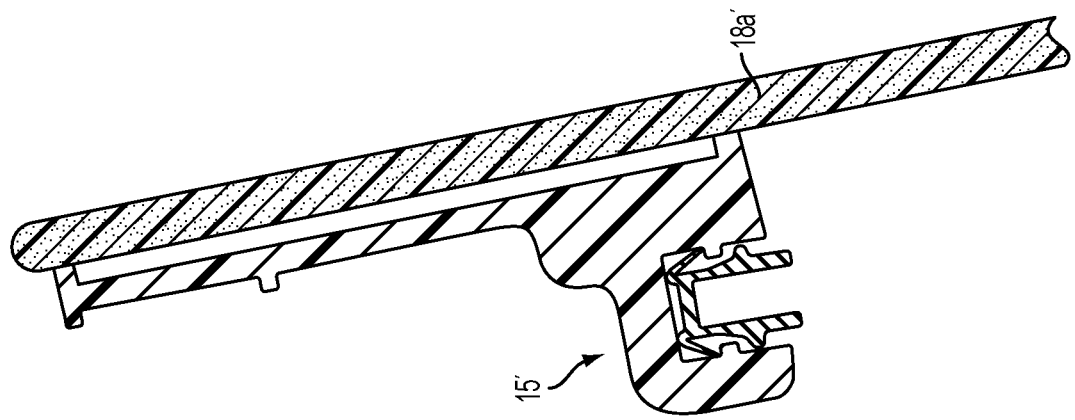
FIG. 11 is a sectional view similar to FIG. 9 of another rear slider window assembly of the present invention, with the upper channel or frame portion bonded to the fixed window panel.
Figure 10:
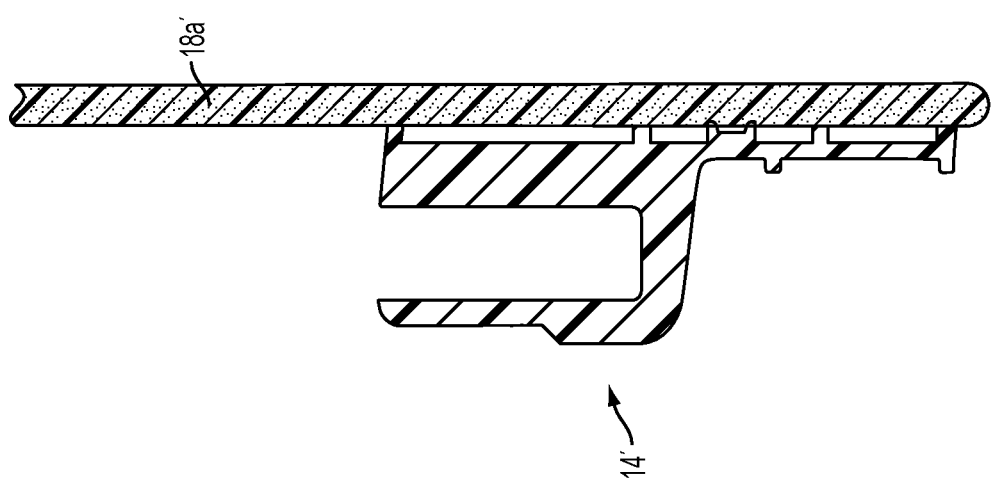
FIG. 10 is a sectional view similar to FIG. 8 of another rear slider window assembly of the present invention, with the lower channel or frame portion bonded to the fixed window panel.
Figure 12:
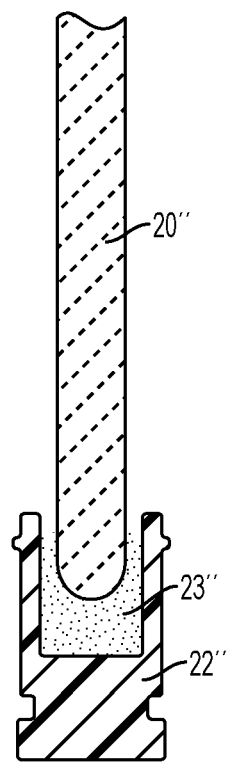
FIGS. 12-17 are perspective views similar to FIGS. 4-9 of another rear slider window assembly with separate components for the window panels, carrier, upper and lower channels and latch element.

Thus, a unitary fixed window construction may comprise the opposite or spaced apart fixed window panels and the upper and lower frame or channel portions, all integrally molded or formed together (and optionally including the latch element formed with one of the fixed window panels), and with the panel portions being clear or transparent and the channel portions being colored or darkened. As can be seen with reference to FIGS. 8 and 9, the outer surfaces 16d, 18d of window panels 16a, 18a may be generally flush or continuously formed with the outer surfaces 14d, 15d of lower and upper channels 14, 15 to provide a uniform appearance along the upper and lower perimeter regions of the fixed window panels. Similarly, the outer surfaces 14d, 15d of the channels at the center region of the window assembly may be generally flush with or continuously formed with the outer surfaces 14d, 15d of the channels at the side or fixed window panel regions to provide a uniform and flush perimeter of the window assembly. Optionally, and with reference to FIGS. 10 and 11, the unitarily molded channel portions 14', 15' may be formed separately from the fixed window panels (only window panel 18a' shown in FIGS. 10 and 11) and may be adhered or bonded to the fixed window panels, such as via a bonding adhesive or the like.

Therefore, the present invention provides a polycarbonate slider window assembly formed from all polycarbonate (or acrylic or other suitable material) panels and channels, instead of glass panels with bonded horizontal channels. The panel portions may be transparent polycarbonate panels while the channel portions and latching element may be darkened or colored, such as by molding (preferably in one shot) those portions in a darkened color, such as a gloss black color or the like with the panel portions being clear or transparent and the previous glass portion in clear. Also, anti-scratch coatings may be applied to the surfaces of the polycarbonate panels to enhance their durability and scratch resistance. Although polycarbonate panels are typically more expensive than glass window panels, the present invention may achieve cost savings over conventional rear slider window assemblies by eliminating labor processes and assembly processes, such as the processes of priming the glass panels, applying adhesives, and/or fixturing the panels and channel portions and latching elements and carriers, and/or the like.

Optionally, and with reference to FIGS. 18A-30, a slider window assembly 110 for a vehicle may include a fixed window panel 116 and a movable window panel assembly 118 that is movable between an opened position (where the movable window panel assembly is disposed behind a portion of the fixed window panel 116) and a closed position (where the movable window panel is disposed at an opening 116a of fixed window panel 116). In the illustrated embodiment, fixed window panel 116 is configured to be adhered to a vehicle, such as to a recess in the vehicle body or to the frame or sheet metal of a vehicle, such as via a bead of adhesive and/or sealant disposed around a perimeter region of the inner surface of the fixed window panel that adheres and bonds and seals the fixed window panel at the vehicle body. The window assembly 110 includes a lower rail or channel member 114 adhered or bonded to a lower region of an inner surface of fixed window panel 116 and an upper rail or channel member 115 adhered or bonded to an upper region of the inner surface of fixed window panel 116. Lower rail 114 includes one or more (such as two as shown in the drawings) water drains or holes established therethrough to allow water that may accumulate in the lower rail 114 to flow through the rail 114, as discussed below. The rails fixed at the fixed window panel cooperate with channel followers and pins of the movable window 118 and function to guide the movable window along the rails and toward the fixed window panel when the movable window is moved to its closed position, as also discussed below. The movable window panel thus may be movable along the rails between an opened position, where the movable window is disposed inward of the fixed window panel, and a closed position, where the movable window is disposed at the opening in the fixed window panel and at least partially in the opening to provide a generally flush or continuous exterior surface of the fixed and movable window panels when the movable window panel is closed.

Figure 21:
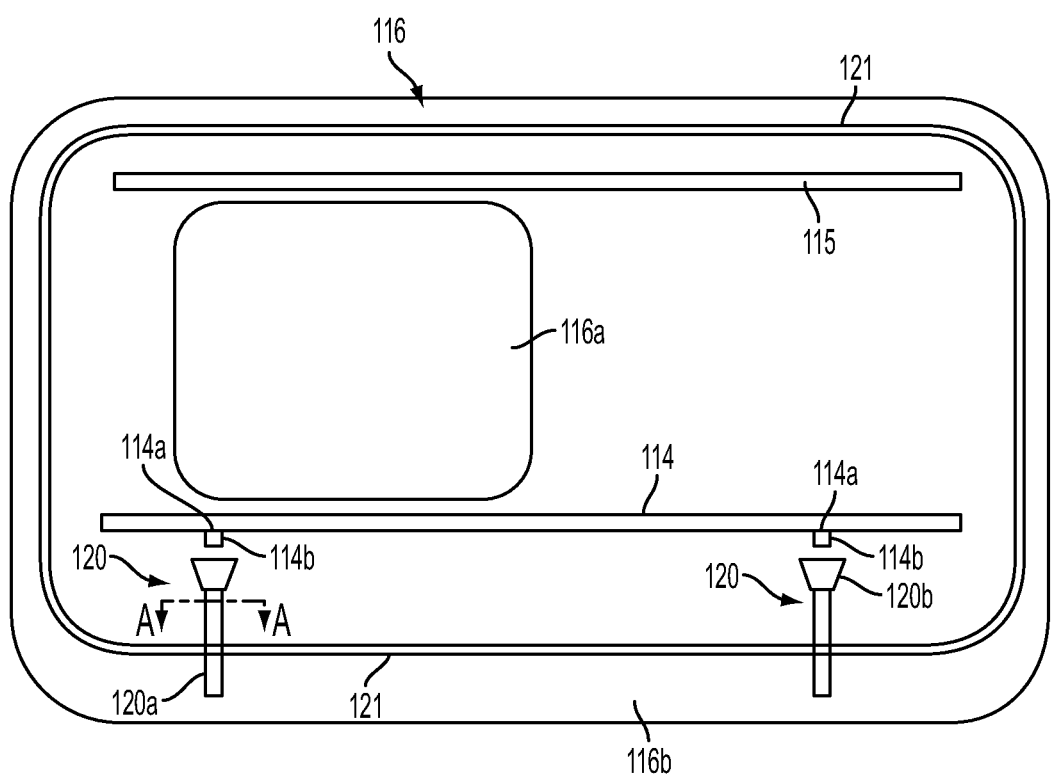
FIG. 21 is an interior plan view of the fixed window panel and rails and water drainage receiving conduits.
Figure 21A:
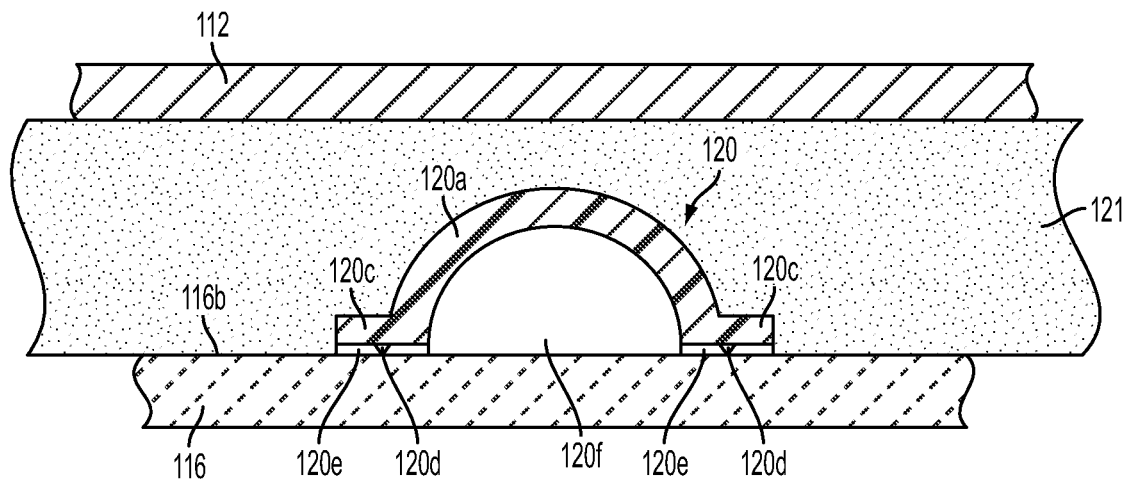
FIG. 21A is a sectional view of the water drainage receiving conduit taken along the line A-A in FIG. 21.

At least one water management shroud or drainage receiving conduit 120 (such as two drainage receiving conduits as shown in FIGS. 18A-21 and 26) is disposed at and spaced from the water drain hole and the lower rail 114 and is configured to receive water from the water drain hole of the lower rail and to guide the water along the fixed window panel 116 and through the adhesive bead or seal 121 (FIGS. 21 and 21A-B) that attaches the inner surface of the fixed window panel 116 to the vehicle, so that the water is guided or channeled out of the window assembly. The bead of adhesive or sealant 121 is disposed between the fixed window panel and the vehicle body and has a thickness (such as a desired thickness or bond-line thickness selected to achieve the desired bonding of the adhesive to the fixed window panel and to the vehicle body, such as a thickness on the order of a few millimeters or more or less). The fixed window panel is thus directly attached to the vehicle via the bead of sealant or adhesive 121, such as a bead of moisture-cured urethane adhesive, which adheres or bonds the window panel to the vehicle and provides a watertight seal and provides a spacer or cushioning function between the fixed window panel and the vehicle body. Such an adhesive bead typically has a dimension or thickness of a few millimeters or thereabouts. As best shown in FIGS. 21 and 21A, the drainage receiving conduit 120 is bonded or attached to the inner surface 116b of the fixed window panel 116 and extends through the bead of adhesive or sealant 121 to provide a channel or conduit through the bead of adhesive or sealant to facilitate controlled flow of water through the adhesive/sealant and out from the window assembly.

Various water drainage techniques have been proposed for vehicle windows. For example, EP Patent Publication No. EP 1 048 501 B1 (which is hereby incorporated herein by reference in its entirety) discloses a device for shutting a window of a vehicle, with a functional element or rail added onto the surface of a fixed assembly. The functional element or rail includes at least one water passage or cannula integrally formed therewith which permits flow of water towards the exterior of the vehicle. The water passages are cannulas or tubes extending on the surface of the fixed assembly which faces towards the interior of the vehicle and pass through seals which are placed on the surface of the fixed assembly which faces towards the interior of the vehicle. Such water passages, which are formed as part of the functional element or rail of the window assembly, have disadvantages. For example, such integrally formed rails and water passages (where the water passage is formed with the rail via a common forming or molding process to establish a unitary construction comprising the rail and water passageways) are inflexible for applications to different window applications with window panels of different sizes or lengths. Also, the lower rail, with the water passages integrally formed therewith, cannot be used as a universal rail for other window applications and/or for an upper rail application on a particular window assembly (since such an application would have the integrally formed water passages protruding upwardly from the upper rail).

With respect to the water management shrouds or drainage receiving conduits of the present invention, the drainage receiving conduits 120 are separate from and spaced from and are not physically connected to or formed with the lower rail 114, and thus the lower rail may be readily used in other applications and/or can be used as a universal rail for both upper and lower rail applications. As best shown in FIGS. 20 and 21, the drainage receiving conduits 120 are adhered or bonded to the fixed window panel 116 at locations below and spaced from the water drain holes 114a of the lower rail 114 (and optionally a drainage hole extension 114b of the lower rail 114 such as shown in FIGS. 21 and 21C) for receiving water that flows or drips from the water drain holes 114a and/or drainage hole extension 114b. The drainage receiving conduits 120 are configured to guide or channel or conduit the received water downward along the fixed window panel and through the adhesive bead or seal 121 that attaches the fixed window panel to the vehicle, whereby the water is discharged from the shrouds outside of the window assembly 110.

As best shown in FIGS. 21, 21A and 21C, the water drainage receiving conduits 120 comprise a generally linear or straight (or other shape depending on the particular application) conduiting or channeling or guiding portion 120a and an enlarged upper receiving portion 120b. The receiving portion 120b is generally cup-shaped or funnel-shaped and is disposed at the drain hole 114a or drainage hole extension 114b of the lower rail 114 so that water flowing or dripping through the drain hole 114a and drainage hole extension 114b is received in the receiving portion 120b of water drainage receiving conduit 120. Optionally, and preferably, there need not be any physical contact or connection between the drainage extension 114b of the rail 114 and the receiving end 120b of drainage receiving conduit 120 (such as shown). Optionally, the receiving end 120b of drainage receiving conduit 120 may partially receive (yet not contact) the drainage extension 114b of lower rail, such as shown in FIG. 21C. Optionally, and less desirably, the receiving end of the drainage receiving conduit may be connected to or formed with the drainage extension and lower rail to provide a unitary rail and drainage conduit construction. In such an application, the receiving portion need not be cup-shaped and would be formed in the same shape as and as part of the drainage extension of the lower rail, and thus comprise an elongated drainage extension formed as part of the lower rail.

As can be seen with reference to FIG. 21A, the water drainage receiving conduit 120 may comprise a semi-circular shape with its open side attached or adhered or bonded to the inner surface of the fixed window panel 116. In the illustrated embodiment, water drainage receiving conduit 120 includes a pair of attachment flanges or wings 120c that provide a bonding surface for adhering or taping or affixing the conduit to the window panel, with the inner surface of the window panel 116 forming a wall or side of the conduit and with a passageway 120f established along the conduit and between the inner surface 116b of window panel 116 and the conduiting portion 120a of drainage conduit 120. Optionally, the flanges or wings 120c may include bumps or protrusions 120d to establish the desired or appropriate bond-line thickness for an adhesive 120e disposed between the flanges 120c and the window panel 116 (such as by utilizing aspects of the window assemblies described in U.S. Pat. Nos. 5,551,197 and 5,853,895, which are hereby incorporated herein by reference in their entireties). As shown in FIG. 21A, the water drainage receiving conduit 120 is attached to the inner surface of the fixed window panel 116, and the adhesive/sealant bead 121 is disposed around the perimeter of the fixed window panel 116 and over the conduiting portion 120a of conduit 120, whereby the fixed window panel is adhered to the vehicle body 112. Optionally, the window panel 116 may have a darkened coating or dark frit layer established around its perimeter to render covert the seal and/or conduits and/or upper and lower rails (or other means for darkening the portion of the window panel at and around the seal/conduits/rails) to provide an enhanced aesthetic appearance to the window assembly when the window assembly is normally mounted or adhered to the vehicle.

Figure 21B:
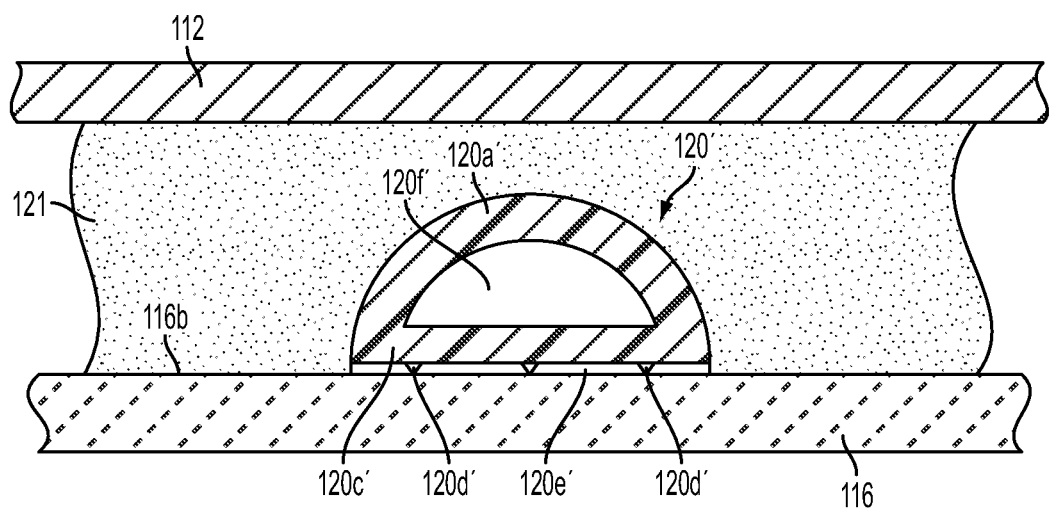
FIG. 21B is a sectional view of another water drainage receiving conduit of the present invention.
Figure 21C:
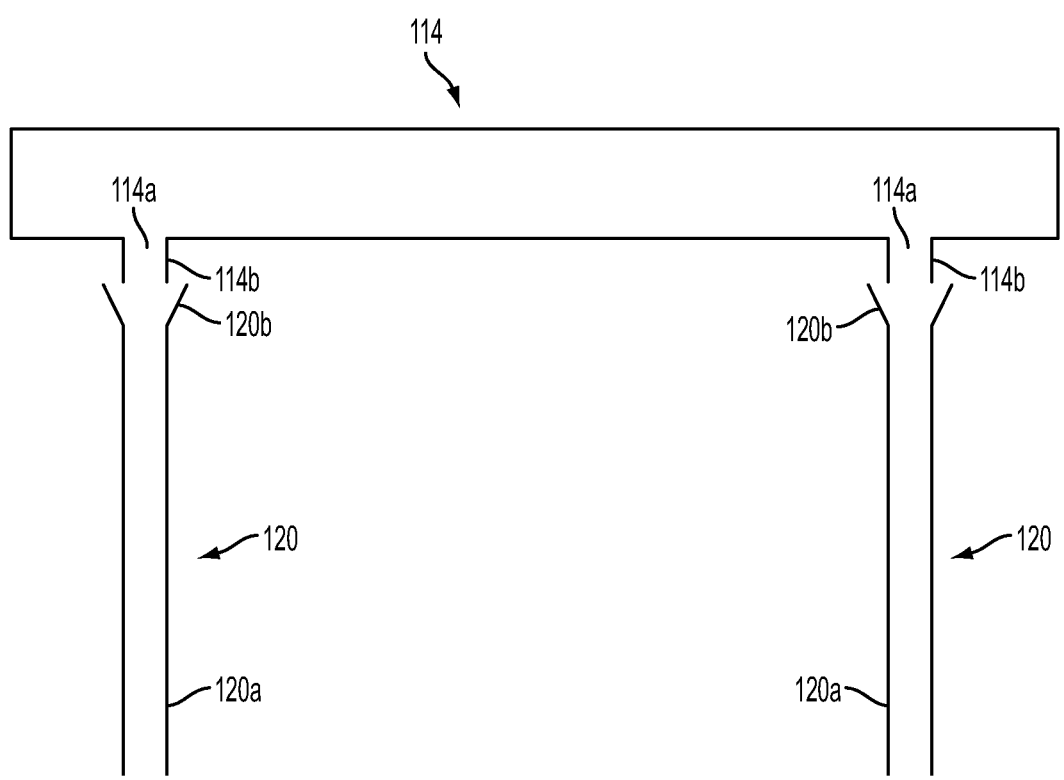
FIG. 21C is a schematic of the lower rail and water drainage receiving conduits of the slider window assembly of the present invention.

Optionally, and as shown in FIG. 21B, a water drainage receiving conduit 120' may comprise a closed conduit, with its passageway 120f' provided within the conduiting portion 120a'. An inner wall 120c' of conduit 120' provides the attaching surface for attaching or adhering or bonding the conduit 120' to the inner surface 116b of the window panel 116. Optionally, the inner wall 120c' may include bumps or protrusions 120d' to establish the desired or appropriate bond-line thickness for an adhesive 120e' disposed between the inner wall 120c' and the inner surface 116b of window panel 116. Although shown and described as comprising generally semicircular-shaped conduits and cup-shaped receiving portions, clearly the water drainage conduits of the present invention may comprise any suitable shape and may extend generally straight downward or at an angle or may be curved, while remaining within the spirit and scope of the present invention. As shown in FIG. 21B, the water drainage receiving conduit 120' is attached to the inner surface 116b of the fixed window panel 116, and the adhesive/sealant bead 121 is disposed around the perimeter of the fixed window panel 116 and over the conduiting portion 120a' of conduit 120', whereby the fixed window panel is adhered to the vehicle body 112'.

Figure 18A:
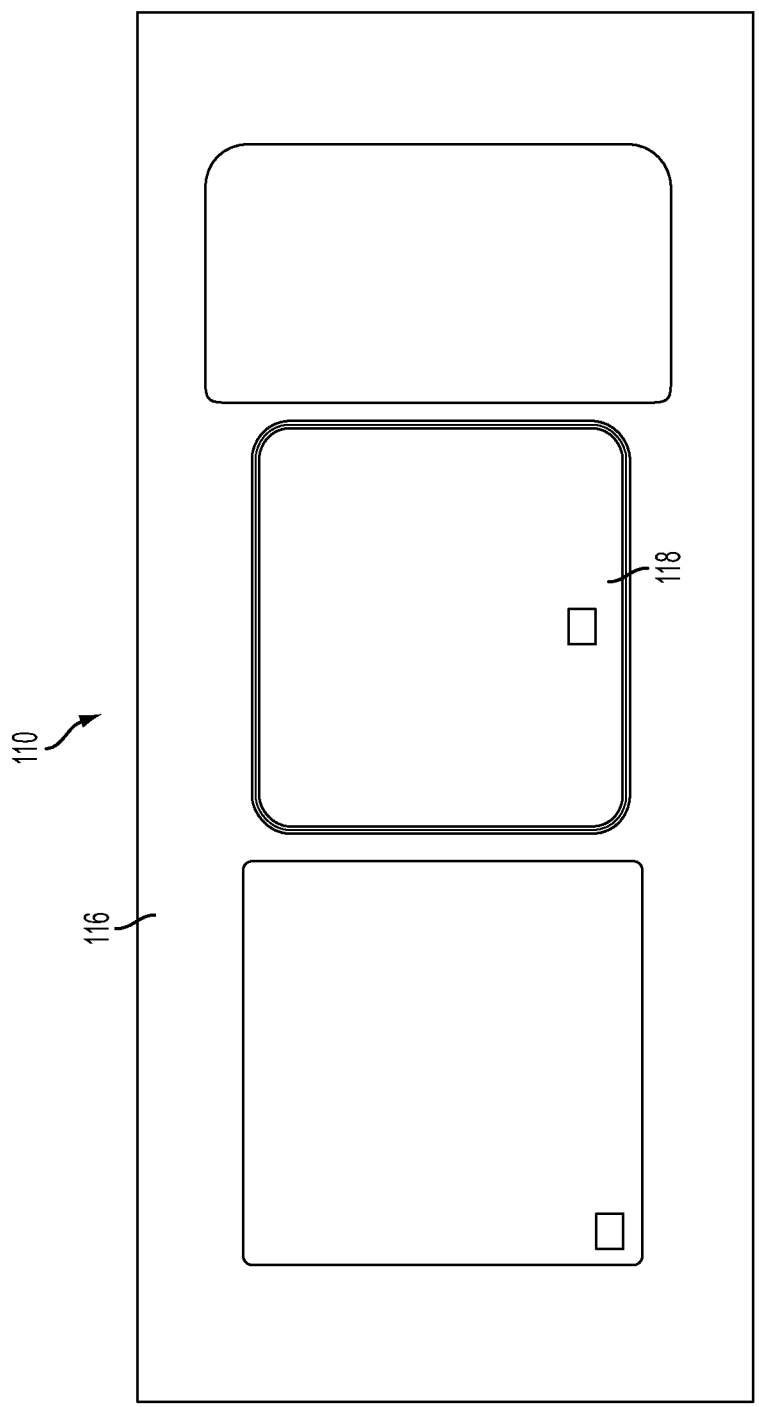
FIGS. 18A and 18B are exterior plan views of another slider window assembly suitable for use in a vehicle, with a movable window panel that moves along upper and lower channels or rails and with water drainage receiving conduits for guiding or channeling water that drains from the lower channel or rail.
Figure 18B:
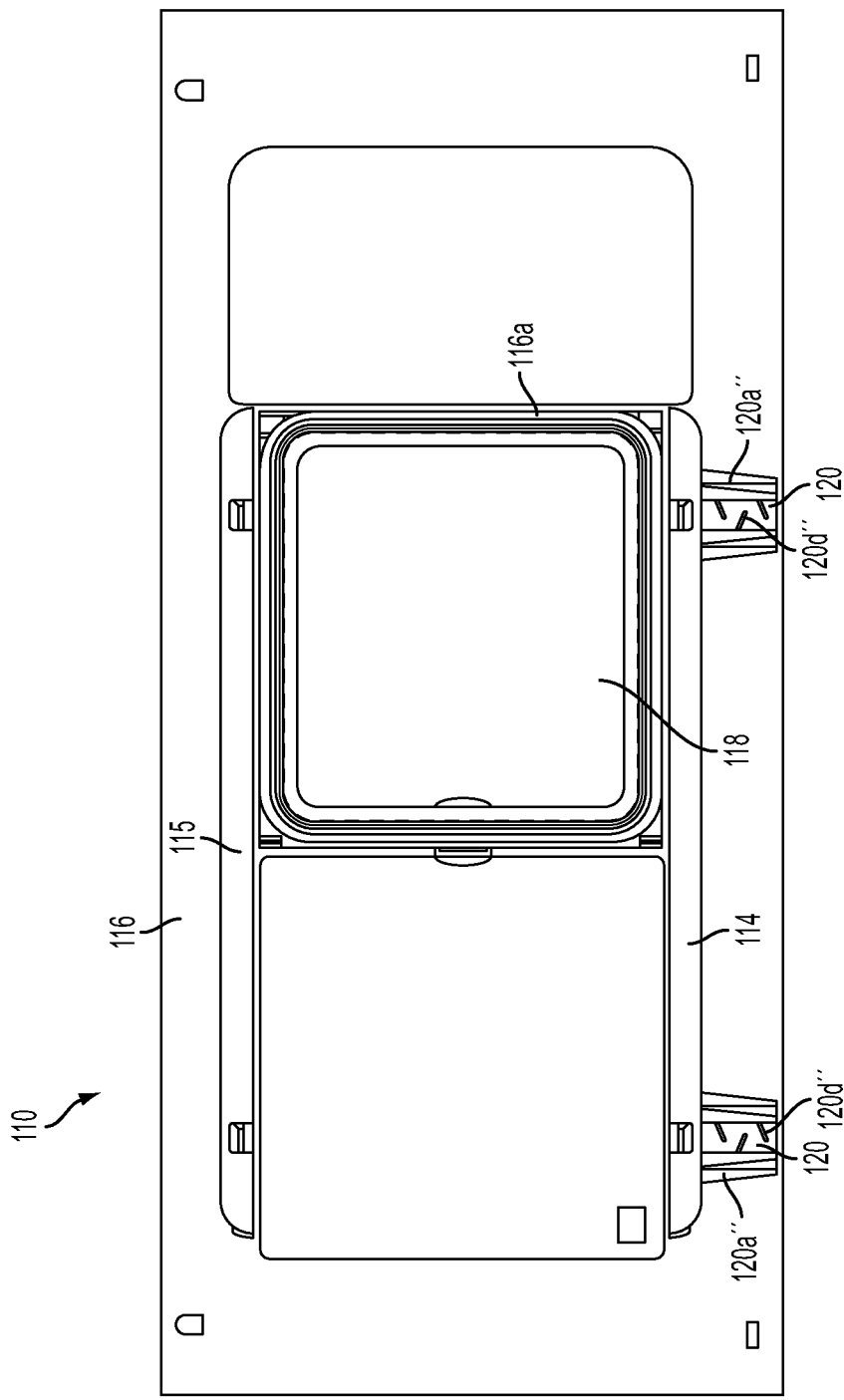
Figure 22:
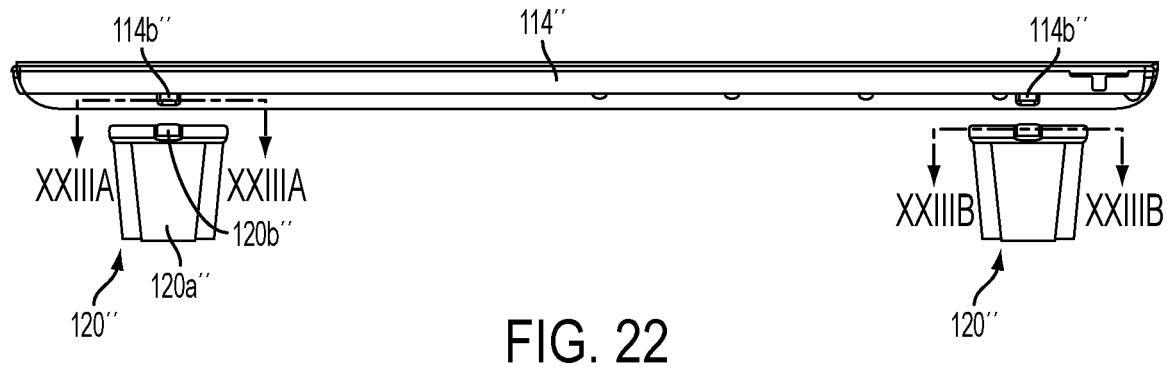
FIG. 22 is a partially exploded plan view of another lower rail and water drainage receiving conduits of the slider window assembly of the present invention.
Figure 23A:
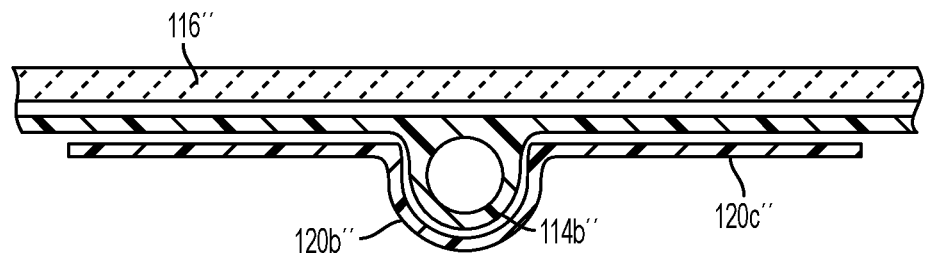
FIGS. 23A and 23B are sectional views of the lower rail and water drainage receiving conduits taken along the lines XXIIIA-XXIIIA and XXIIIB-XXIIIB, respectively.
Figure 23B:
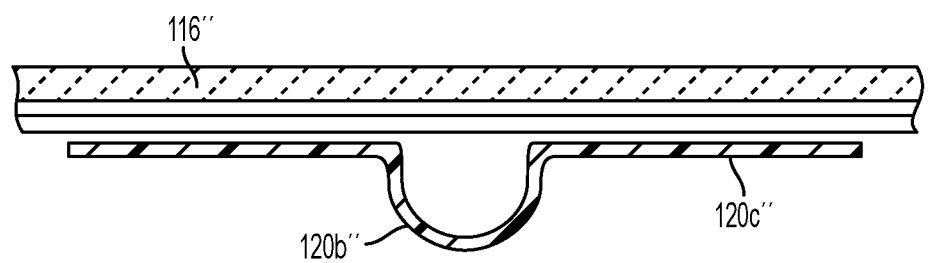
Figure 24:
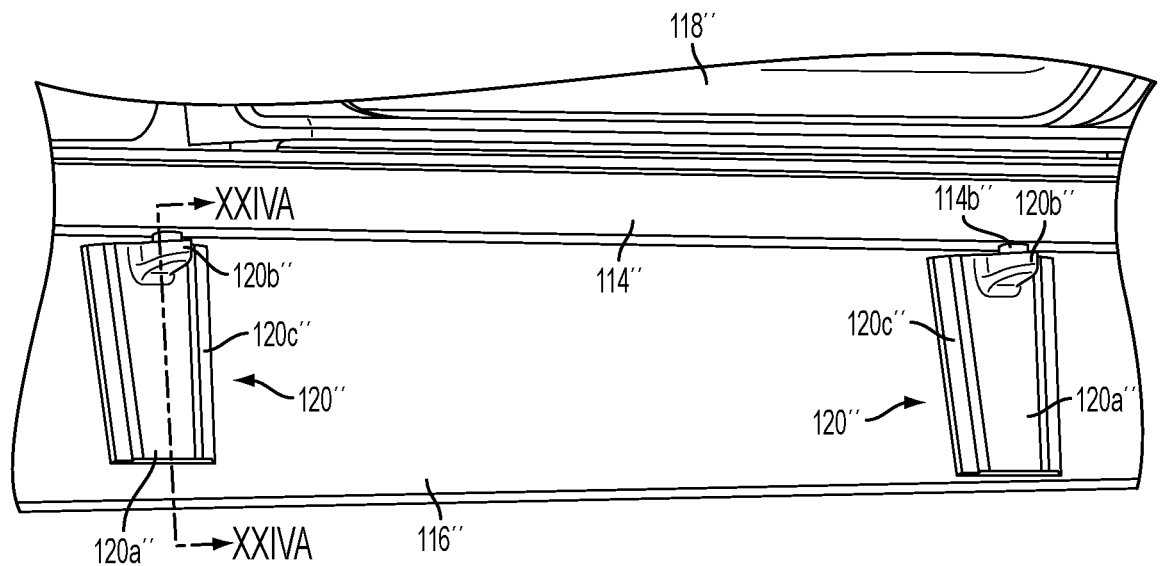
FIG. 24 is a perspective view of the lower rail and water drainage receiving conduits of the slider window assembly of the present invention.
Figure 24A:
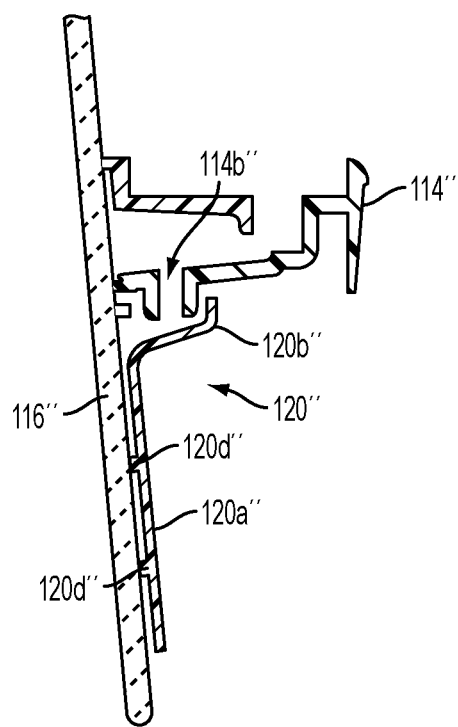
FIG. 24A is a sectional view of the lower rail and water drainage receiving conduits taken along the line XXIVA-XXIVA.
Figure 26:
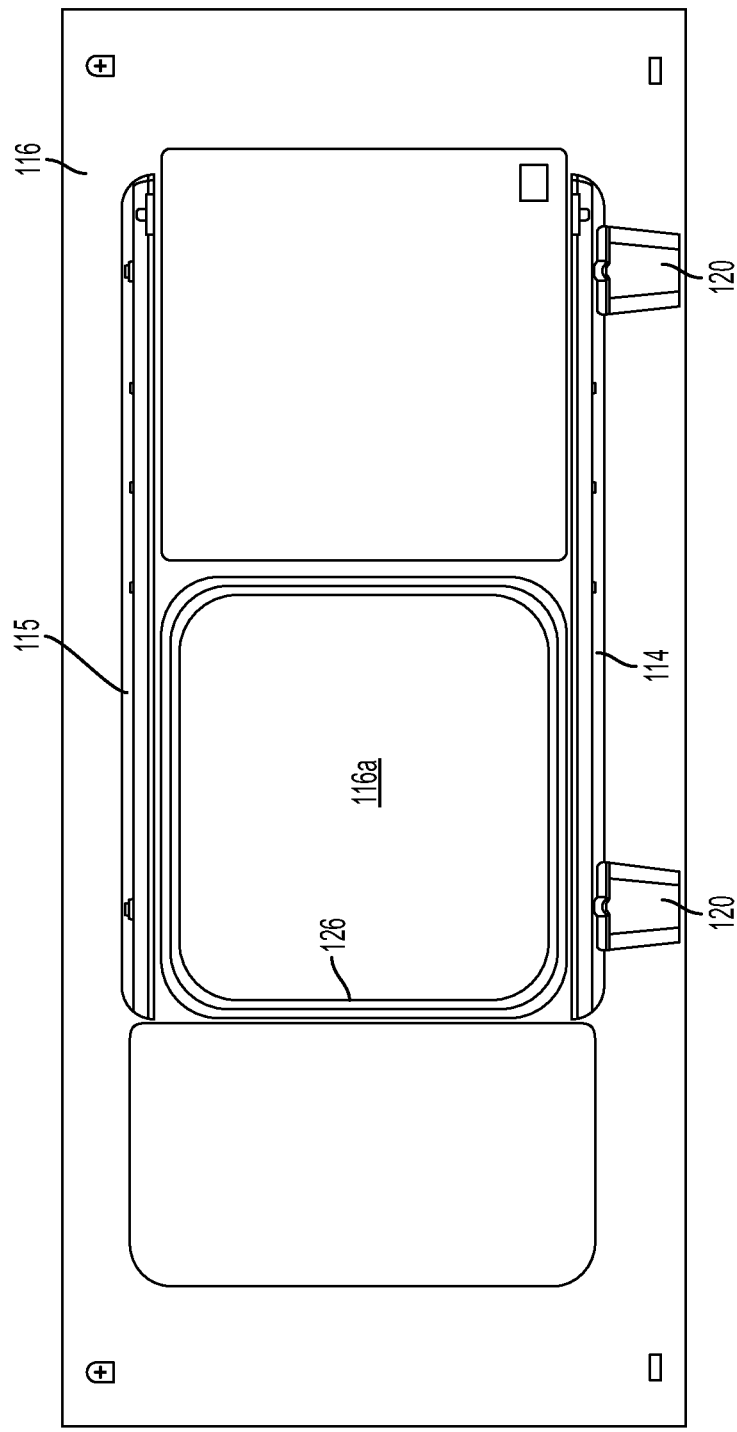
FIG. 26 is an interior plan view of the slider window assembly of FIG. 19, shown with the movable window panel assembly removed.
Figure 27:
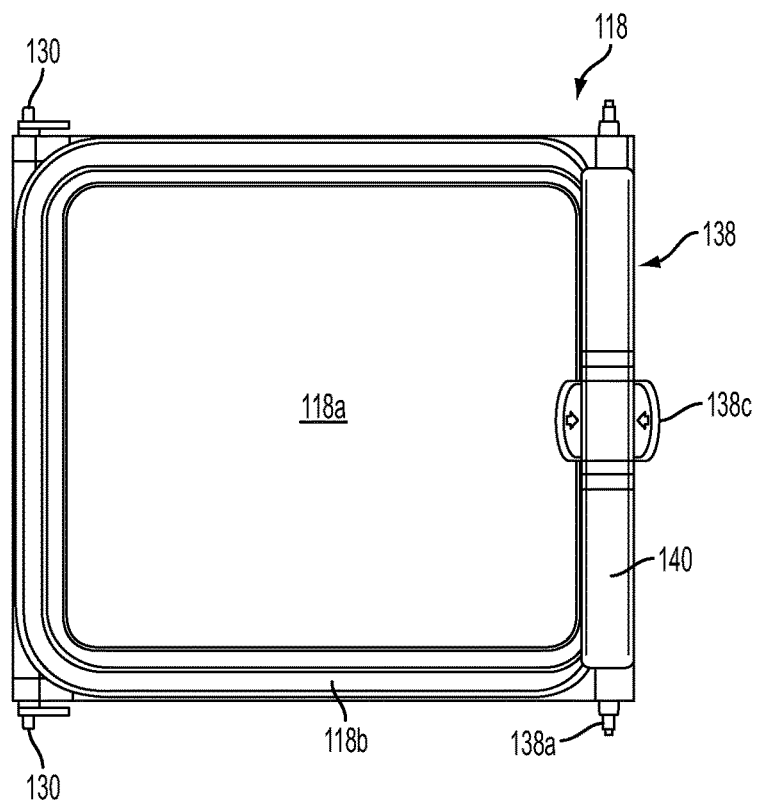
FIG. 27 is an interior plan view of the movable window panel assembly.

Optionally, and with reference to FIGS. 22-24A, a water drainage receiving conduits 120" comprise a conduiting or channeling or guiding portion 120a" and an upper receiving portion 120b". The receiving portion 120b" is shaped to be larger than the drainage hole extension 114b" of the lower rail 114" and is disposed below the drainage hole extension 114b" of the lower rail 114" so that water flowing or dripping through the drain hole and drainage hole extension 114b" is received in the receiving portion 120b" of water drainage receiving conduit 120". As shown in FIG. 22, the receiving conduits 120" may be spaced from and disposed below the drainage hole extensions 114b" so that there is not any physical contact or connection between the drainage extension 114b" of the rail 114" and the receiving end 120b" of drainage receiving conduit 120". Optionally, and as shown in FIGS. 24 and 24A, the receiving conduits 120" may be disposed below the drainage hole extensions 114b" and may partially receive the extensions 114b" with no physical contact or connection between the drainage extension 114b" of the rail 114" and the receiving end 120b" of drainage receiving conduit 120". Optionally, and as shown in FIGS. 18B and 24A, the conduiting portion 120a" may have baffles or guides 120d" established therein to guide the water through the conduiting portion 120a" to reduce or limit wind noise when the vehicle travels along a road or highway or the like.

As can be seen with reference to FIGS. 23A and 23B, the water drainage receiving conduit 120" may comprise a semi-circular receiving shape with its open side attached or adhered or bonded to the inner surface of the fixed window panel 116". In the illustrated embodiment, water drainage receiving conduit 120" includes a pair of attachment flanges or wings 120c" that provide a bonding surface for adhering or taping or affixing the conduit to the window panel, with the inner surface of the window panel 116" forming a wall or side of the conduit and with a passageway 120f" established along the conduit and between the inner surface 116b" of window panel 116" and the conduiting portion 120a" of drainage conduit 120". Optionally, the flanges or wings may include bumps or protrusions to establish the desired or appropriate bond-line thickness for an adhesive disposed between the flanges and the window panel (such as by utilizing aspects of the window assemblies described in U.S. Pat. Nos. 5,551,197 and 5,853,895, which are hereby incorporated herein by reference in their entireties). The water draining receiving conduit 120" and drainage hole extension 114b" may be otherwise similar to the water draining conduits and extensions discussed above.

Such a water shroud or water management configuration or drainage receiving conduit has many advantages over the previously proposed water passages. For example, the water drainage receiving conduits of the present invention allow the window manufacturer to make or form the rail and drainage receiving conduits out of different materials, such as by using a higher cost, more rigid engineering plastic or the like for the rail and a lower cost, optionally less rigid material (such as a polypropylene or the like) for the drainage receiving conduits (which do not have to support and guide the movable window panel like the lower rail does). Also, the water shroud or drainage receiving conduit configuration of the present invention allows for a universal rail for application to different windows of different lengths or widths, and allows for use of the lower rail as an upper rail as well. Thus, the present invention provides flexibility to the manufacturer to make and use universal or common rails for upper and lower applications and/or for different window applications.

As best shown in FIG. 20, the upper rail 115, lower rail 114 and water drainage receiving conduits 120 are adhered to the interior surface of the fixed window panel 116. For example, the rails may be bonded to the fixed glass panel using any suitable adhesive, such as a one component urethane adhesive, such as a moisture cured adhesive, such as BETASEAL™ or the like, while the water management shrouds or drainage receiving conduits 120 may also be bonded to the fixed glass panel using any suitable adhesive, such as a one component urethane adhesive, such as a moisture cured adhesive, such as BETASEAL™ or the like. Likewise, a pair of locating clips 122 may be bonded at an upper region of the fixed glass panel using any suitable adhesive, such as a one component urethane adhesive, such as a moisture cured adhesive, such as BETASEAL™ or the like. A pair of spacers 124 may be attached or adhered to a lower region of the fixed glass panel, such as via any suitable adhesive, such as via a double-sided tape or the like, and a seal 126 may be adhered or bonded at the opening 116a of the fixed window panel 116 via any suitable adhesive, such as via a double-sided tape or the like. A rail cover 128a may be mechanically attached to the lower rail 114 and a rail cover 128b may be mechanically attached to the upper rail 115, such as via snap elements or the like integrated into or formed with the rail covers 128a, 128b and/or the rails 114, 115.

As shown in FIG. 25, the movable window assembly 118 includes a window panel 118a, such as a glass window panel or polycarbonate window panel or the like, which is bonded to a frame portion 118b, such as via any suitable adhesive, such as a moisture cured adhesive, such as BETASEAL™ or the like. A pair of channel followers 130 are disposed at the upper and lower end regions of the frame portion 118b, and are biased outwardly away from the frame portion 118b via respective biasing elements or springs 132. Likewise, a pair of pins 134 are disposed at the upper and lower opposite end regions of the frame portion 118b, and are biased outwardly away from the frame portion 118b via respective biasing elements or springs 136. The channel followers 130 and pins 134 guide the movable window assembly 118 along the upper and lower rails 115, 114. The pin springs 132, 136 are inserted into the pins 134 and the channel followers 130, which are then inserted into mating holes on the frame portion 118b. The springs 132, 136 at all four corners of the frame portion 118b function to "float" the movable window assembly between the rails, thus centering the movable window assembly or module and reducing chucking movement when operating or opening/closing the movable window.

Figure 28:
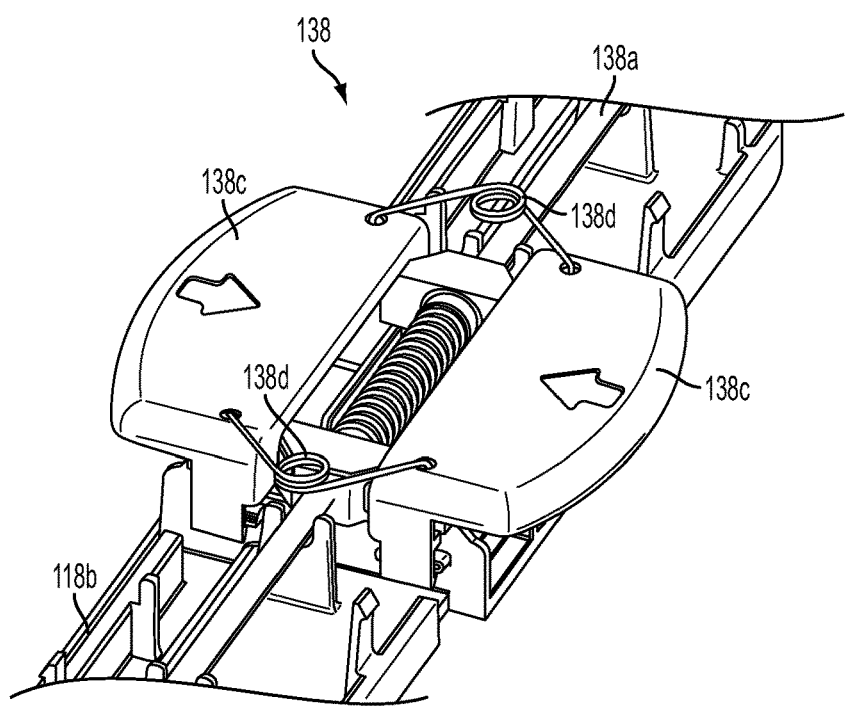
FIG. 28 is a perspective view of a latching mechanism for latching and releasing the movable window panel assembly relative to the upper and lower rails.
Figure 29:
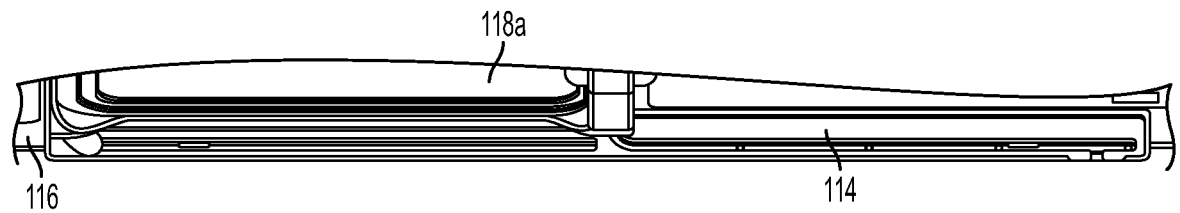
FIG. 29 is an interior plan view of the lower portion of the slider window assembly of FIGS. 18 and 19.
Figure 30:
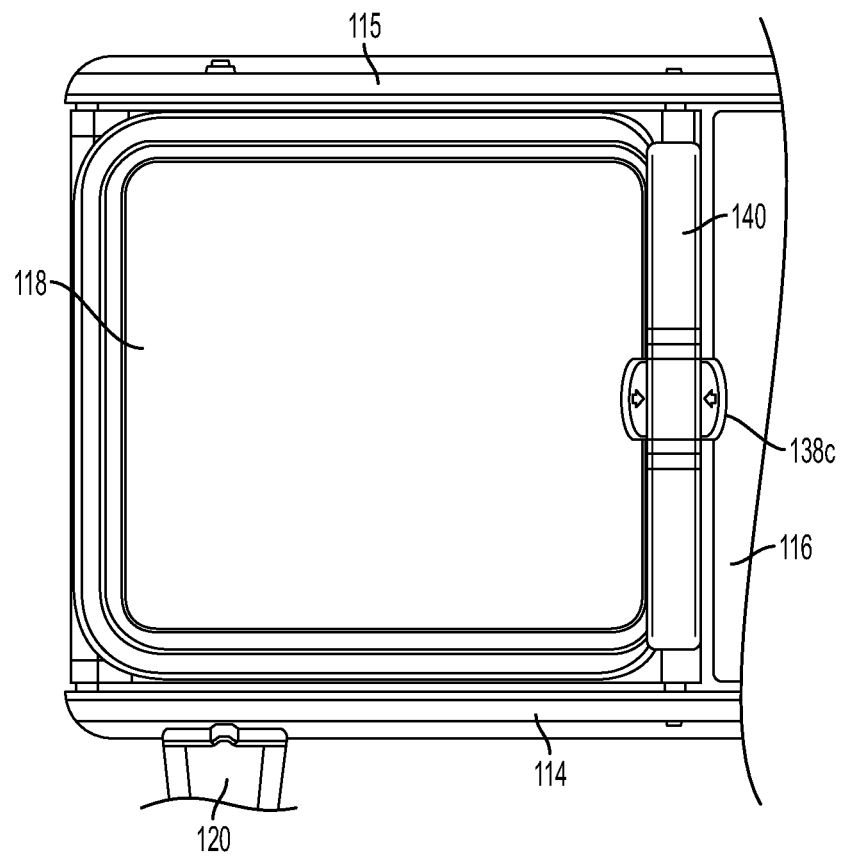
FIG. 30 is an interior plan view of the movable window panel assembly, shown in its closed position.

In the illustrated embodiment, the movable window assembly or module 118 includes a latching mechanism 138 that secures the movable window relative to the fixed rails and fixed window panel via insertion of detent pins 138a into apertures of the fixed rails 114, 115. In the illustrated embodiment, latching mechanism 138 includes the detent pins 138a, which are mounted at an end of the movable window frame portion 118b and which are biased outwardly (towards the respective rails) via a detent pin spring 138b. Latch buttons 138c are disposed at the detent pins 138a and spring 138b and, when squeezed by an operator or user of the window, function to pull the detent pins inward to disengage them from the rails to allow for sliding movement of the movable window 118 along the rails 114, 115 and fixed window panel 116. A biasing element or spring 138d (such as a leaf spring or torsional spring or the like) is disposed at latch buttons 138c to bias or hold the latch buttons outward, keeping the latch buttons from rattling when the movable window is in an open position between detent locking holes. A frame cover 140 may be mechanically attached, such as by snaps or the like, to the frame portion 118b. The springs 138d may be attached to the latch buttons 138c (such as shown in FIG. 28) or may be attached to the frame cover 140, such as via mechanically using barbs or spring interference to a rib on the cover. Thus, the detent pins 138a are guided into the frame through frame holes, and are separated and actuated by the detent pin spring 138b, which is held into place by the latch buttons 138c, which are mechanically attached though snaps or the like onto the frame 118b. As best seen in FIG. 29, when the movable window is closed, the channel followers 130 are driven in towards the fixed glass panel 116, providing a means of securing the non-latched portion of the movable window to reduce or substantially preclude forced entry.

Thus, the present invention provides a movable slider window assembly with a movable window that is moved along rails between an opened and closed position relative to a fixed window panel and aperture or opening formed through the fixed window panel (such as by utilizing aspects of the window assemblies described in U.S. Pat. Nos. 8,322,073; 8,048,529; 7,838,115; 7,332,225; 6,846,039; 6,319,344; 6,068,719 and 5,853,895, which are all hereby incorporated herein by reference in their entireties). The fixed window panel is adhered or bonded to the vehicle body and the window assembly includes separate water drainage receiving conduits for channeling or guiding water draining from the lower rail through the adhesive or sealant bead between the fixed window panel and the vehicle body to drain water from the window assembly. The rails and channel followers and pins function to guide the movable window along the rails and toward the fixed window panel when the movable window is moved to its closed position. The movable window panel thus is movable along the rails and moves between an opened position, where the movable window is disposed inward of the fixed window panel, and a closed position, where the movable window is disposed at the opening in the fixed window panel and at least partially in the opening to provide a generally flush or continuous exterior surface of the fixed and movable window panels when the movable window panel is closed.

Figure 31:
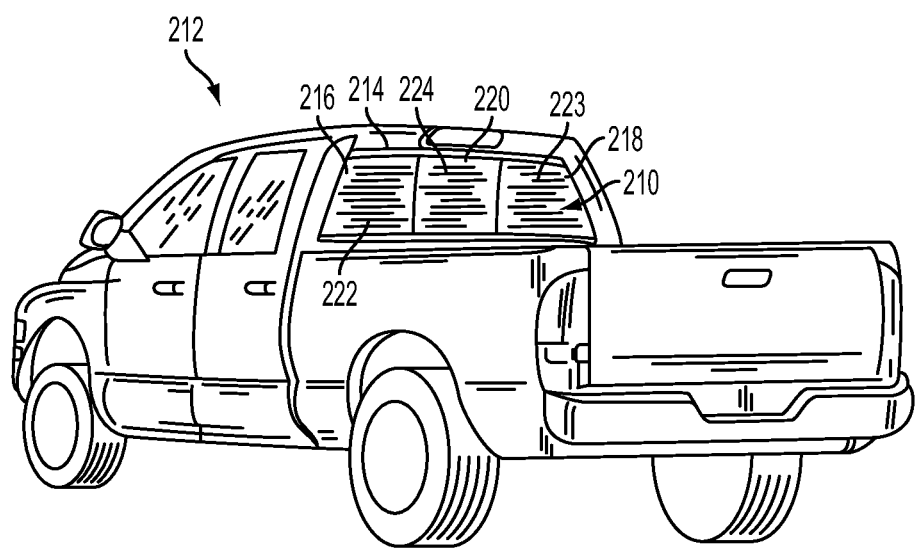
FIG. 31 is a rear perspective view of a pickup truck having a rear slider window assembly in accordance with the present invention.
Figure 32:
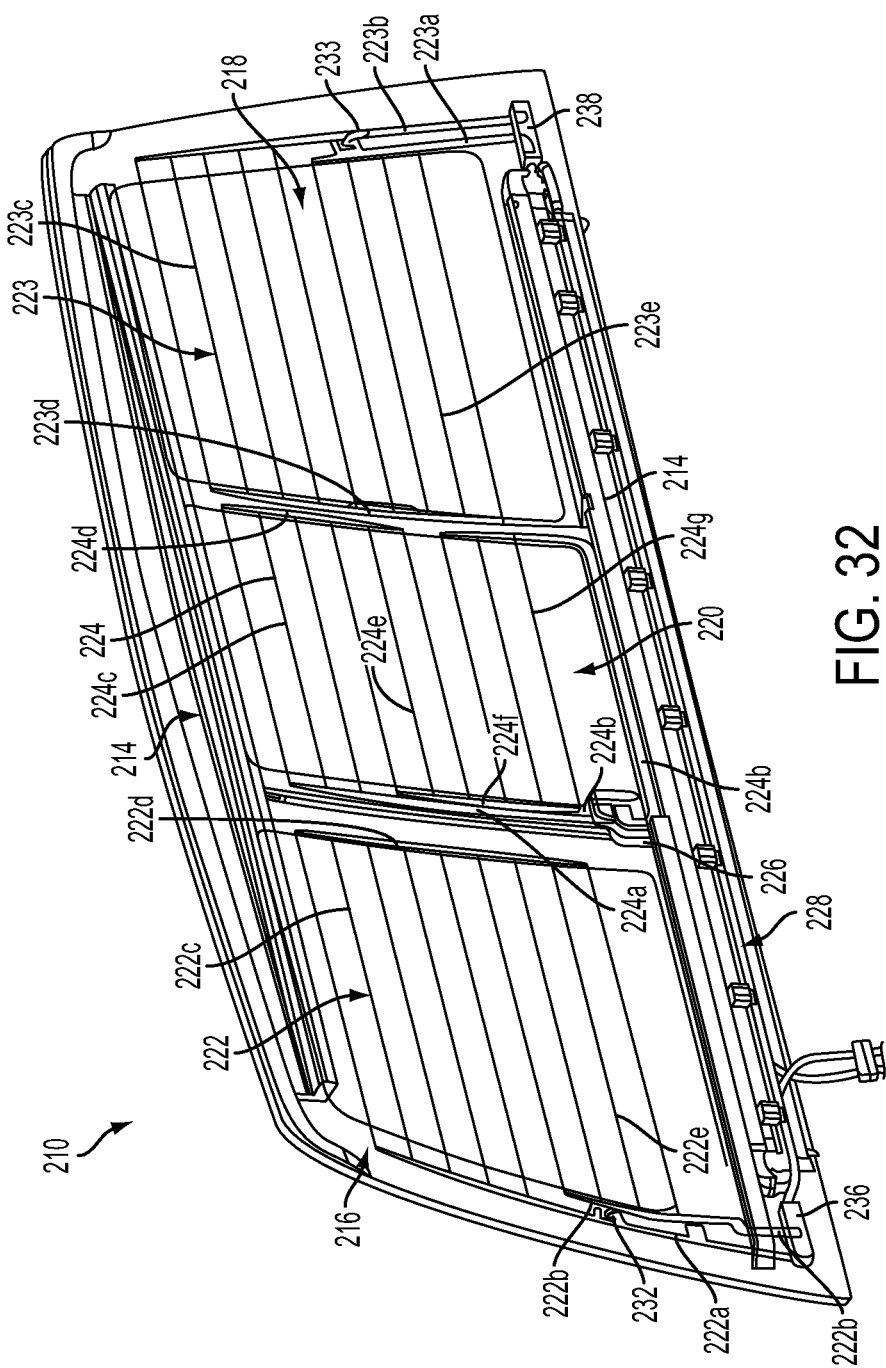
FIG. 32 is a perspective view of the rear slider window assembly of the present invention, as viewed from the forward or interior side of the window assembly when the window assembly is normally mounted to a vehicle.

Referring now to FIGS. 31 and 32, a rear slider window assembly 210 of a vehicle 212 (such as a pickup truck or the like) includes a window frame 214, a pair of side fixed window panels 216, 218 and a movable window panel 220 that is movable relative to frame 214 and fixed window panels 216, 218 between an opened position and a closed position. Fixed window panels 216, 218 each include an electrically conductive heater grid 222, 223 or other heating element or electrically operable element established at the window panels (such as at or on an interior surface of the window panels) and movable window panel 220 includes an electrically conductive heater grid or other heating element or electrically operable element 224 established at the window panel (such as at or on an interior surface of the movable window panel). The heater grids 222, 223 are electrically conductively connected to (or are otherwise in electrical conductive continuity with) a power source of the vehicle and may be powered (such as responsive to a user actuatable input or switch or button of the vehicle or responsive to a sensor or accessory of the vehicle) to heat or defrost or defog the fixed window panels 216, 218. Movable panel heater grid 224 is electrically connected to the power source (and may be electrically connected to electrical terminals or elements at one of the heater grids 222, 223 of the fixed window panels) and may be electrically powered to heat or defrost or defog the movable window panel 220, as discussed below. Heater grids 222, 223, 224 comprise a plurality of electrically conductive traces that extend across the respective window panels 216, 218, 220 between respective busbars to provide enhanced and more uniform heating and defrosting/defogging of the window panel, as also discussed below.

Heater grid 224 of movable window panel 220 is powered in a manner that allows for heating or defogging or defrosting of the movable window panel irrespective of whether the movable window panel is opened or partially opened or closed, as discussed below. In the illustrated embodiments, the electrical connection between the vehicle power source or fixed panel heater grid 222 is electrically connected to movable panel heater grid 224 via a flexible connector or wire or cable 226, and fixed panel heater grid 222 is electrically connected to fixed panel heater grid 223 via a jumper wire or cable 228, such as discussed below, and such as by utilizing aspects of the rear slider window assemblies described in U.S. Pat. No. 8,402,695, which is hereby incorporated herein by reference in its entirety. Optionally, the heater grid 224 of movable window panel 220 may be powered only when in its closed position and/or via any suitable powering means.

In the illustrated embodiment, window assembly 210 includes two fixed window panels 216, 218 that are spaced apart so as to define an opening therebetween. Slider or movable window panel 220 is movable along lower rail 214a and upper rail 214b of frame portion 214 to open and close the opening, such as in a manner similar to known slider window assemblies. Optionally, the slider window panel 220 may be disposed at a lower carrier that receives the lower perimeter edge region of the slider window panel 220 therein and that is slidably or movably received in the lower rail 214a of frame portion 214.

Optionally, the window assembly or assemblies of the present invention may utilize aspects of the window assemblies described in U.S. Pat. Nos. 8,402,695; 7,073,293; 7,003,916 and/or 6,691,464, and/or U.S. Publication Nos. US-2006-0107600; US-2008-0127563; US-2004-0020131 and/or US-2003-0213179 and/or U.S. provisional application Ser. No. 61/426,065, filed Dec. 22, 2010, which are all hereby incorporated herein by reference in their entireties.

The movable or slider window panel 220 may be movable such as via manual pushing or pulling at the window panel or in response to actuation of a drive motor of a drive motor assembly or system, which may move cables or the like to impart horizontal movement of the slider window panel 220 along the rails 214a, 214b, such as in a known manner. Optionally, the drive motor assembly may utilize aspects of the drive assemblies of the types described in U.S. Pat. Nos. 4,920,698; 4,995,195; 5,146,712; 5,531,046; 5,572,376; 6,119,401; 6,955,009 and/or 7,073,293, and/or U.S. Publication Nos. US-2004-0020131 and/or 2008-0127563, which are all hereby incorporated herein by reference in their entireties.

Heater grids 222, 223, 224 may comprise any suitable electrically conductive grids or coatings or layers established at the respective window panels. For example, the electrically conductive heater grids may comprise electrically conductive traces, such as electrically conductive silver flakes that are mixed with low melting glass and applied or screened as a thick film to a surface of the glass sheet for the window or to a ceramic frit layer on the surface of the glass sheet and then fired at a high temperature, such as in a known manner. The conductive material is established in a desired or appropriate pattern at the window panels, and a pair of terminals are established for electrically connecting a power source to the grid.

Although referred to herein as heater grids, clearly other types of traces or patterns or coatings or layers or elements may be disposed at the surface of the window panels, such as to heat the window panels when powered (or as discussed above, other electrical content may also or otherwise be established at the movable window panel and electrically connected to the vehicle power source and/or control depending on the particular application and desired or selected electrical content of the rear slider window assembly), while remaining within the spirit and scope of the present invention. For example, a conductive coating, such as a transparent conductive coating or the like, may be disposed at the surface of the window panels and may be heated when power is applied thereto (such as when power is applied to conductive traces or busbars that are electrically conductively connected to opposite regions of the transparent conductive coating).

In the illustrated embodiment, terminals 232, 233 at heater grids 222, 223, respectively are established at a perimeter region of each of the fixed window panels (such as the lower outer corner region of the fixed window panels and such as at a frit-coated perimeter region of the window panel), and the terminals 232, 233 (such as spade terminals or the like) are configured to electrically connect to connectors of a vehicle wire harness (not shown) or the like. For example, a power or hot or positive wire of the vehicle wiring may connect to terminal 232 at heater grid 222 of fixed window panel 216 and a ground or common wire of the vehicle wiring may connect to terminal 233 at heater grid 223 of fixed window panel 218 (or optionally both the positive and negative feeds of the vehicle wiring may connect to respective terminals at one of the heater grids 222, 223, while remaining within the spirit and scope of the present invention).

In the illustrated embodiment, electrical connection of the vehicle power source to heater grid 224 of movable window panel 220 is achieved via flexible cable or wiring 226. In the illustrated embodiment, electrical connection between the heater grid 224 of the movable window panel and the power source of the vehicle is established via flexible cable or wire 226 that is routed along the lower region of fixed window panel 216 and that is extendable or flexed as the movable window is moved towards its closed position and is retractable or flexed as the movable window is moved towards its opened position, such as discussed in greater detail below. For example, one end of the flexible cable 226 may connect to a pair of terminals or busbars at the fixed window panel 218 (where the terminals may be electrically conductively connected to busbars or terminals 222a, 222b of the heater grid 222 of fixed window panel 216, such as via respective metallic or otherwise electrically conductive traces established at the surface of the fixed window panel and between the respective terminals), while the other end of flexible cable 226 may connect to a pair of terminals or busbars 224a, 224b at movable window panel 220 (where the terminals are electrically conductively connected to or established with the heater grid 224 of movable window panel 220).

The heater grids 222, 223 of the fixed window panels 216, 218 are electrically conductively connected to (or are otherwise in electrical conductive continuity with) a power source of the vehicle and may be powered (such as responsive to a user actuatable input or switch or button of the vehicle) to heat or defrost or defog the fixed window panels 216, 218, while the heater grid 224 of movable window panel 220 is electrically connected to the power source via electrical connection to electrical terminals or elements at one of the heater grids of the fixed window panels (such as via flexible cable 226), and may be electrically powered to heat or defrost or defog the movable window panel 220 in a manner that allows for heating or defogging or defrosting of the movable window panel irrespective of whether the movable window panel is opened or partially opened or closed, such as in a similar manner as discussed above.

In the illustrated embodiment, heater grid 222 of fixed window panel 216 includes terminal or electrical connector 232 for connecting to a power feed (such as a positive or negative feed) of the vehicle, while heater grid 223 of fixed window panel 218 includes terminal or electrical connector 233 for connecting to another power feed (such as a negative or positive feed) of the vehicle, with the terminals 232, 233 being disposed at or near opposite perimeter regions or sides of the window assembly. Such an electrical connection to the vehicle power source may occur for applications where the vehicle may optionally have either a conventional fixed window without a center slider panel of a rear slider window assembly such as shown in FIG. 32. Window assembly 210 includes a jumper wire or cable or element 228 that established electrically conductive connection between the heater grids 222, 223 of fixed window panels 216, 218.

Figure 33:
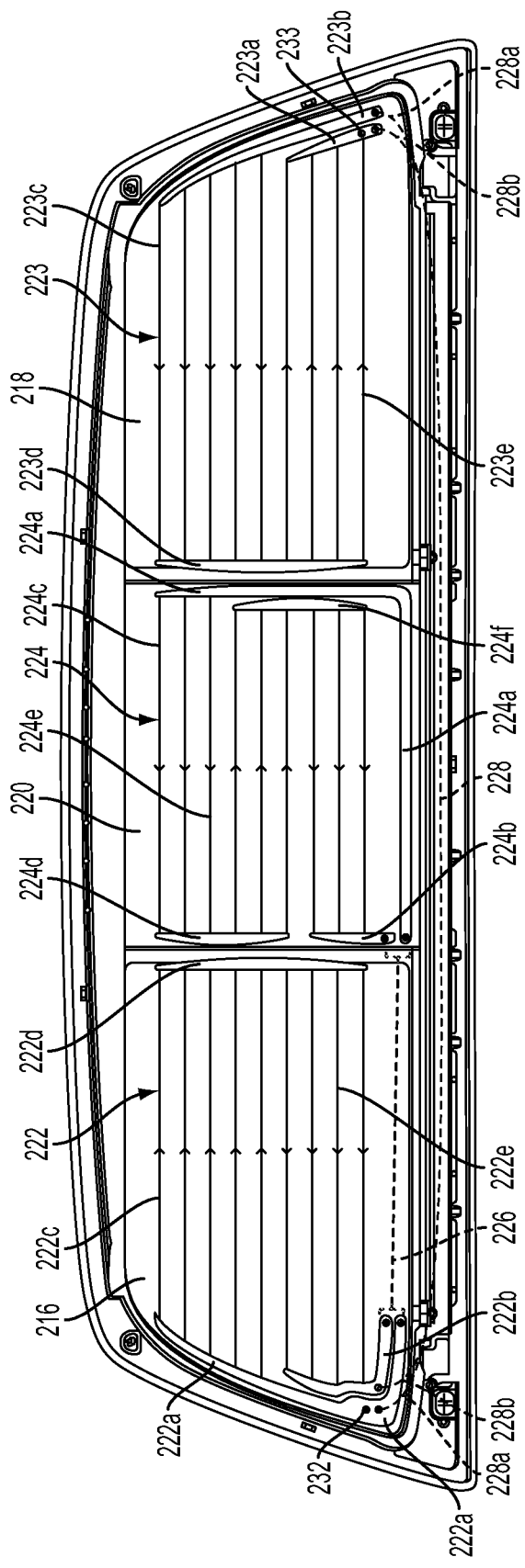
FIG. 33 is a plan view of another rear slider window assembly, similar to the rear slider window assembly of FIG. 32, shown with the flexible connector removed.
Figure 34:
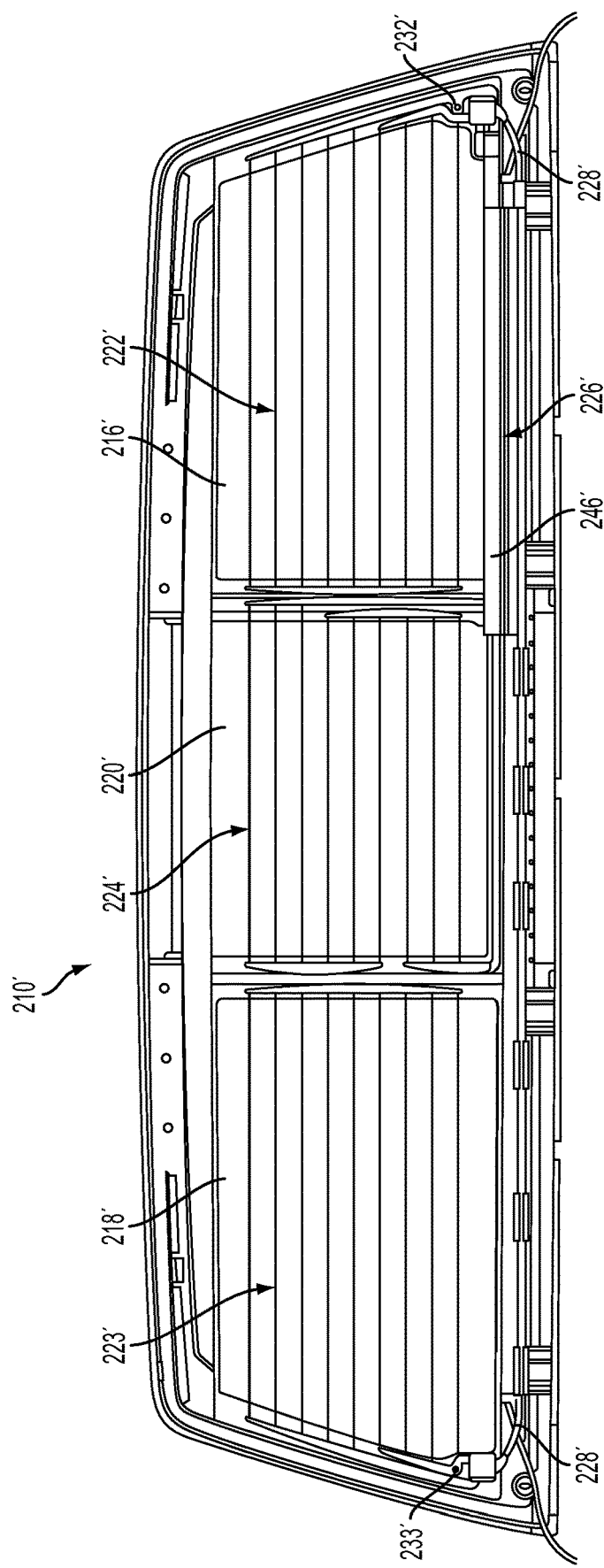
FIG. 34 is a plan view of another rear slider window assembly of the present invention, with a flexible cable or wire electrically connecting to the heater grid of the movable window panel in accordance with the present invention.
Figure 35:
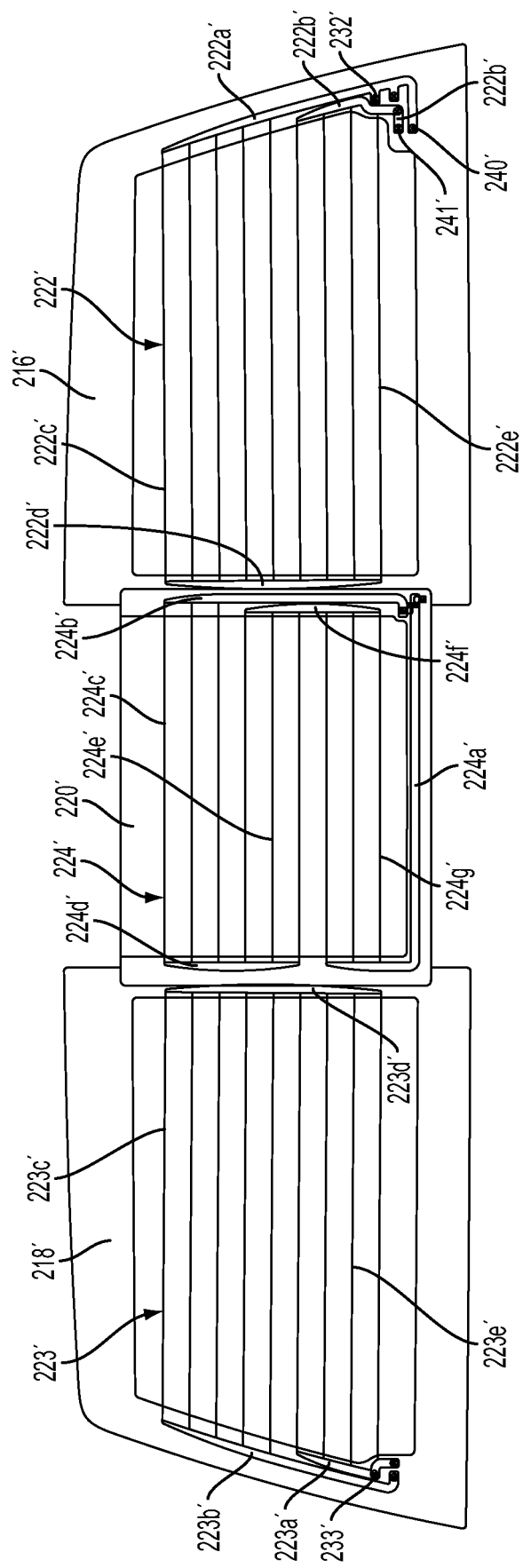
FIG. 35 is a plan view of the fixed and movable window panels of the rear slider window assembly of FIG. 34.

In the illustrated embodiment, jumper element 228 comprises a pair of wires 228a, 228b connected between opposite end connectors 236, 238. Jumper element 232 extends along the lower channel 214b of frame 214, with connector 236 attached or disposed at fixed window panel 216 and connector 238 attached or disposed at fixed window panel 218. As can be seen in FIG. 33, an end of one of the wire 228a at connector 236 (not shown in FIG. 33) may be electrically connected to an electrically conductive trace or busbar or terminal 222a of heater grid 222 (that may extend from or be near to or be electrically conductively connected to terminal 232 for connecting to the vehicle wiring harness when the window assembly is installed at a vehicle), while an end of the other wire 228b at connector 236 (not shown in FIG. 33) may be electrically connected to an electrically conductive trace or terminal 222b of heater grid 222 (that is at an opposite end or busbar of the heater grid or trace from the busbar 222a, as discussed below). Likewise, the opposite end of wire 228b at connector 238 is electrically connected to an electrically conductive trace or terminal 223a of heater grid 223 (that may extend from or be near to or be electrically conductively connected to terminal 233 for connecting to the vehicle wiring harness when the window assembly is installed at a vehicle), while the opposite end of the other wire 228a at connector 238 may be electrically connected to an electrically conductive trace or terminal 223b of heater grid 223 (that is at an opposite end or busbar of the heater grid or trace from the terminal or busbar 223a, as discussed below).

Thus, the jumper wire or element 228 provides electrical connection between a terminal of a heater grid at one of the fixed window panels (such as, for example, a positive terminal or busbar 222a at heater grid 222 at fixed window panel 216) and a terminal of a heater grid at the other of the fixed window panels (such as, for example, a negative terminal or busbar 223a at heater grid 223 at fixed window panel 218). Thus, each heater grid 222, 224 of fixed window panels 216, 218 is powered by electrical connection of a positive feed at a terminal on one side of the window assembly and a negative feed at a terminal on the other side of the window assembly. The rear slider window assembly thus may be mounted at a vehicle that has an electrical connection at opposite sides of the window assembly, such as may be provided for a single fixed panel window assembly.

Although shown and described as having a positive terminal at one fixed panel and a negative terminal at the other fixed panel and a jumper wire connecting between the heater grids of the fixed panels, it is envisioned that a jumper wire may be provided between heater grids of a window assembly that has both the positive and negative terminals established at one of the fixed window panels, with the jumper wire establishing electrically conductive connection or continuity between the heater grid with the terminals and the heater grid of the other fixed window panel (via electrically connecting to respective traces at the other fixed window panel), while remaining within the spirit and scope of the present invention. Likewise, although shown and described as having the jumper wire extend along the lower channel of the window assembly, clearly the jumper wire or element may be established at and along the upper channel of the window assembly or may be established in and along the upper or lower channel, or one wire or element may be established at or in and along the upper channel and another wire or element may be established at or in and along the lower channel, while remaining within the spirit and scope of the present invention. Although shown and described as having a flexible cable for establishing electrical connection between the heater grid of the movable window panel and the power source of the vehicle, it is envisioned that window assembly may include any other suitable means for establishing electrical connection between the heater grid of the movable window panel and the power source of the vehicle in a manner that allows for heating or defogging or defrosting of the movable window panel (or otherwise provides electrical power to an electrical element of the movable window panel) irrespective of whether the movable window panel is opened or partially opened or closed, such as via any of the optional means described herein.

The heater grids 222, 223, 224 of window assembly 210 provide for enhanced performance and more uniform heating via the routing of the heater traces and arrangement of the heater busbars at each of the respective window panels 216, 218, 220. In the illustrated embodiment of FIGS. 32 and 33, the heater grids 222, 223, 224 comprise one or more electrically conductive traces or busbars extending vertically along one perimeter side or region of the respective window panel 216, 218, 220 and two or more separate electrically conductive traces or busbars at the opposite perimeter side or region, with generally horizontal electrically conductive traces extending between and electrically conductively connecting the generally vertical traces or busbars. This configuration allows for the flow of electrical current along some of the heater traces to flow across the respective window panel in one direction and the flow of electrical current along others of the heater traces to flow across the respective window panel in the opposite direction, and results in more uniform heating of the heater traces to provide enhanced defogging or defrosting of the respective window panel during operation of the heater grids. The heater grids 222, 223, 224 of the window assemblies shown in FIGS. 32 and 33 are substantially similar in configuration and will not be separately discussed herein, with the terminals and lower busbars of the grids being configured differently for electrical connection to the jumper wires, flexible connectors and vehicle wiring harnesses of the particular applications of the window assemblies.

For example, and as can be seen in FIGS. 32 and 33, heater grid 222 of fixed window panel 216 has an input or positive feed electrically conductive trace or busbar 222a along its outer or outboard perimeter side or region (with positive feed busbar 222a extending downward below the horizontal traces or grids for jumper wire 228a to electrically connect to and for a lead of flexible cable 226 to electrically connect to), with a plurality of generally horizontal traces 222c extending from positive feed busbar 222a across fixed window panel 216 to an inboard busbar 222d that extends generally vertically along the inboard perimeter side or region of fixed window panel 216. A plurality of generally horizontal traces 222e extend from inboard busbar 222d and back across fixed window panel 216 to a second busbar 222b at outboard perimeter side or region of fixed window panel 216. In the illustrated embodiment, the positive feed busbar 222a is disposed along the outboard perimeter side or region of fixed window panel 216 with traces 222c extending across an upper region of fixed window panel, and the second busbar 222b is disposed along a lower perimeter outboard side region of fixed window panel 216 with traces 222e extending across a lower region of fixed window panel (with the second busbar 222b extending downward to establish the terminal or conductive trace for connection to the flexible connector 226 and the jumper cable 228). The jumper wires 228a, 228b, at connector 236, electrically connect to positive busbar 222a and to the second outboard or negative busbar 222b.

Similar to fixed window 216, fixed window panel 218 has a feed or input or positive electrically conductive trace or busbar 223b (to which jumper wire 228a, at connector 238 (not shown in FIG. 33), is electrically connected) and a second outboard or negative or ground electrically conductive trace or busbar 223a (at which terminal 233 is disposed and to which jumper wire 228b, at connector 238, is electrically connected), with a plurality of generally horizontal traces 223c extending from positive feed busbar 223b across fixed window panel 218 to an inboard busbar 223d that extends generally vertically along the inboard perimeter side or region of fixed window panel 218. A plurality of generally horizontal traces 223e extend from inboard busbar 223d and back across fixed window panel 218 to second outboard busbar 223a at the outboard perimeter side or region of fixed window panel 218. In the illustrated embodiment, the positive feed busbar 223b is disposed along the outboard perimeter side or region of fixed window panel 218 with traces 223c extending across an upper region of fixed window panel, and the second or negative busbar 223a is disposed along a lower perimeter outboard side region of fixed window panel 218 with traces 223e extending across a lower region of fixed window panel and with busbar 223a providing for terminal 233 and extending downward to establish a connection to jumper wire 228b at connector 238.

Similarly, heater grid 224 of movable window panel 220 comprises a positive feed electrically conductive trace or busbar 224a and a negative electrically conductive trace or busbar 224b, to which the end of flexible cable 226 is electrically connected, with one wire 228a of flexible cable 226 electrically connecting busbar 222a of fixed window panel 216 to busbar 224a of movable window panel 220 and another wire 228b of flexible cable 226 electrically connecting a busbar terminal of busbar 222b of fixed window panel 216 to busbar terminal or trace 224b of movable window panel 220. Heater grid 224 of movable window panel 220 includes a plurality of generally horizontal traces 224c (such as three traces) extending from a generally vertical portion of positive feed busbar 224a across movable window panel 220 to an opposite side busbar 224d that extends generally vertically along the opposite perimeter side or region of movable window panel 220. A plurality of generally horizontal traces 224e (such as three traces) extend from busbar 224d and back across movable window panel 220 to a second generally vertical busbar 224f at the first perimeter side or region of movable window panel 224 (with the conductive trace or busbar 224f being disposed generally parallel to and inboard of the generally vertical portion of busbar 224a). Further, in the illustrated embodiment, a plurality of generally horizontal traces 224g (such as three traces) extend from busbar 224f across movable window panel 220 to a generally vertical portion of busbar 224b. In the illustrated embodiment, the positive feed busbar 224a extends generally horizontally along a lower region of movable window panel 220 and extends generally vertically and at least partially along the opposite perimeter side of movable window panel 220, with one of the wires of the flexible cable 226 electrically connecting to the busbar terminal at the end of the horizontal portion of busbar 224a. The positive feed busbar 224a thus is disposed generally vertically along a trailing perimeter side or region of movable window panel 220 (the side that trails the window panel as the movable window panel is moved towards its opened position) with traces 224c extending across an upper region of fixed window panel, and the second busbar 224d is disposed along an opposite upper perimeter side region (the leading edge that leads the window panel as the movable window panel is moved towards its opened position) of movable window panel 220 with traces 224e extending back across a middle region of movable window panel, and the busbar 224f is disposed along the lower side region of the first or trailing side of the window panel with traces 224g extending across a lower region of the movable window panel to the busbar 224b disposed along the second or leading perimeter edge region of the movable window panel, and with the busbar 224b extending downward to provide a terminal or connection at a lower or bottom region of movable window panel 220 for connection to one of the wires of the flexible connector 226.

Thus, the heater grid configuration of the rear slider window assembly of the present invention allows for current flow across the window panels between at least one busbar on one side of each window panel and at least two busbars on the opposite side of each window panel. The current flow on each window panel thus may flow along an input or feed busbar and across the window panel to another busbar and then back across the window panel to a third busbar that is generally at or near or adjacent to the first or input or feed busbar. Thus, each heater grid of the respective window panel provides enhanced current flow across the respective window panel and a more uniform or even defogging or defrosting pattern and allows for narrower generally vertical busbars along each side of the window panel.

Referring now to FIGS. 34-41, a rear slider window assembly 210' includes fixed window panels 216', 218' and a movable window panel 220', with heater grids 222', 223', 224' established thereat, such as in a similar manner as discussed above. The heater grids 222', 223', 224' and jumper wire or cable 228' of window assembly 210' are substantially similar to the heater grids 222, 223, 224 and jumper wire or cable 228 of window assembly 210, discussed above, such that a detailed discussion of the heater grids and jumper wires need not be repeated herein. The similar or common elements of the heater grids and jumper wires are referenced in FIGS. 34-41 with similar reference numbers as used in FIGS. 32 and 33.

In the illustrated embodiment, window assembly 210' includes a flexible connector 226' that comprises a pair of flat wires 236', 237' that flex in one direction (such as in a horizontal direction in FIGS. 36-41), while limiting flexing in the other direction (such as in a vertical direction in FIGS. 36-41). In the illustrated embodiment, one end 236a', 237a' of the wires 236', 237' of flexible cable 226' are connected to a pair of terminals or busbars 222a', 222b' at the fixed window panel 216' (where the ends 236a', 237a' of the wires 236', 237' may be electrically conductively connected to busbars or terminals 222a', 222b', respectively, of the heater grid 222' of fixed window panel 216', such as via respective metallic or otherwise electrically conductive traces established at the surface of the fixed window panel and between the respective terminals), while the other end 236b', 237b' of wires 236', 237' of flexible cable 226' may connect to a pair of terminals or busbars 224a', 224b', respectively, at movable window panel 220' (where the terminals are electrically conductively connected to or established with the heater grid 224' of movable window panel 220', such as discussed above).

Figure 36C:
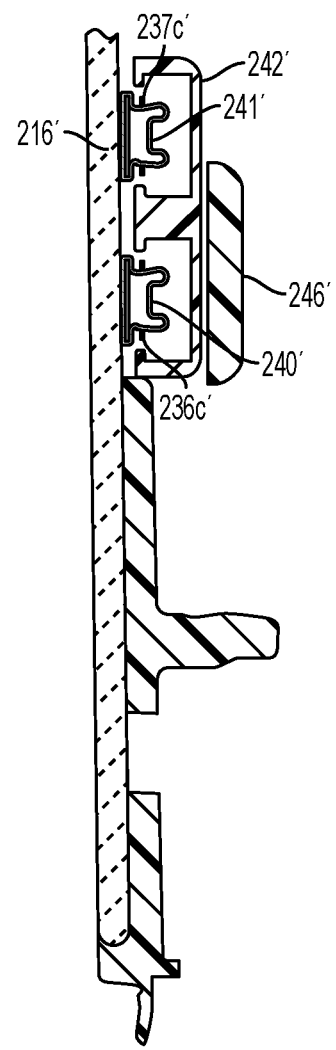
FIG. 36C is another sectional view of the lower region of the rear slider window assembly taken along the line C-C in FIG. 36.
Figure 37:
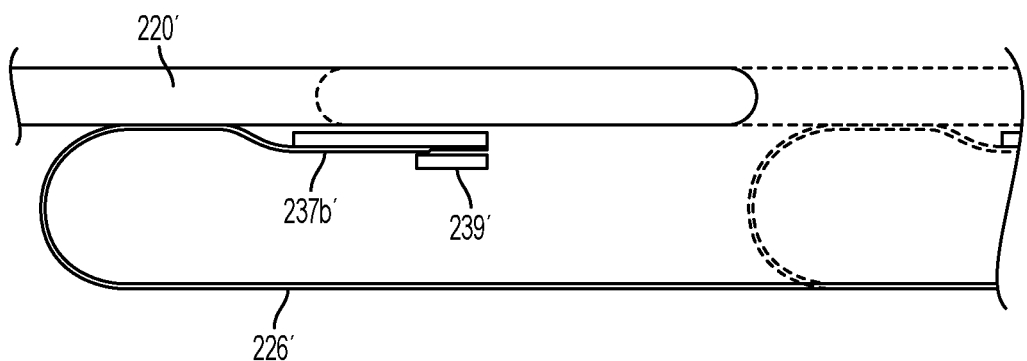
FIG. 37 is a partial sectional view of the movable window panel and flexible cable that electrically connects to the heater grid of the movable window panel of the rear slider window assembly of FIG. 34.
Figure 38:
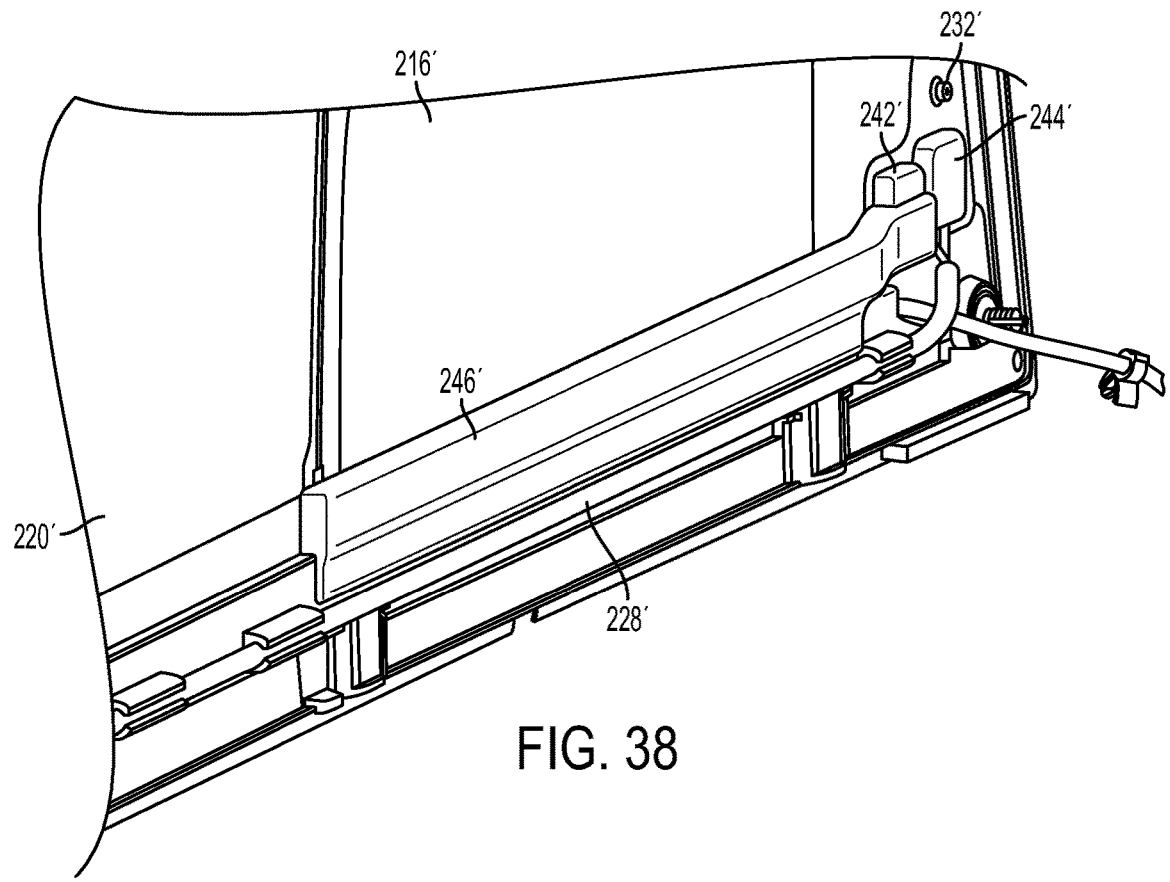
FIG. 38 is an enlarged perspective view of the lower region of the rear slider window assembly of FIG. 36.
Figure 39:
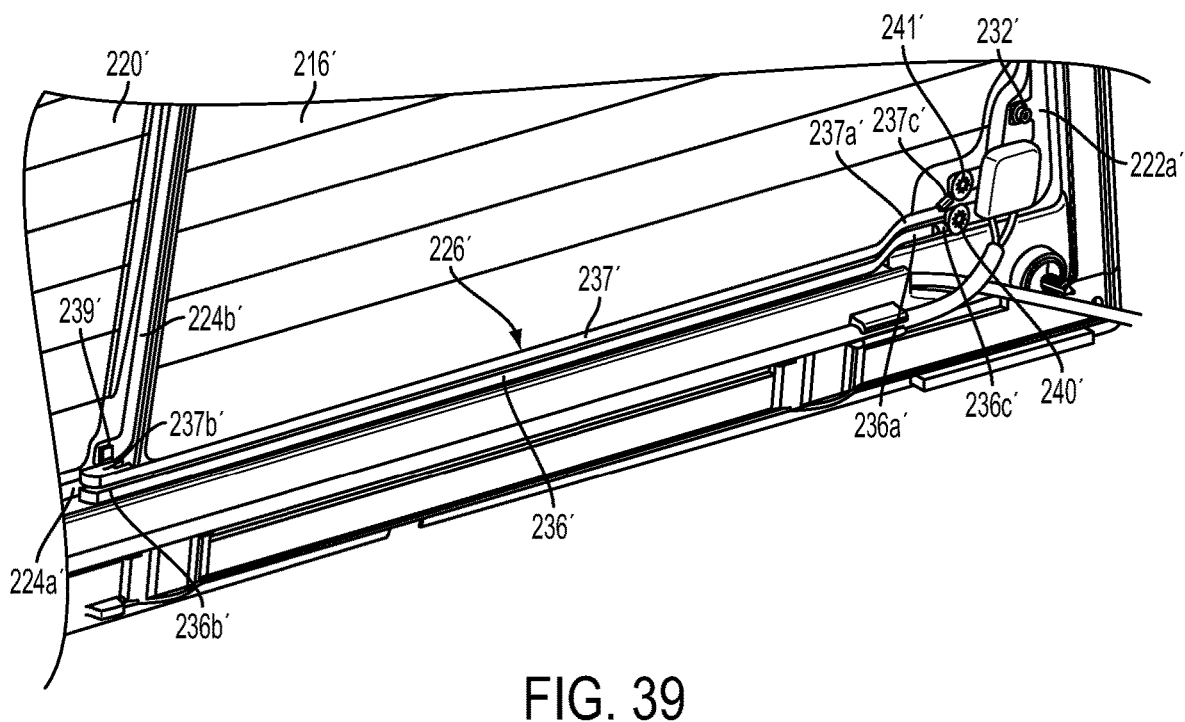
FIG. 39 is another enlarged perspective view of the lower region of the rear slider window assembly of FIG. 36, shown with the cover removed to show additional details of the flexible cable and electrical connections at the fixed and movable window panels.

As shown in FIG. 37, ends 236b', 237b' of wires 236', 237' may be electrically connected at terminals 224a', 224b' of heater element 224' of movable window panel 220' (such as via any suitable electrical connection means, such as via having the ends 236b', 237b' received in and crimped or clamped via electrical connectors or elements 238', 239' soldered or attached at terminals 224a', 224b', or such as via soldering the ends 236b', 237b' of the wires directly to the terminals or busbars at the movable window panel or the like). When attached at terminals 224a', 224b' of heater element 224' of movable window panel 220', flexible connector 226' may extend partially along the lower region of movable window panel 220' from the electrical connections at terminals 224a', 224b', and the flexible connector 226' may flex or bend so that the flexible connector reverses direction and is routed back over the connections at terminals 224a', 224b' and extends towards the terminals 222a', 222b' of heater grid 222' at fixed window panel 216'. The ends 236a', 237a' of wires 236', 237' may be connected to terminals 222a', 222b' via any suitable electrical connection means, such as via having terminal connectors or elements 236c', 237c' that connect to or receive conductive posts or elements 240', 241' (FIGS. 36C and 39) established or soldered or attached at terminals 222a', 222b' (so as to provide a solderless connection between the flexible cable and the conductive posts) or the electrical connection means may comprises soldering or otherwise attaching the ends of the flexible wires directly to the terminals or busbars at the fixed window panel. Optionally, a cover element 242' may be provided at the ends 236a', 237a' of the flexible connector or cable 226' to encase and conceal and protect the electrical connections at the terminals 222a', 222b'. Similarly, a cover element 244' may be provided at the ends of the jumper wire 228' that connect to the terminals 222a', 222b' of heater grid 222' of fixed window panel 216' to encase and conceal and protect the electrical connections at the terminals 222a', 222b'.

Figure 36A:
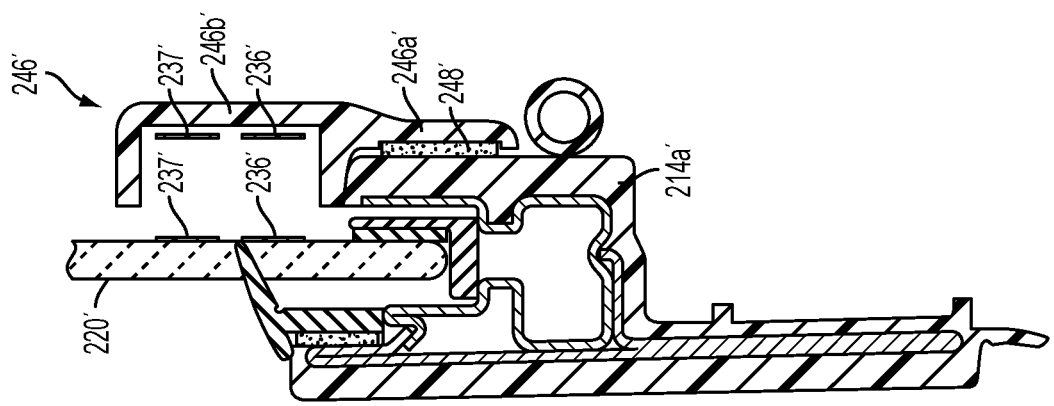
FIG. 36A is a sectional view of the lower region of the rear slider window assembly taken along the line A-A in FIG. 36.
Figure 36:
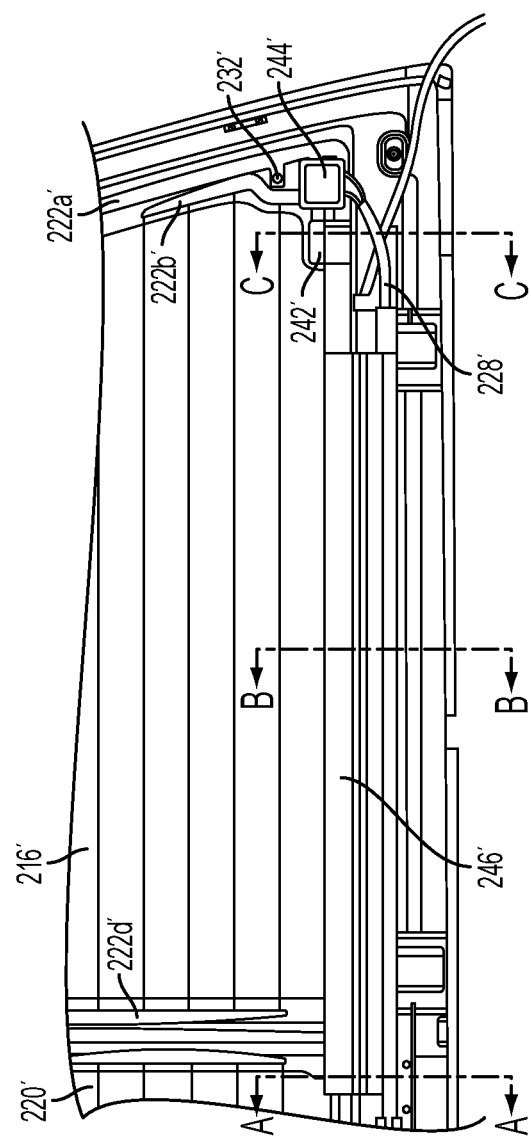
FIG. 36 is an enlarged plan view of a lower region of the rear slider window assembly of FIG. 34.
Figure 36B:
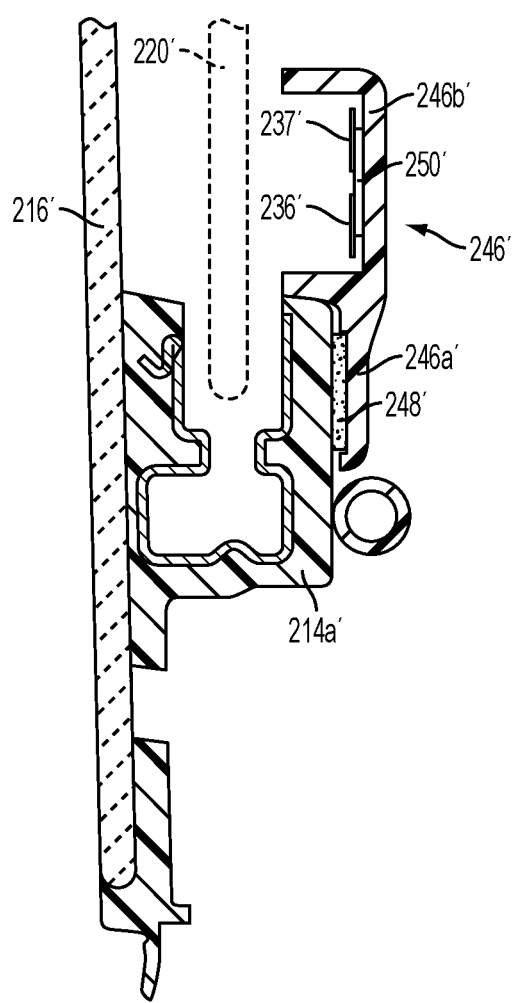
FIG. 36B is another sectional view of the lower region of the rear slider window assembly taken along the line B-B in FIG. 36.
Figure 40:
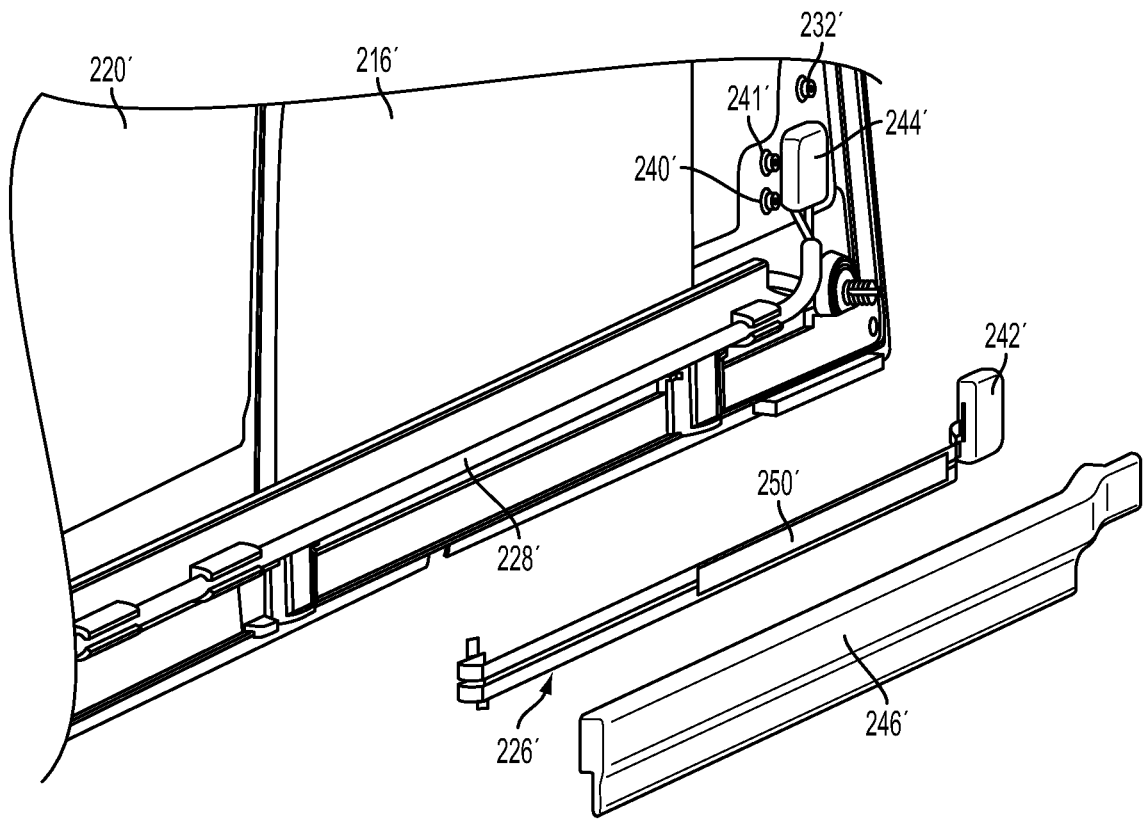
FIG. 40 is an exploded perspective view of the rear slider window assembly of FIG. 38.
Figure 41:
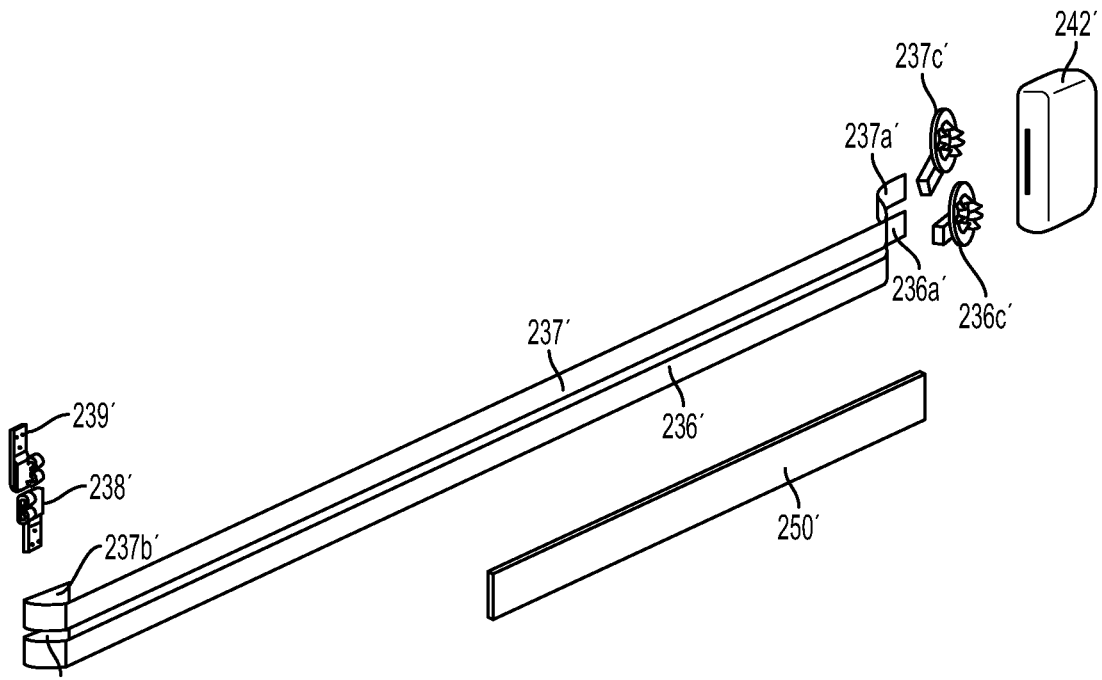
FIG. 41 is an exploded view of the flexible electrical connector and components for the rear slider window assembly of FIG. 38.
Figure 42:
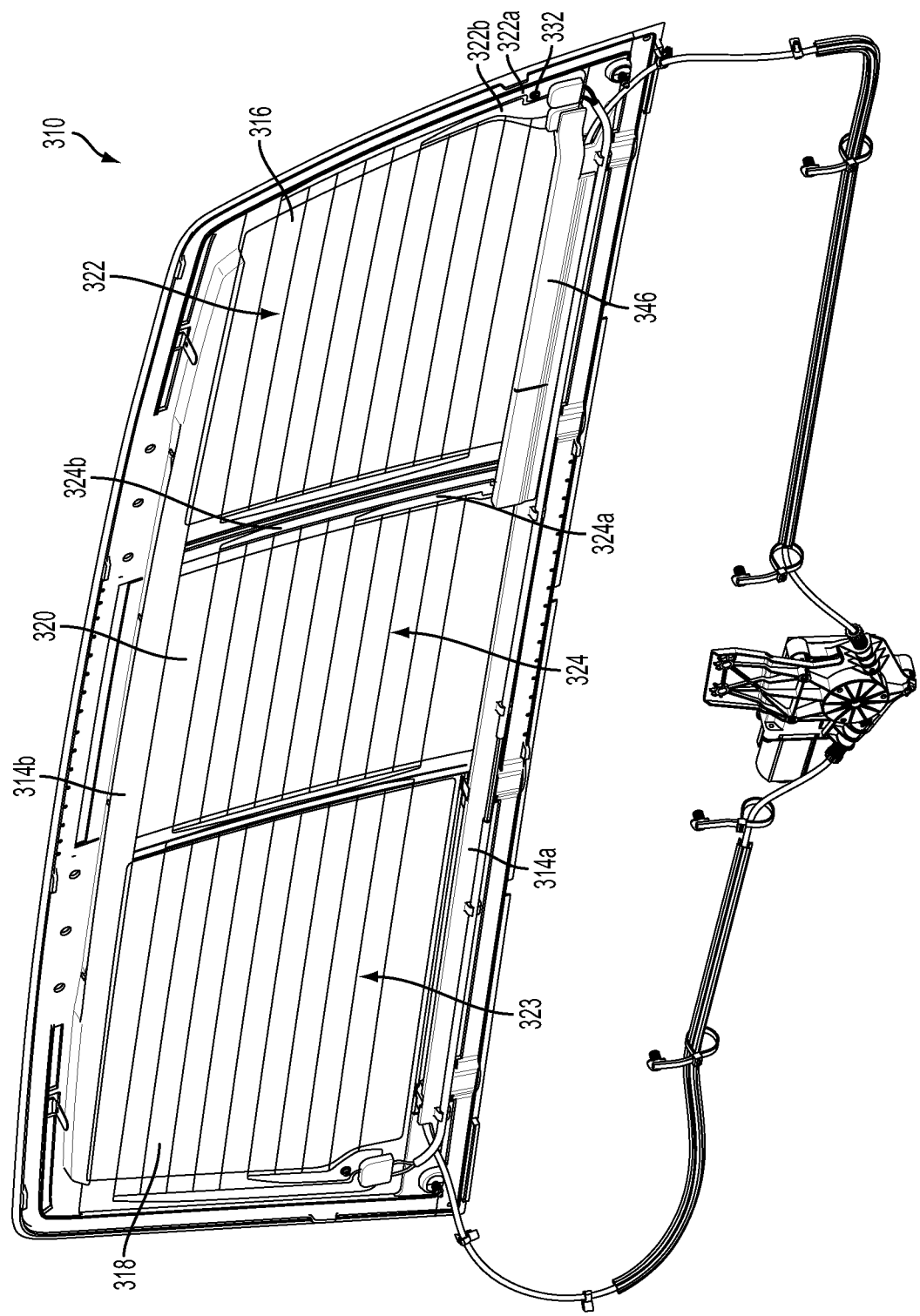
FIGS. 42 and 43 are rear perspective views of another rear slider window assembly of the present invention, with a flexible cable or wire electrically connecting to the heater grid of the movable window panel in accordance with the present invention.
Figure 43:
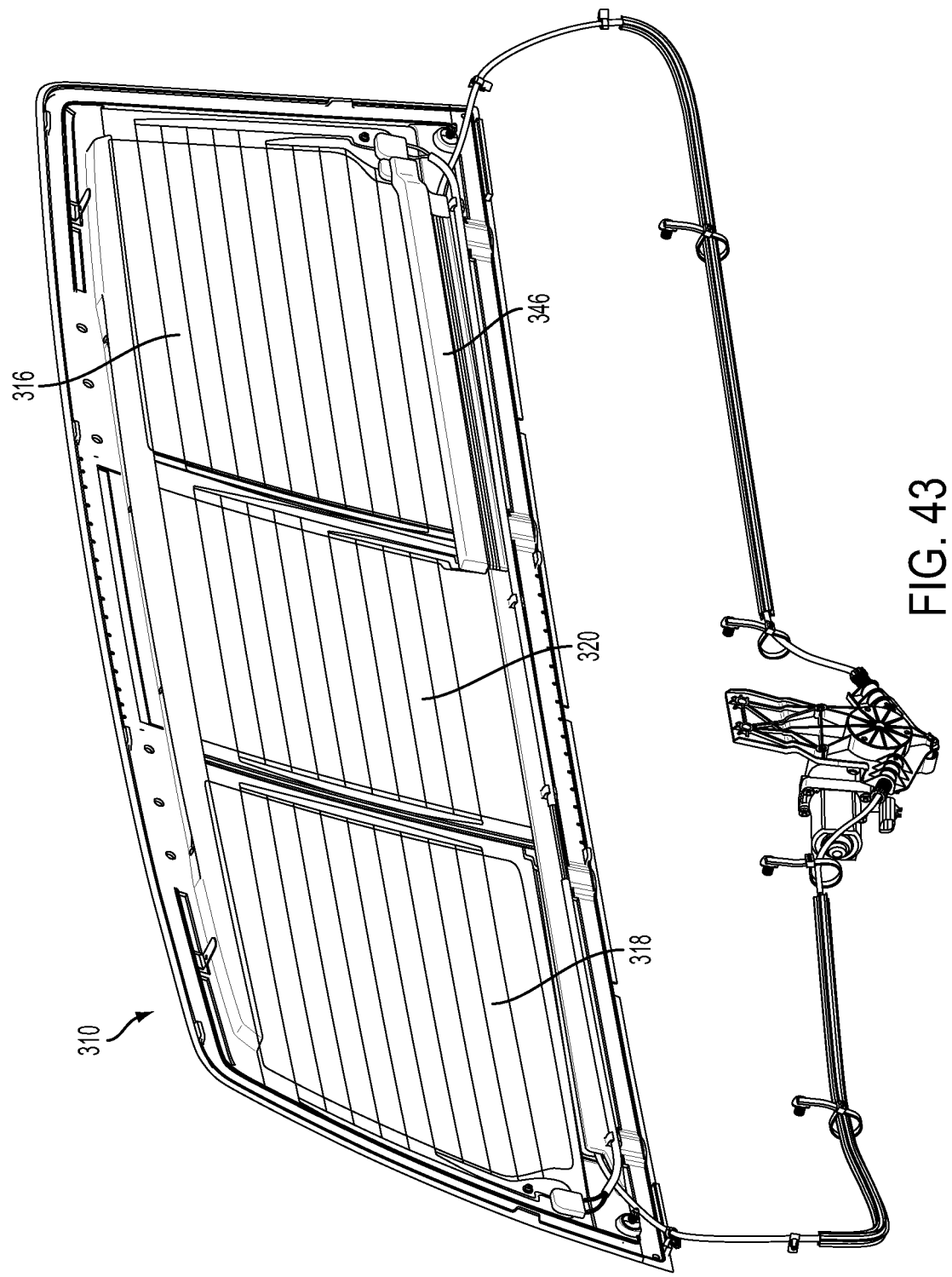

As shown in FIGS. 34, 36, 36A-C, 38 and 40, window assembly 210' includes a cover element 246' that is attached (such as via an adhesive 248' or the like) to and that extends partially along the lower rail or channel 214a' of the frame portion 214' of window assembly 210'. The cover element 246' includes an attaching portion 246a' that is attached to lower rail 214a' and includes a wire guide portion or channel 246b' that is disposed at or above the lower rail 214a' and that receives flexible cable 226' therein to guide and conceal the flexible cable 226' during movement of the movable window panel between its opened and closed positions. As can be seen in FIGS. 36B, 40 and 41, an adhesive strip 250' (such as an adhesive tape or pressure sensitive adhesive or layer of adhesive or the like) may be disposed partially along flexible cable 226' and may adhere a portion of the flexible cable 226' to an inner surface of the wire guide portion or channel 246b' of cover element 246'. For example, the portion (such as around half of the length of the flexible cable) that is towards the ends 236a', 237a' of wires 236', 237' that connect to the terminals 222a', 222b' at fixed window panel 216' may be fixedly secured or adhered to the cover element so that flexing of the flexible element only occurs at the portion of the cable that is towards the movable window panel, thereby controlling flexing and folding of the flexible cable as the movable window panel is moved between its opened and closed positions. Optionally, because the outboard portion of the cable is substantially fixed relative to the frame and fixed window panel via the adhesive strip or layer, it is envisioned that other means may be implemented for providing electrical current or power partially along the cover element, such as providing a fixed or non-flexible connector or wire or trace partially along the cover element or the rail or the like, with a flexible connector connecting to the non-flexible connector at or near a midpoint of the travel distance of the movable window panel, whereby the flexible connector would flex during movement of the movable window panel in a similar manner as described above.

Thus, the flexible cable 226' is routed along and within the guide element or channel 246b' to control and guide and conceal the flexible cable. The flexible cable thus flexes at its non-attached or non-adhered portion (where the cable is not attached/adhered to the cover element 246') as the movable window panel is moved between its opened and closed positions. The cover element conceals the flexible cable from view and substantially encases the flexible cable to guide or control the flexing of the cable and to protect the cable from exposure at the window panel.

Optionally, and with reference to FIGS. 42-49, a rear slider window assembly 310 includes fixed window panels 316, 318 and a movable window panel 320, with heater grids 322, 323, 324 established thereat, such as in a similar manner as discussed above. The heater grids 322, 323, 324 and jumper wire or cable 328 of window assembly 310 are substantially similar to the heater grids and jumper wires or cables of window assemblies 210, 210', discussed above, such that a detailed discussion of the heater grids and jumper wires need not be repeated herein. The similar or common elements of the heater grids and jumper wires are referenced in FIGS. 42-49 with similar reference numbers as used in FIGS. 32 and 33, but with 100 added to the reference numbers for FIGS. 42-49.

Figure 44:
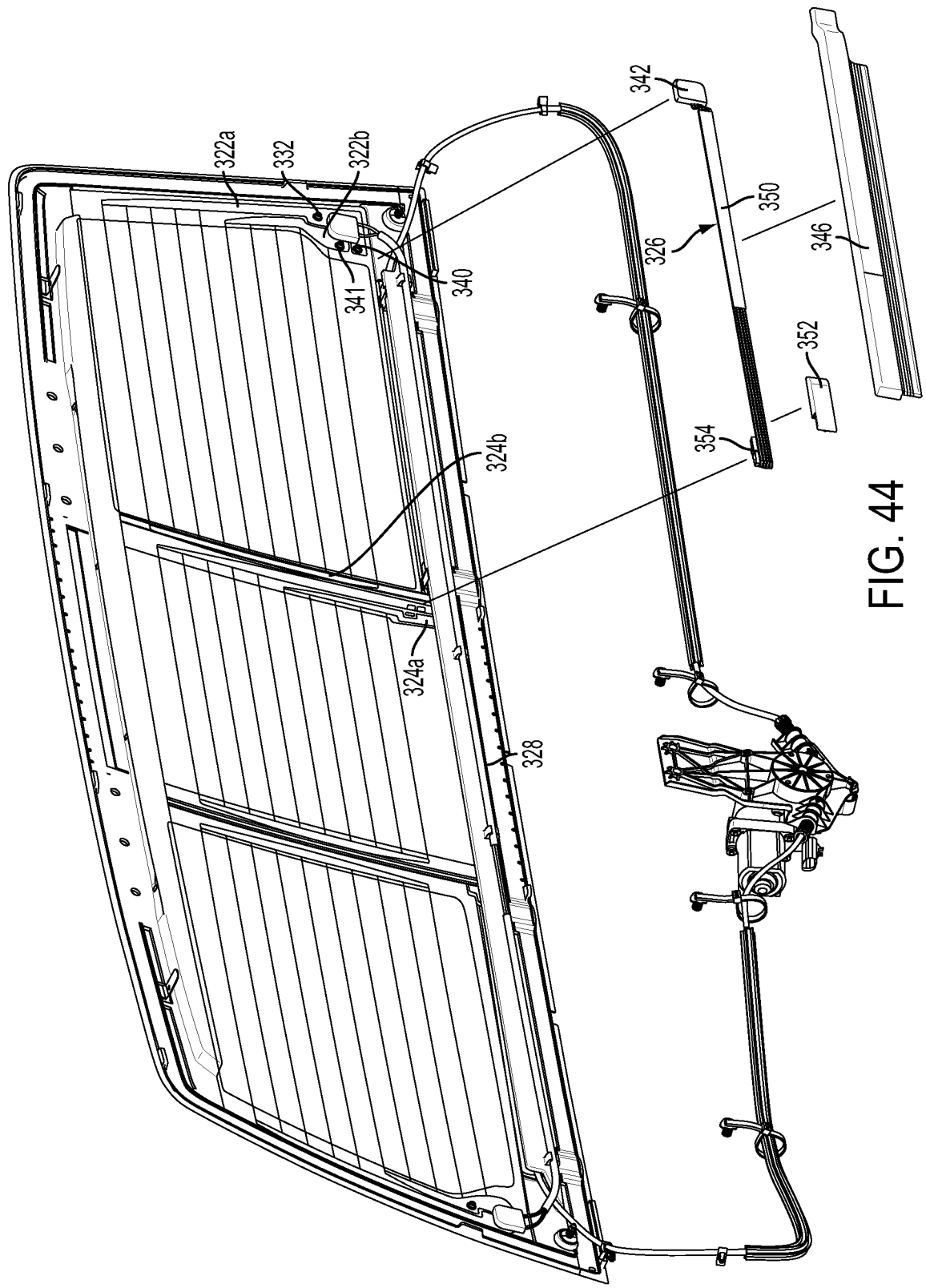
FIG. 44 is an exploded perspective view of the rear slider window assembly of FIGS. 42 and 43, shown with the flexible cable or wire and cover assembly exploded to show additional detail.
Figure 45:
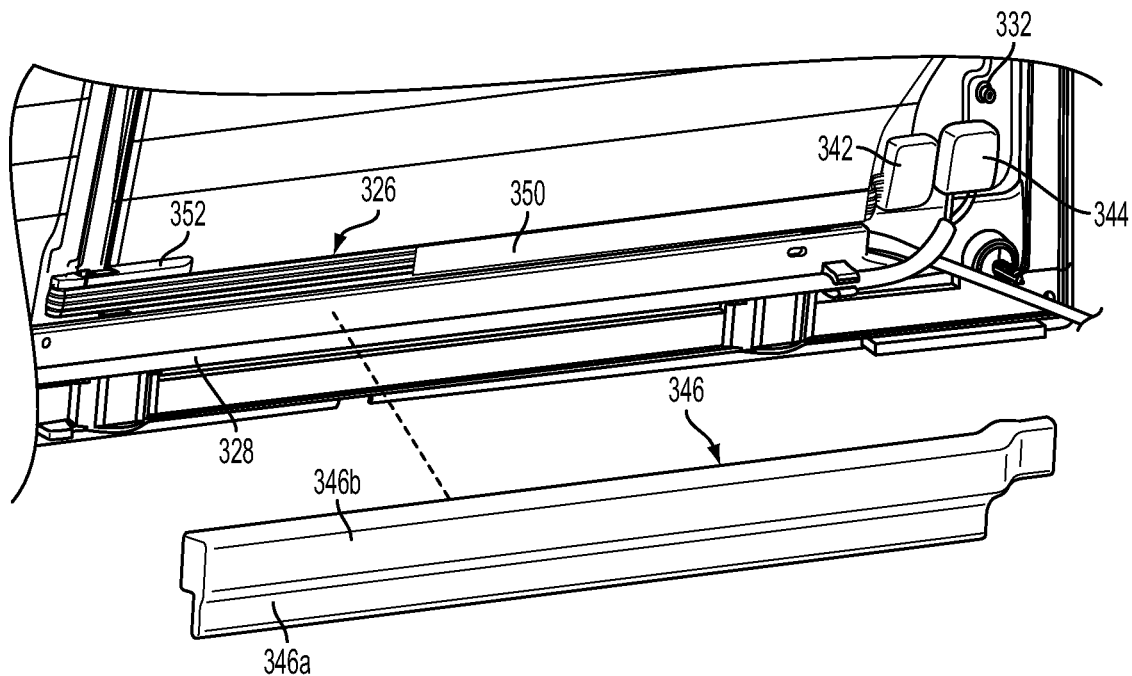
FIG. 45 is an enlarged perspective view of a lower region of the rear slider window assembly of FIGS. 42-44, shown with the cover removed to show additional details of the flexible cable and electrical connections at the fixed and movable window panels.
Figure 46:
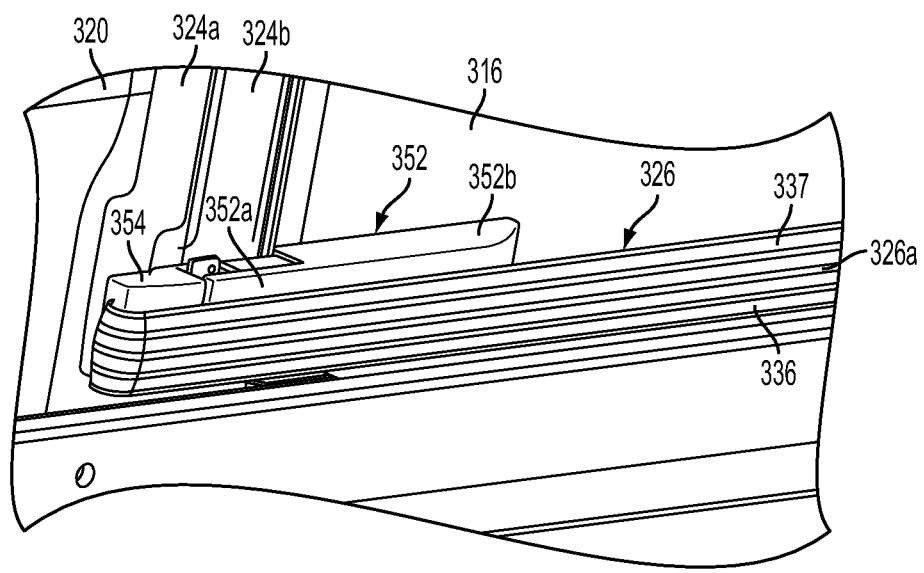
FIG. 46 is an enlarged perspective view of the flexible cable and guide element at the attachment of the flexible cable at the movable window panel in accordance with the present invention.
Figure 47:
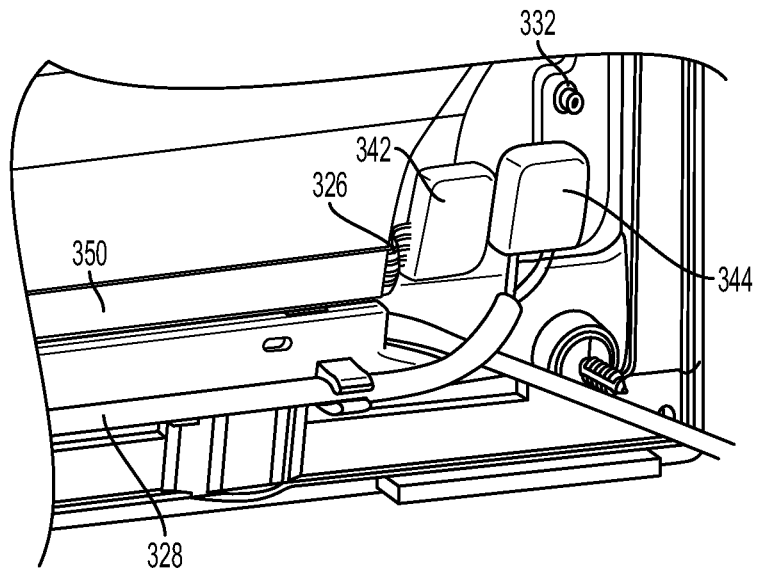
FIG. 47 is an enlarged perspective view of the flexible cable and rear slider window assembly at the attachment of the flexible cable at the fixed window panel in accordance with the present invention.
Figure 48:
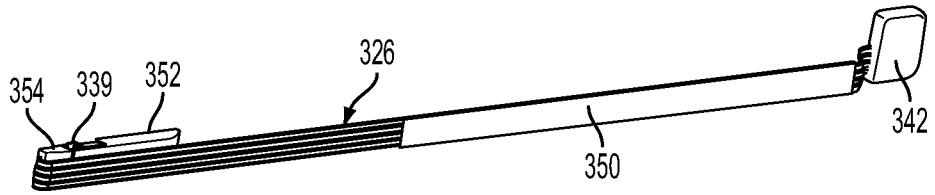
FIG. 48 is an enlarged perspective view of the flexible cable assembly of the rear slider window assembly of FIGS. 42 and 43.
Figure 49:
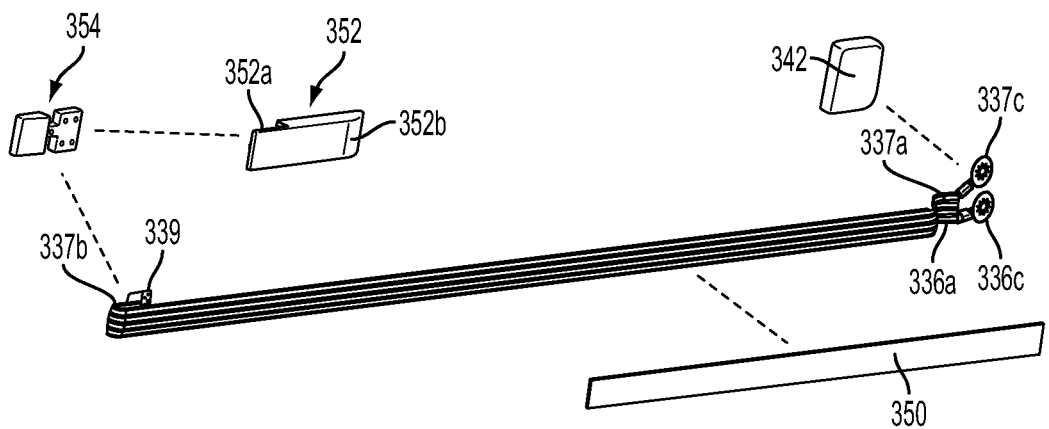
FIG. 49 is an exploded perspective view of the flexible cable assembly of FIG. 48.

Similar to window assembly 210', window assembly 310 includes a flexible connector 326 that flexes in one direction (to allow the flexible connector to fold over itself as the movable window panel is moved between its opened and closed positions), while limiting flexing in the other direction (such as in a vertical direction when the window assembly is normally installed in a vehicle). As shown in FIGS. 44, 45 and 49, the ends 336a, 337a of the wires 336, 337 of flexible connector 326 electrically connect to a connector 338 at movable window panel 320, and the ends 336b, 337b of the wires 336, 337 of flexible connector 326 electrically connect to or receive (via connectors 336c, 337c) conductive posts or elements 340, 341 established or soldered or attached at terminals 322a, 322b at fixed window panel 316, such as in a similar manner as described above with respect to window assembly 210'. A cover element 346 is attached to (such as via an adhesive or the like) and extends partially along the lower rail or channel 314a of the frame portion 314 of window assembly 310, and the cover element 346 includes an attaching portion 346a that is attached to lower rail 314a and a wire guide portion or channel 346b that is disposed above the lower rail 314a and that receives flexible cable 326 therein to guide and conceal the flexible cable 326 during movement of the movable window panel between its opened and closed positions, such as described above. An adhesive strip 350 (such as an adhesive tape or pressure sensitive adhesive or layer of adhesive or the like) may be disposed partially along flexible cable 326 and may adhere a portion of the flexible cable 326 to an inner surface of the wire guide portion or channel 346*b* of cover element 346, such as described above.

In the illustrated embodiment, flexible cable 326 comprises a ribbon cable having two electrically conductive wires or traces 336, 337 disposed or established along a thin flexible substrate or element 326*a*. As shown in FIG. 49, the ends 336*a*, 337*a* of wires 336, 337 may have an electrical connector 339 established thereat or attached or connected thereto, and the electrical connector 339 may be attachable to or electrically connected to the busbar terminals 324*a*, 324*b* of the movable window panel 320. When so connected or attached, the flexible cable 326 extends from the electrical connections 339 partially along the movable window panel 320 and bends or flexes to reverse direction so as to be routed back over the connections 339 and extends towards the terminals 322*a*, 322*b* of heater grid 322 at fixed window panel 316, such as discussed above.

In the illustrated embodiment, a guide element 352 is provided at the movable window panel 320 and generally at the connector 339, with the guide element 352 extending partially along the flexible cable 326 and towards the electrical connections at the fixed window panel 316. The guide element 352 includes an attaching portion 352*a* (that attaches to an attachment element 354 at the electrical connector 339) and a guide portion 352*b* (that extends from the attaching portion 352*a*). The guide portion 352*b* has a rounded or curved end portion that is configured to move along the flexible connector or cable 326 as the movable window panel 320 is moved towards its open position to smooth or flatten flexible cable 326 and to limit unwanted flexing or bending of the cable between the forward or leading edge of the movable window panel (the edge that is leading in the direction of travel of the movable window panel as the movable window panel is moved towards its opened position) and the electrical connection of the flexible cable at the fixed window panel 316.

In the illustrated embodiment, the attachment element 354 is disposed at connector 339 and may be attached at the movable window panel 320 to cover or encompass the connector 339 at busbars 324*a*, 324*b*. The attachment element 354 may comprise a socket type connector having a plurality of receiving portions or holes established therein for receiving a plurality of prongs or terminals protruding from attaching portion 352*a* of guide element 352. Thus, guide element 352 may be pressed into and against attachment element 354 to attach guide element 352 at the movable window panel 320. Such attachment of the guide element 352 at the movable window panel 320 may be accomplished after the flexible cable is attached at the busbars of the movable window panel and before the opposite end of the flexible cable is attached at the busbars of the fixed window panel, whereby, after attachment of the guide element 352, the flexible cable is flexed or bent or routed back over the guide element and towards the connectors 340, 341 at the fixed window panel for connection thereto.

Thus, the guide element 352 provides a means for guiding and smoothing or flattening the flexible cable in front of the movable window panel as the movable window panel is moved towards its opened position. The guide element thus may limit or substantially preclude flexing or bending or kinking or wrinkling of the flexible cable in front of the movable window panel as the movable window panel is moved towards its opened position. The guide element is shaped and dimensioned to be wide enough to substantially or entirely encompass the width of the flexible cable, and the guide element has a rounded forward engaging surface that may engage or move and slide along the flexible connector or cable and the guide element may function to effect an ironing out of the flexible cable to reduce or remove wrinkles that may otherwise occur in the flexible cable in front of the movable window panel. The guide element thus provides a leading structured edge (preferably with a curvature thereat) that is dimensioned to iron out the flexible cable as the movable window panel is moved towards its opened position.

Thus, the flexible wire or cable functions to provide electrical connection to the heater grid of the movable window panel throughout the range of motion of the movable window panel between its fully closed position and its fully opened position. As the window panel is moved towards its opened position, the one end of the flexible cable moves with the movable window panel while the flexible cable flexes to allow for such movement. In the illustrated embodiment, the slider or movable window panel is movable towards the driver or left side of the vehicle when at least partially opened, but clearly, the slider may be moved in the other direction, with the components discussed herein reversed, depending on the particular application of the rear slider window assembly.

Figure 50:
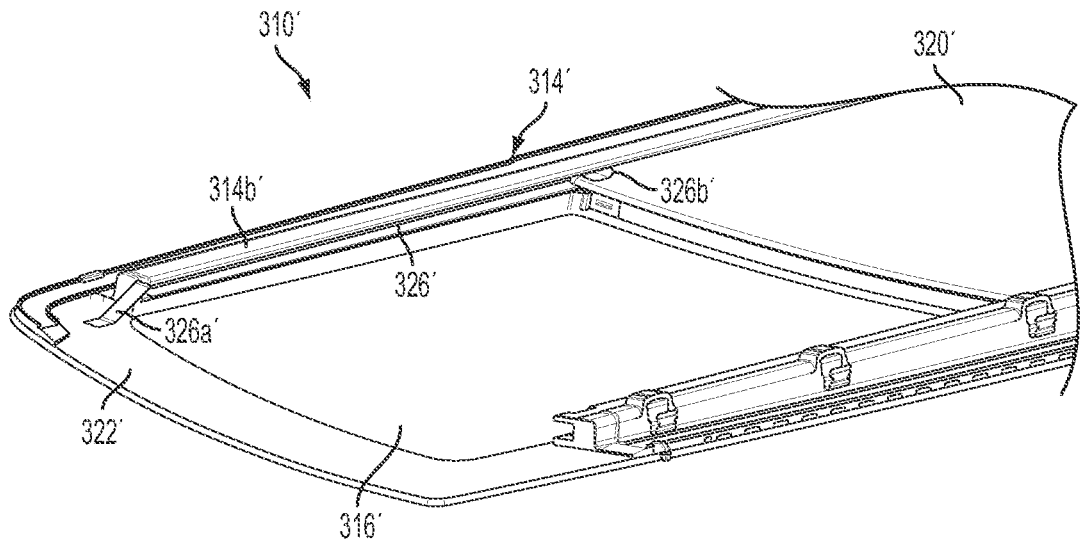
FIG. 50 is a perspective view of an upper portion of another rear slider window assembly in accordance with the present invention, shown with the movable window panel in its closed position.
Figure 51:
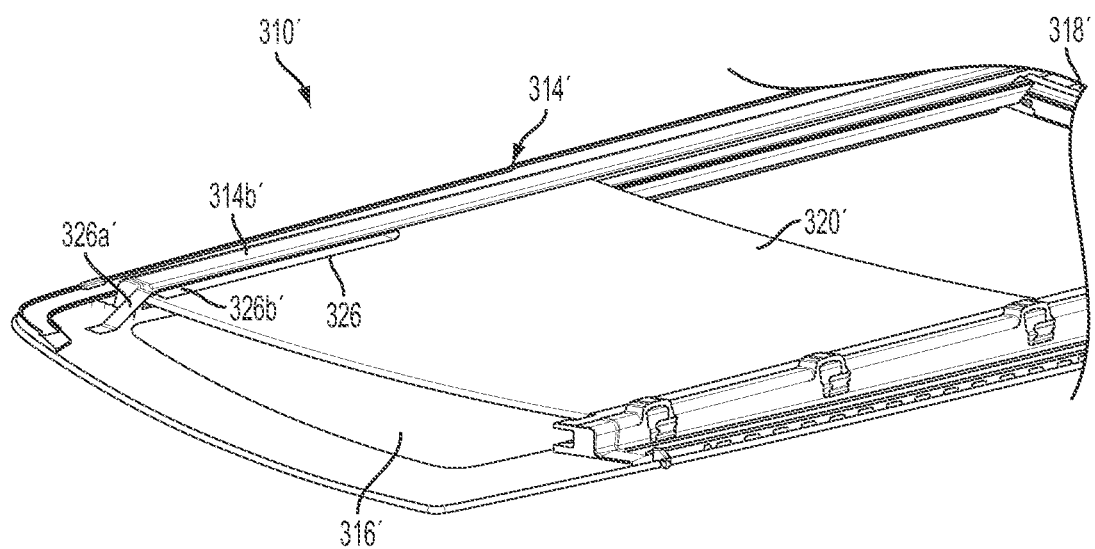
FIG. 51 is another perspective view of the upper portion of the rear slider window assembly of FIG. 50, shown with the movable window panel in its opened position.
Figure 52:
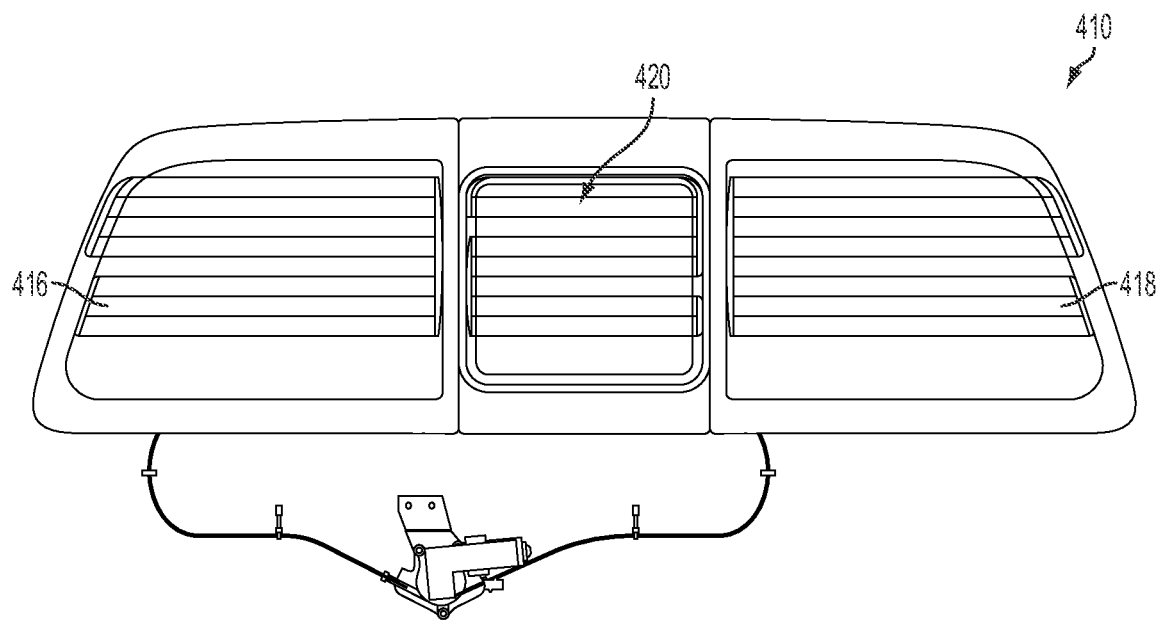
FIG. 52 is an exterior view of a flush rear slider window assembly in accordance with the present invention.
Figure 53:
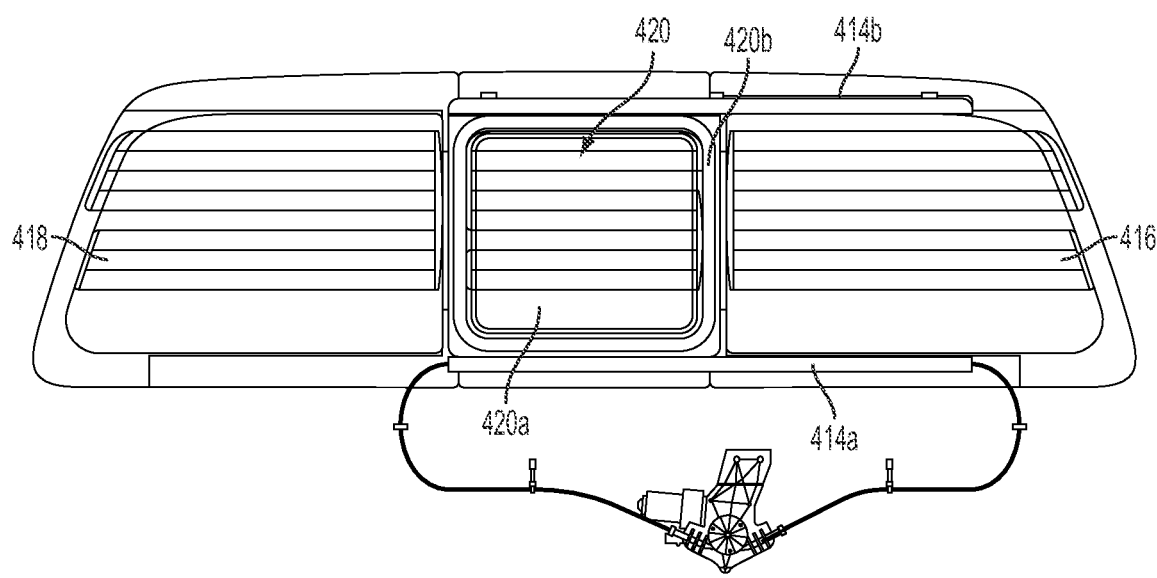
FIG. 53 is an interior view of the flush rear slider window assembly of FIG. 52.

Optionally, the electrically conductive connection between the fixed window panel or frame and the movable window panel may be established and maintained via other suitable means, such as via other types or forms of electrically conductive wiring or cables or via other movable contacts or the like. Optionally, the electrical contacts may be provided via other suitable means and may be provided along the upper rail of the window assembly, such as via a flexible wire or ribbon cable disposed at the upper rail of the window assembly. For example, and with reference to FIGS. 50 and 51, a rear slider window assembly 310' of a vehicle (such as a pickup truck or the like) includes a window frame 314', a pair of side fixed window panels 316', 318' and a movable window panel 320' that is movable relative to frame 314' and fixed window panels 316', 318' between a closed position (FIG. 50) and an opened position (FIG. 51). Fixed window panels 316', 318' may each include an electrically conductive heater grid or other heating element or electrically operable element (not shown in FIGS. 50 and 51) established at the window panels (such as at or on an interior surface of the window panels) and movable window panel 320' includes an electrically operated element, such as an electrically conductive heater grid (not shown in FIGS. 50 and 51) or other heating element or electrically operable element, established at the window panel (such as at or on an interior surface of the movable window panel).

In the illustrated embodiment, electrical connection between the heater grid or electrically operable element of the movable window panel 320' and the power source or wiring harness of the vehicle is established via a flexible electrically conductive wire or ribbon cable 326' that is electrically connected at one end 326*a*' to electrically powered terminals or busbars 322' at the frame 314' or fixed window panel 316', and at the other end 326*b*' to electrically conductive contacts that are electrically conductively connected to respective traces or busbars of the heater grid of the movable window panel 320'. Optionally, the end 326*b*' of the flexible cable 326' may connect to a jumper element (such as a metallic or polymeric non-flexible element with electrically conductive traces or elements disposed therealong), which extends from the upper rail or frame portion to the surface of the fixed window panel, such as at or near the perimeter region of the fixed window panel and where an opaque layer or coating (such as a ceramic frit layer or the like) may be established at the surface of the fixed window panel. The flexible wire or ribbon cable 326' flexes and folds over on itself or overlays itself in a controlled manner (along the upper rail or frame portion 314b') as the movable window panel 320' moves along the frame portion between opened and closed positions, such as in a similar manner as discussed above. The flexible wire or ribbon cable may comprise any suitable wire or cable, and may comprise a pair of electrically conductive wires arranged in a generally flat or planar elongated strip, whereby the strip may be flexible in one direction (such as horizontally or forward and/or rearward in FIGS. 50 and 51 and relative to the vehicle direction of travel), while resisting flexing in other directions (such as upward and/or downward in FIGS. 50 and 51), such as in a similar manner as described above.

The electrically powered terminals at the frame 314' or fixed window panel 316' (to which the ends 326a' of wire or cable 326' are electrically connected, such as via soldering or the like) are electrically conductively connected to the power source of the vehicle, such as via electrically conductive connection with a wiring harness of the vehicle or a heater grid or the like of the fixed window panel (which in turn is electrically conductively connected to the vehicle wire harness or the like), while the end 326b' of electrical wiring or cable 326' is electrically conductively connected to respective busbars or traces of the heater grid of movable window panel 320' (such as via soldering or the like). Thus, the heater grid of movable window panel 320' is electrically conductively connected to the electrically conductive terminals 322' (such as via continuous connection via wire or cable 326' and via flexing or bending of wire or cable 326') irrespective of the position of the movable window panel and as the movable window is moved between its closed position and its opened position.

Optionally, other means for establishing and maintaining electrical connection to the heater grid of the movable window panel throughout the range of motion of the movable window panel may be implemented while remaining within the spirit and scope of the present invention. Although shown and described as a rear slider window assembly having a pair of side fixed window panels and a single horizontally movable window panel, other slider window configurations may be implemented while remaining within the spirit and scope of the present invention. For example, a window assembly may have a single fixed window panel with one or more movable window panels that is/are movable relative to the fixed window panel between opened and closed positions while the heater grid of the movable window panel/panels remain electrically conductively connected to a power source so that the heater grid/grids may be powered irrespective of whether the movable window/windows is/are opened or closed. Optionally, it is envisioned that aspects of the present invention may be suitable for a vertically movable window panel that has one or more movable window panels that is/are vertically movable relative to one or more fixed window panels of the window assembly.

Although shown and described as having a heater grid and providing electrical power or current to the heater grid to heat or defog or defrost the movable window panel of the rear slider window assembly, it is envisioned that electrical power/current may be provided to the movable window panel (when the movable window panel is closed and at least partially opened) for other functions or purposes while remaining within the spirit and scope of the present invention. For example, electrical power or electrical current or electrically conductive connections may be provided to the movable glass window panel for connecting to a radio antenna established at the movable window panel and/or carrier of the movable window panel (such as for receiving radio antenna signals or the like), or for powering/controlling lights and/or sensors (such as imaging sensors or photosensors or security/motion sensors or the like) established at the movable window panel and/or carrier or frame of the movable window panel, or for powering/controlling an electrical auto-dimming/shading glass panel (such as an electro-optic or electrochromic glass panel or the like) to provide a dimming/shading feature to the movable glass window panel, and/or the like. The electrical connections or electrically conductive connections to the movable window panel allow for provision of electrical power/current to the accessories or features or content of the movable window panel or at the movable window panel and/or may provide a data/signal transmitting/receiving function for the accessories or features or content of or at the movable window panel, with the connections providing such power/current/transmission/communication irrespective of the position of the movable window panel between its fully closed position and its fully opened position.

Thus, and in accordance with the present invention, electrical conductive continuity and hence heating via the electrically conducting heater traces (or other electrically conductive traces or elements established at the movable window panel) is maintained whether or not the central sliding or movable window panel is opened or closed or partially opened or partially closed. Thus, a driver of the equipped vehicle can opt to, for example, at least partially open the sliding window for ventilation purposes or the like, and still maintain the benefit of a heatable central sliding window panel for demisting and/or defogging and/or defrosting purposes. This is in stark contrast to conventional known slider window assemblies, epitomized such as by the likes of U.S. Pat. No. 6,014,840, which is hereby incorporated herein by reference in its entirety, where electrical connection to the central sliding window panel (and hence heating/demisting thereof) is lost immediately when the sliding window is moved from its fully closed position.

Optionally, and with reference to FIGS. 52-65, a flush rear slider window assembly 410 of a vehicle (such as a pickup truck or the like) includes a frame portion having a lower rail 414a and an upper rail 414b, a pair of spaced apart fixed window panels 416, 418 and a movable window panel assembly 420 that is movable relative to frame and fixed window panel or panels between an opened position (where the movable window panel assembly is disposed behind and generally along one of the fixed window panels 416) and a closed position (where an outer surface of the glass window panel 420a is generally flush with or coplanar with the outer surfaces of the fixed window panels 416, 418). The movable window panel assembly 420 comprises a glass window panel 420a that is supported by or bonded to a carrier or frame 420b (such as bonded to the frame via a one component urethane adhesive or other suitable adhesive or the like) that includes pins 456 and channel followers 458 that are at least partially received in channels 460, 462 formed or established along the upper and lower rails 414a, 414b of the window assembly to guide the movable window panel along the upper and lower rails between its opened and closed positions, as discussed below.

As shown in FIG. 54, the window assembly 410 includes an upper rail 414a bonded along an upper region of the fixed glass panels 416, 418 and a lower rail 414b bonded along a lower region of the fixed glass panels 416, 418, with the movable window panel assembly 420 being slidably movable along the rails 414a, 414b via the pins 456 and channel followers 458. The rails 414a, 414b each include a pair of channels 460, 462 (FIGS. 59-63), which comprise a leading channel 460 (which guides the portion of the movable window panel assembly that leads the assembly as the movable window assembly is moved towards its closed position) and a trailing channel 462 (which guides the portion of the movable window panel assembly that trails the assembly as the assembly is moved towards its closed position. As best shown in FIGS. 59-63, each channel 460, 462 comprises a generally straight elongated portion 460a, 462a and a curved end portion 460b, 462b at its leading end (the end of the channel closest to the window opening). As also shown in FIGS. 59-63, trailing channels 462 comprise narrow grooves formed into rails 414a, 414b, while leading channels 460 are wider channels (for receiving a larger channel follower 458 therein, with the rails 414a, 414b each including a narrower groove or channel 461 established generally along the center of the leading channel 460 for receiving a pin portion 458a of the channel follower 458 therein, as discussed below. Thus, the movable window assembly 420 is moved along the elongated straight portions of the channels towards the window opening, and moved along the curved end portions to move the glass panel into the opening so that the window is closed and the outer surface of the glass panel is generally flush with or coplanar with the outer surface of the fixed window panels.

A perimeter sealing element 464 is disposed at or adhered or bonded to the inboard edge regions of the fixed window panels 416, 418 and along respective portions 414c of the lower and upper rails 414a, 414b, such that the frame 420b of the movable window assembly 420 engages and seals against the sealing element 464 when the movable window panel is closed. Lower and upper appliqués or panels 417a, 417b may be adhered or bonded or otherwise attached at the respective rails 414a, 414b and between the fixed window panels to provide a generally flush outer surface across the fixed window panels and appliqués. Optionally, the appliqués or panels may be integrally molded or formed with the respective rails, such as by utilizing aspects of the window assemblies described above.

Figure 54B:
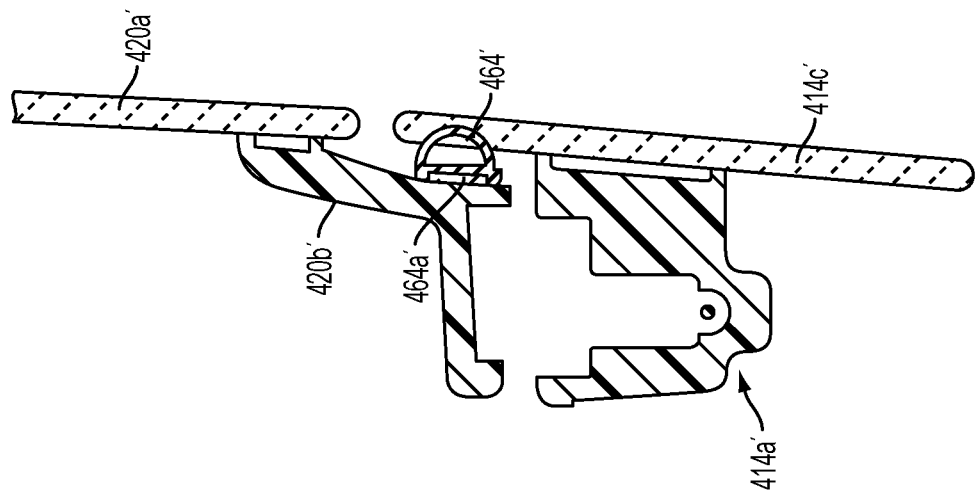
FIG. 54B is a sectional view of the movable window panel and carrier assembly, taken along the line LIVB-LIVB in FIG. 54A.
Figure 54A:
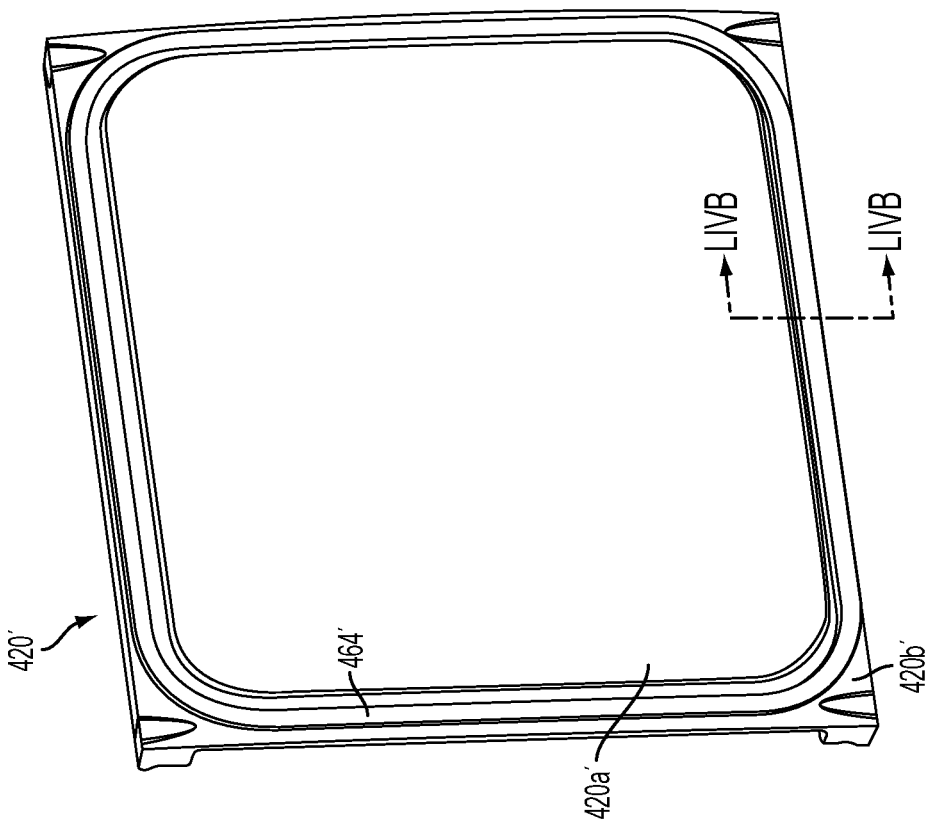
FIG. 54A is a perspective view of another movable window panel and carrier assembly of the present invention.

Optionally, and with reference to FIGS. 54A and 54B, the movable window assembly 420' may have a perimeter seal 464' attached to or at the frame 420b', such as via an adhesive bead 464a' or the like. As shown in FIG. 54B, the seal 464' may be disposed outboard of the window panel 420a' and around the periphery of the window panel, and on a surface of the frame 420b' that faces the fixed window panels and/or appliqués when the movable window assembly is moved along the rails. The frame 420b' may be adhered or bonded to the inner surface of the movable window panel 420a', such as via an adhesive or the like. As can be seen in FIG. 54B, the seal 464' is spaced from the perimeter edge of the window panel 420a' so that the seal engages the surfaces of the fixed window panels and/or appliqués 414c' near the frame portion (such as near the lower frame portion 414a' as shown in FIG. 54B) when the movable window assembly is moved to its closed position. As also can be seen with reference to FIG. 54B, the seal is disposed at a surface of the frame that is behind or rearward of the plane of the window panel 420a', such that, when the movable window assembly is in its closed position and the seal 464' is engaged or sealed against the surfaces of the fixed window panels and appliqués 414c', the window panel 420a' is generally in the same plane as the fixed window panels and appliqués, thereby providing generally flush or coplanar outer surfaces of the movable window panel, the fixed window panels and the appliqués.

As shown in FIG. 55, movable window panel assembly 420 includes channel followers 458 at the upper and lower leading corners (the portion of the movable window panel assembly that leads the assembly as the assembly is moved towards its closed position) and channel pins 456 at the upper and lower trailing corners (the portion of the movable window panel assembly that trails the assembly as the assembly is moved towards its closed position), with the channel pins disposed at the opposite ends of a latching mechanism 466 that functions to move the detent pins 466a out of recesses or holes in the channels of the rails to allow for manual movement of the movable window panel assembly (such as for applications of the rear slider window assembly where the movable window panel is not moved via a powered drive system as discussed below). In the illustrated embodiment, latching mechanism 466 includes detent pins 466a that are movably disposed at a latch handle 466b and detent pin spring 466c, with the channel pins 456 disposed at the outer ends of the detent pins 466a. The detent pins 466a are received through holes or openings in the frame 420b and are received through the channel pins 456 so that the ends of the detent pins 466a are received through the openings or holes 415 (FIGS. 59-63) in the rails 414a, 414b to retain the movable window panel at a desired position relative to the fixed panels and window opening. The latching mechanism 466 is disposed at the trailing portion of the movable frame 420b and may be substantially encased or enclosed thereat via a frame cover 420c.

Figure 56:
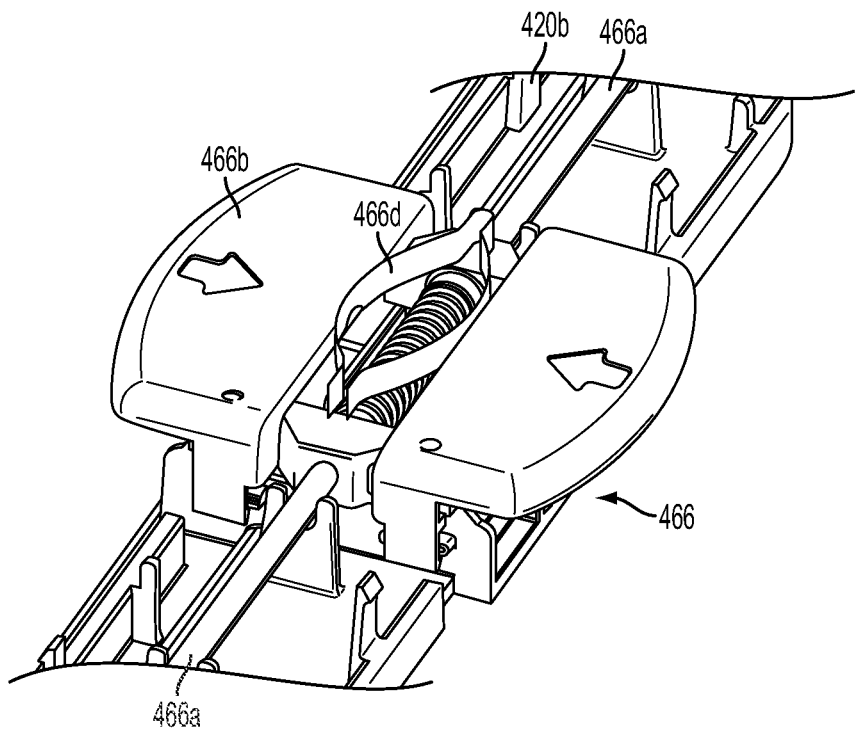
FIG. 56 is a perspective view of a latching mechanism of the carrier assembly of FIG. 55.
Figure 57:
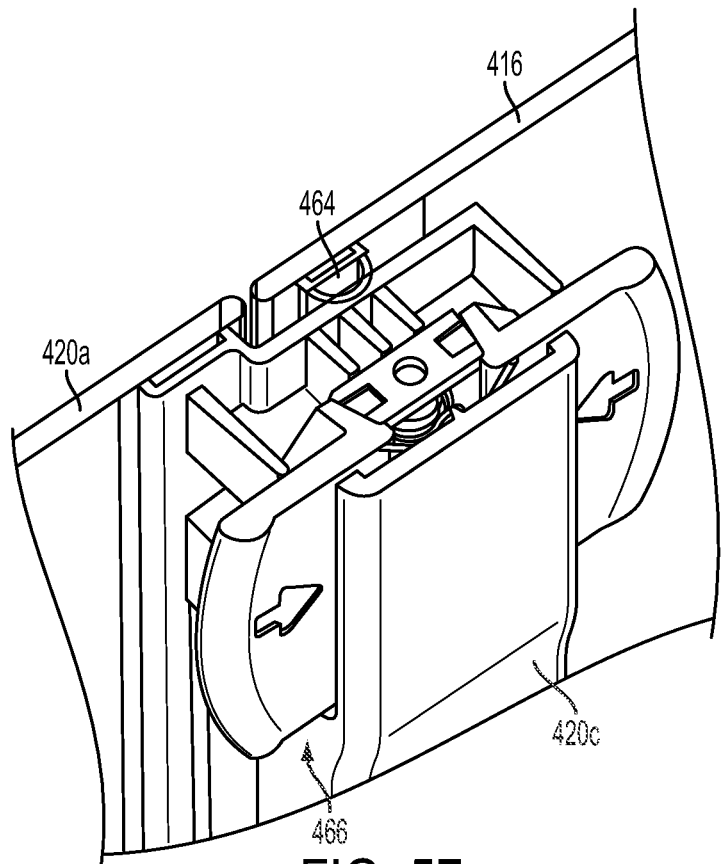
FIG. 57 is a perspective and sectional view of the latching mechanism of FIG. 56.
Figure 58:
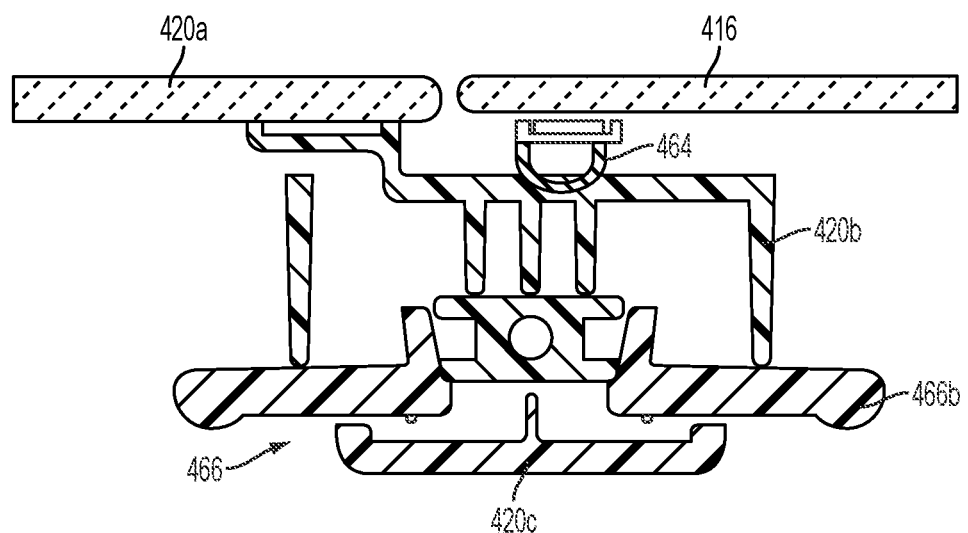
FIG. 58 is a sectional view of the latching mechanism of FIG. 56.
Figure 59:
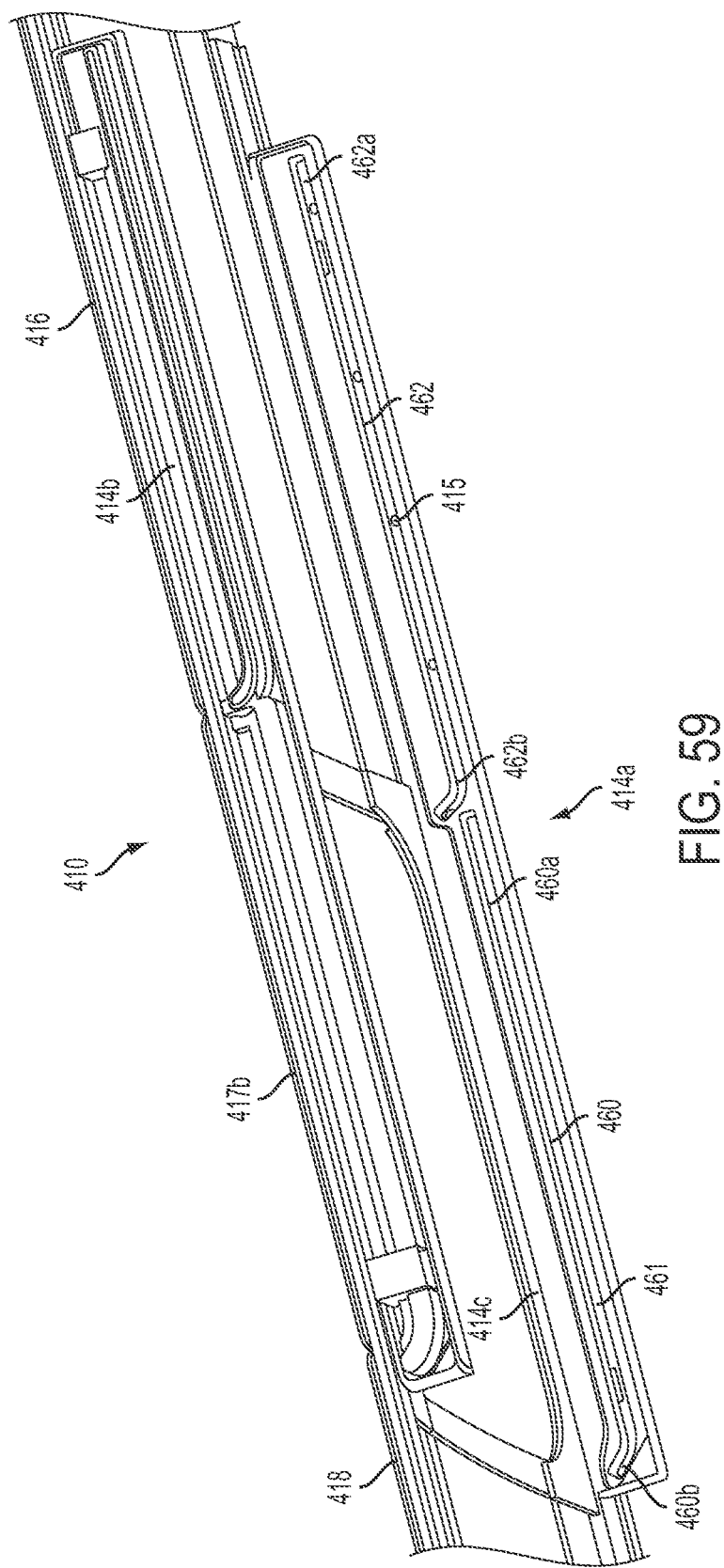
FIGS. 59-63 are perspective views of portions of the rear slider window assembly of FIGS. 52 and 53, showing the lower and upper rails and channels and pins that guide the movable window panel between its opened and closed positions.
Figure 60:
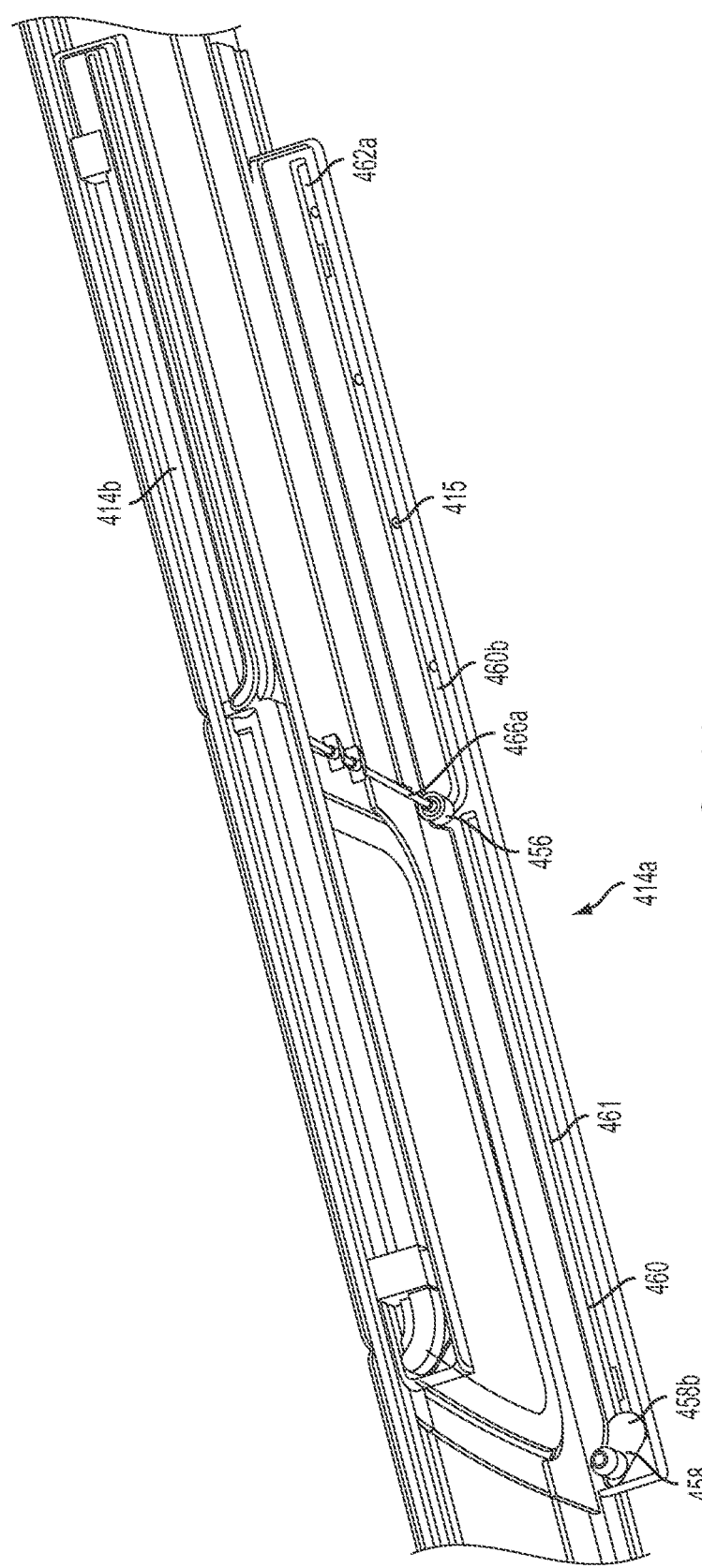
Figure 61:
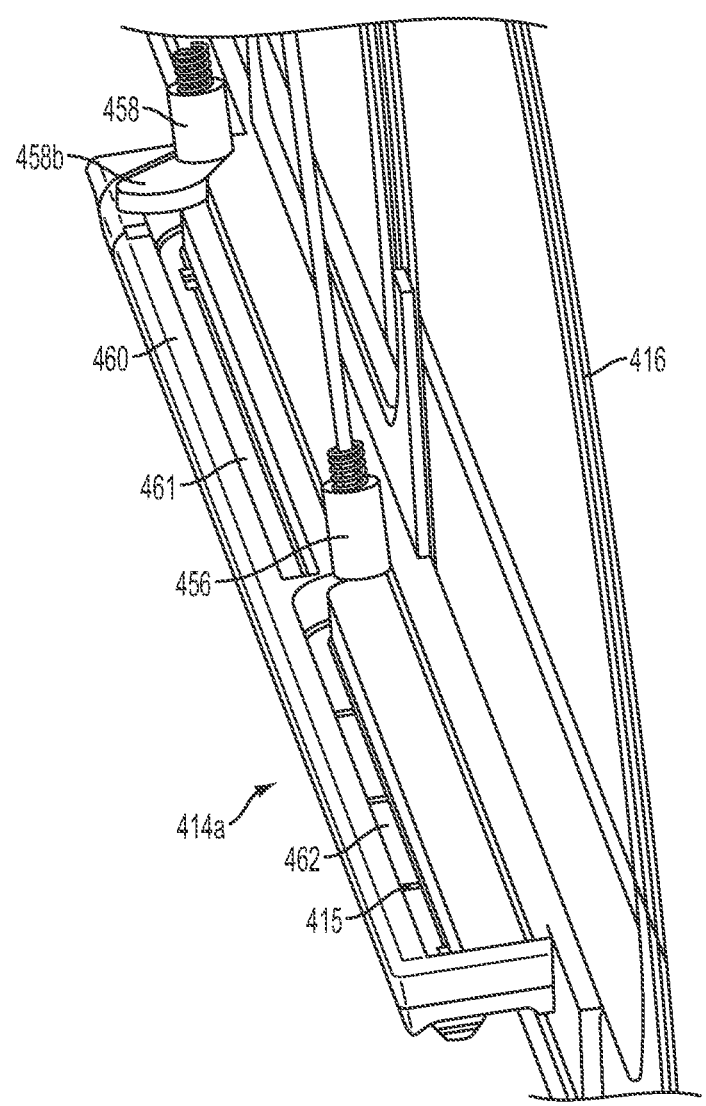
Figure 62:
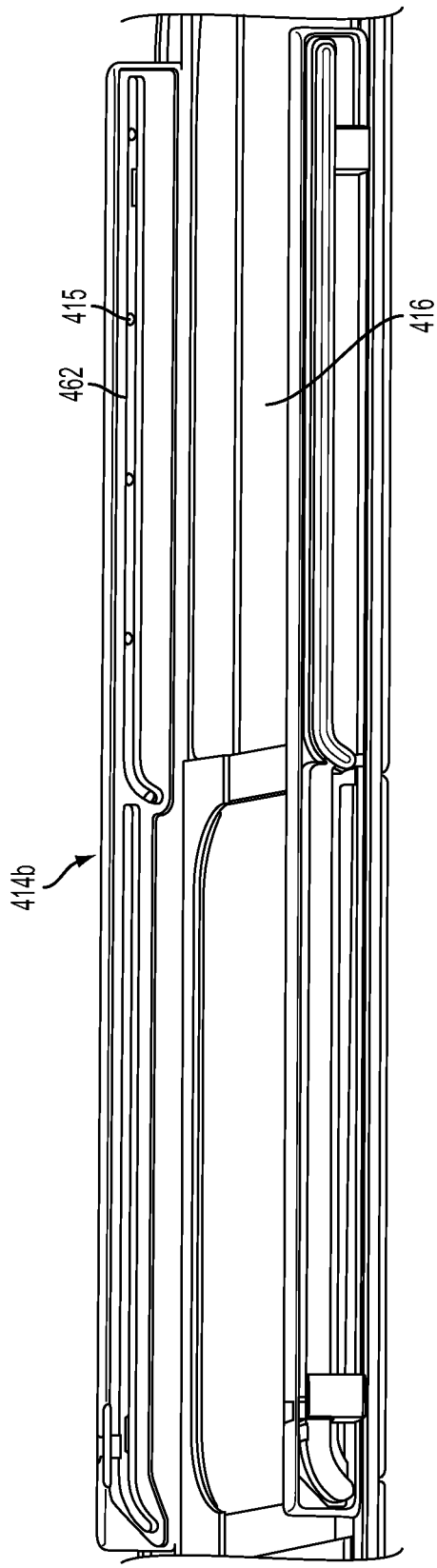
Figure 63:
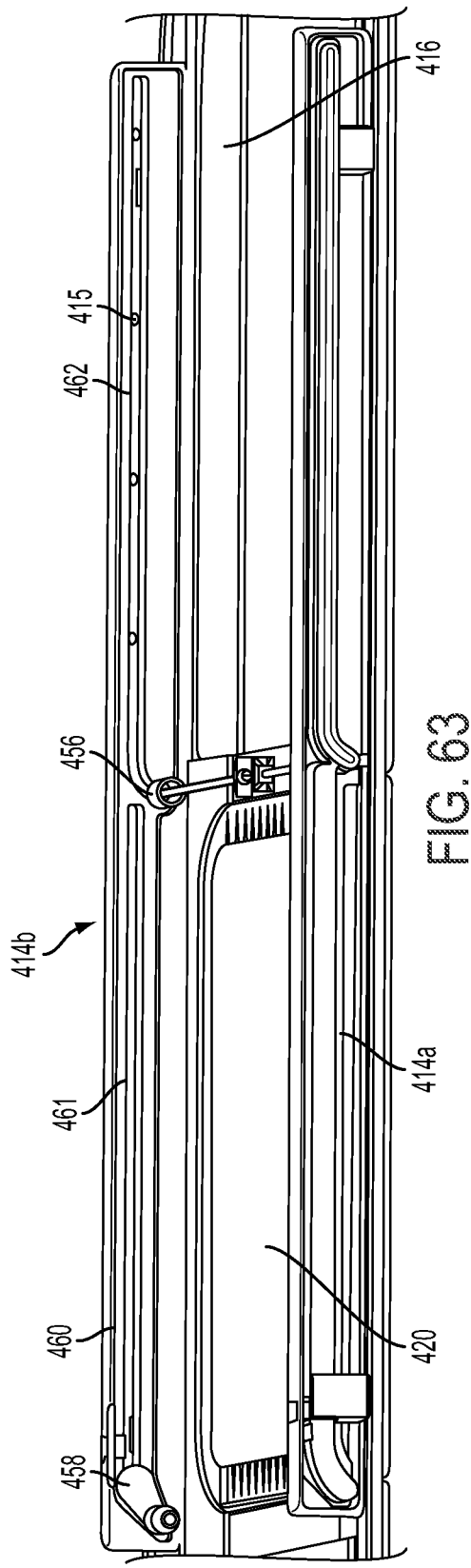

Thus, the detent pins 466a are biased outwardly towards the rails so as to be received in corresponding holes 415 formed at the bottom of the channels to lock or retain the movable window panel assembly at a desired location relative to the fixed window panels and the opening. When a user wants to move the movable window panel assembly, the user may grasp the handles 466b and squeeze them together, which imparts a retracting force at the detent pins 466a to draw the ends of the detent pins 466a out of the holes and to allow for movement of the movable window panel assembly along the rails 414a, 414b. Optionally, and as shown in FIG. 56, leaf springs 466d may be disposed at the handles 466b to bias or urge the latch handles outward to reduce or limit rattle of the handles while the window panel is in an open or partially open position and between detent locking holes. The leaf springs may be attached to the frame cover 420c, such as mechanically attached via barbs on the spring that engage the cover. The detent pins thus are guided into the frame through frame holes and are separated and actuated by the detent pin spring, which is held in place by the latch handles, which may be mechanically attached to the frame 420b of the movable window assembly 420.

In the illustrated embodiment, and such as shown in FIGS. 59-63, the upper and lower trailing channels 462 are formed to at least partially receive the pin followers 456 therein, while the upper and lower leading channels 460 are formed to at least partially receive the channel followers 458 therein. The pin followers 456 are disposed at the ends of the detent pins 466a and are biased outwardly (such as via springs 457) and towards and into the respective trailing channels 462, while the channel followers 458 are mounted at the upper and lower leading corners of the frame 420b and are also biased outwardly (such as via springs 459) and towards and into the respective leading channels 460. The biasing of the pin followers and channel followers at all corners of the movable window panel assembly function to float the movable window panel 420a and frame 420b between the rails 414a, 414b, thus centering the window module or assembly 420 and reducing chucking movement of the panel during opening and closing of the movable window panel.

As shown in FIG. 55, the channel followers 458 include a pin portion 458a that extends through the channel 460 and through narrower channel or groove 461 and into sliding engagement with a bottom region or portion of the respective rail 414a, 414b, and a wider lobed portion 458b that moves along the respective channel 460 to guide the movable window panel between its opened and closed positions. The pin portion 458a of channel follower 458 slidingly engages or contacts the bottom region of the rail so that the wider lobed portion 458b of channel follower 458 is spaced from an upper surface of the rail in the channel 460, such that only the sides of the channel follower 458 contact the sidewalls of the channel as the channel follower is moved along the channel. Such pin-to-rail contact reduces the frictional contact between the channel follower and the rail and may provide enhanced movement of the movable window panel between its opened and closed positions.

Figure 65:
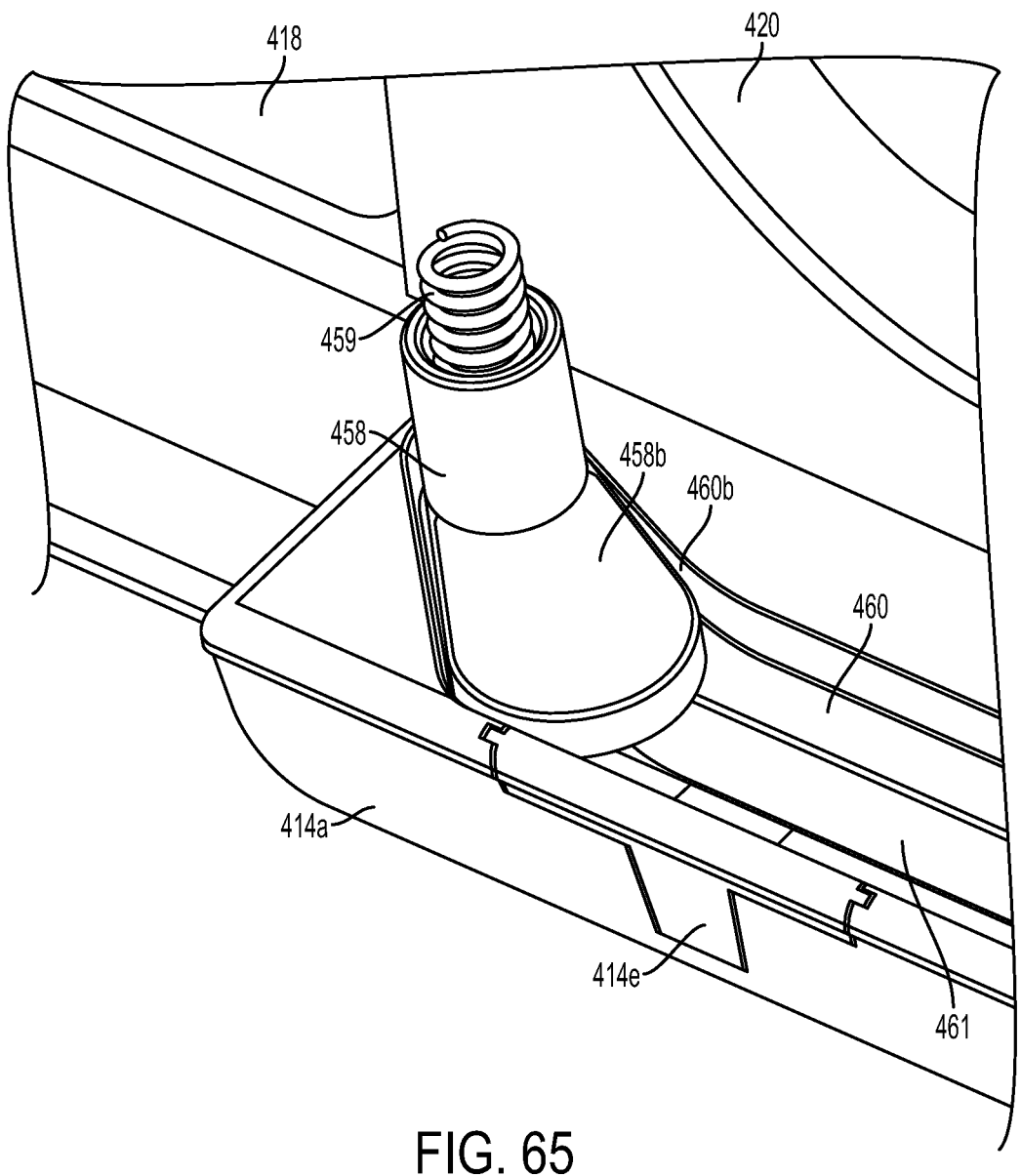
FIG. 65 is a perspective view of a channel follower of the movable window panel as it guides the movable window panel to its closed position.
Figure 66:
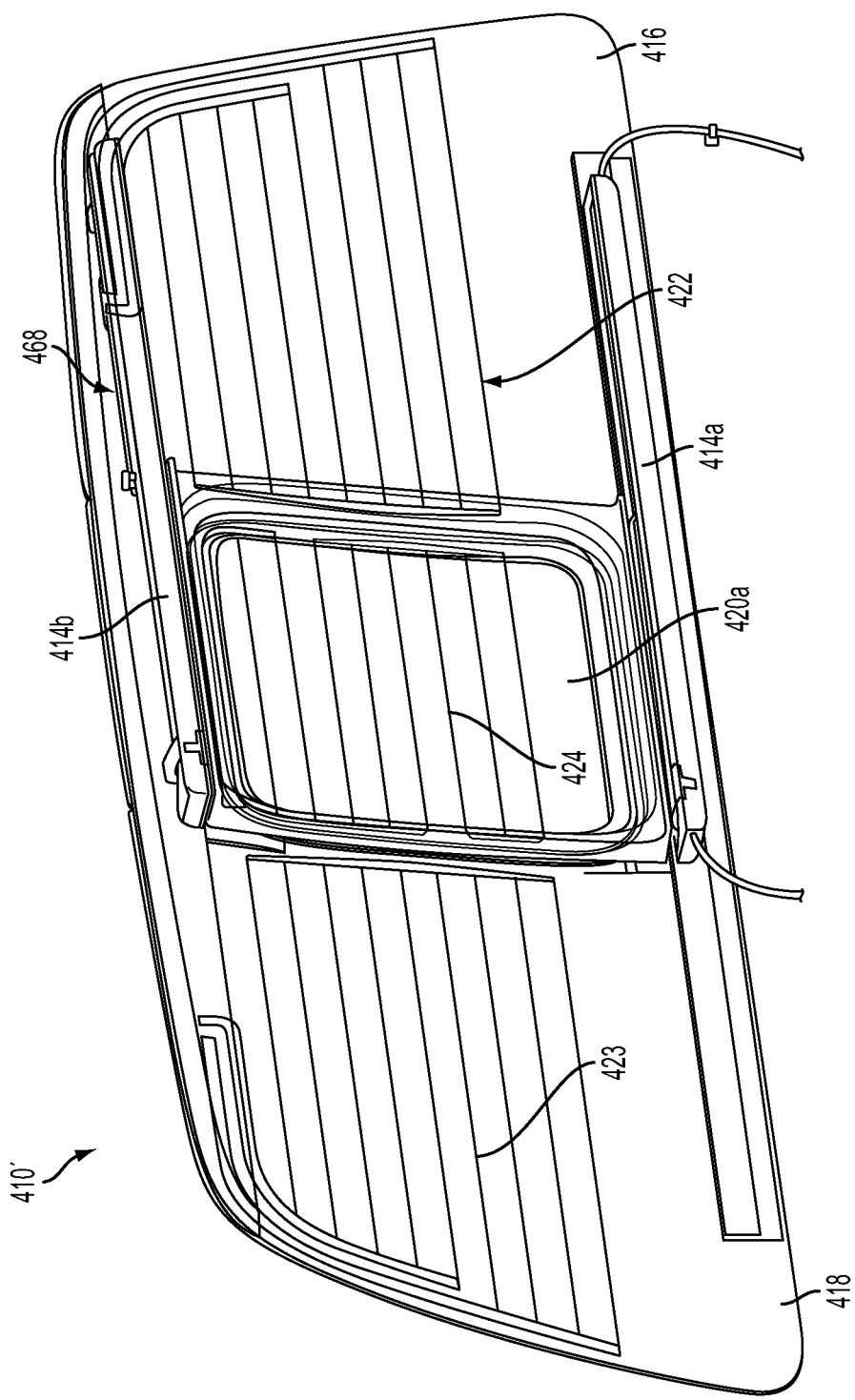
FIGS. 66 and 67 are perspective views of a rear slider window assembly of the present invention, with a flexible cable connection for providing electrical power to the movable window panel.
Figure 67:
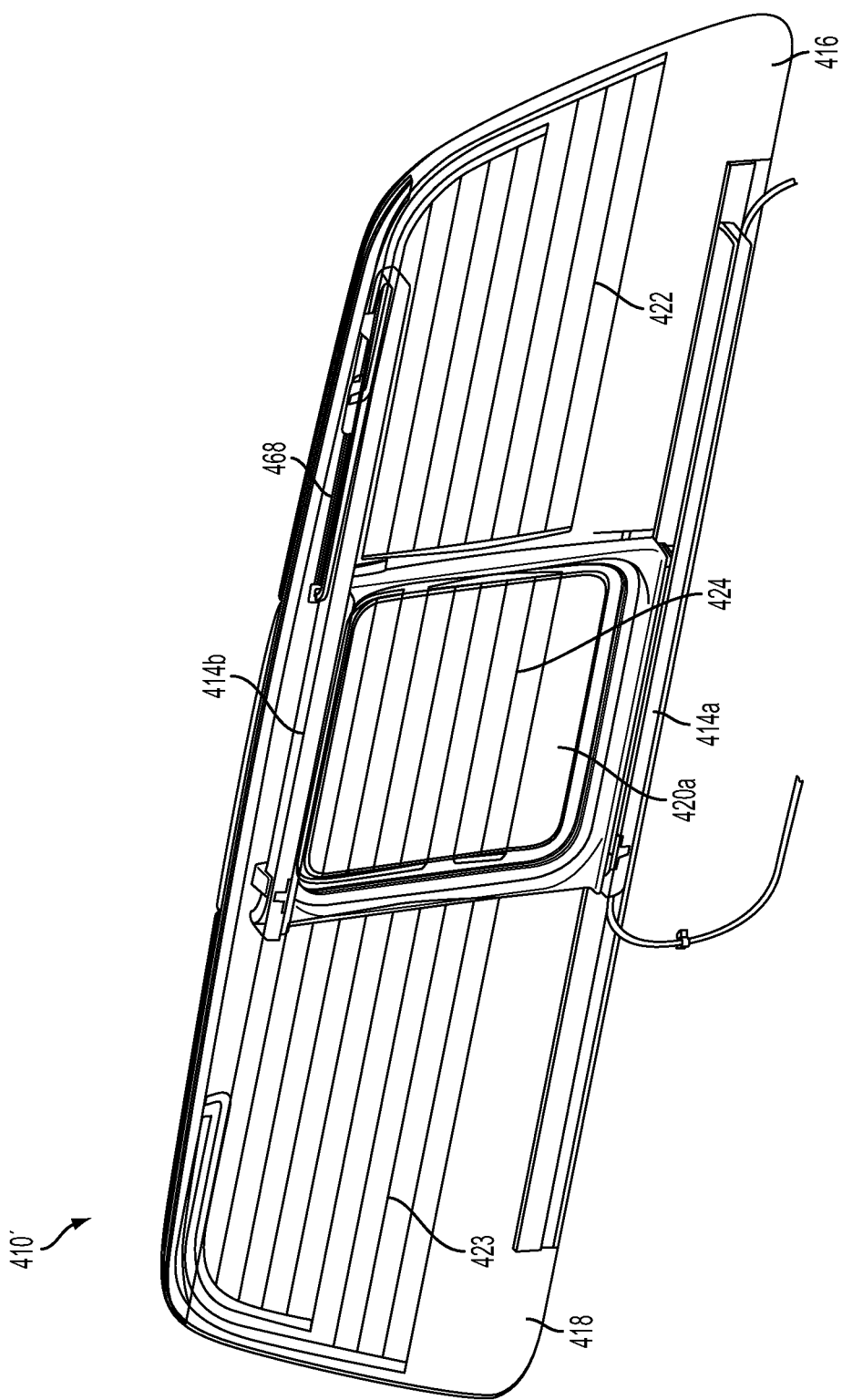

As shown in FIG. 65, the lobe 458b of the channel follower 458 functions to guide the channel follower and movable window along the channel 460 so as to guide the window into its closed position. When the channel follower is received in or moved to the curved end portion 460b of channel 460 (such as shown in FIG. 65), the lobed channel follower 458 may also provide an "anti-theft" function by limiting movement of the movable window if the window is pushed on from outside of the vehicle. For example, when the window is closed, the channel followers are driven in towards the fixed glass and provide a means of securing the non-latched portion of the movable window from forced entry from outside of the vehicle.

Figure 64:
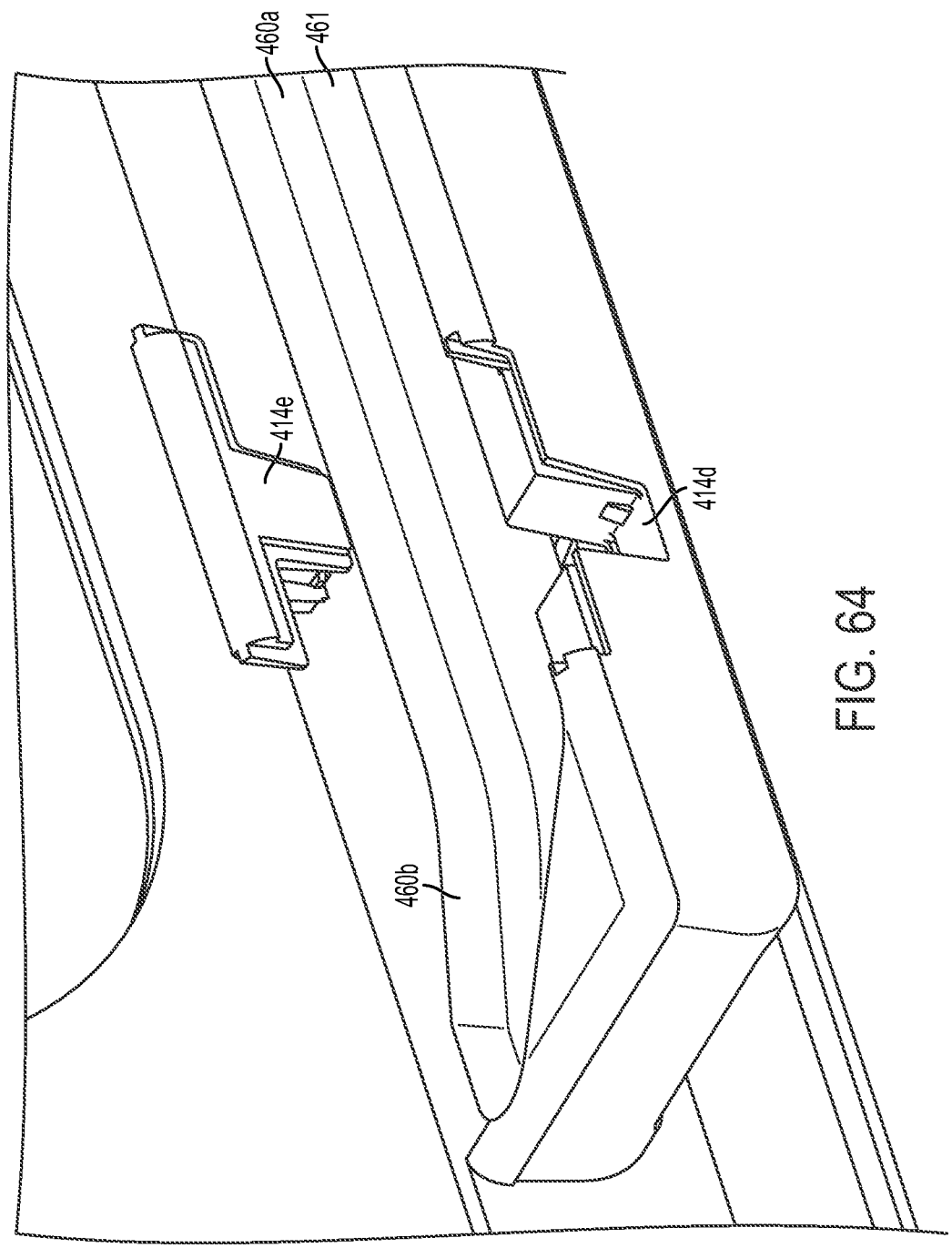
FIG. 64 is a perspective view of a portion of the lower rail, showing a rail cover that is removable for assembling of the window assembly.

Optionally, and as shown in FIG. 64, the rails 414a, 414b may include a notch or groove 414d at a corresponding portion of each channel (or of a set of channels, such as at each leading channel or the like) that allows for insertion of the channel follower or pin follower to ease installation or loading of the movable window panel onto the rails. After the movable window panel is loaded onto or into the rails, a rail cover 414e may be pushed into the notch or groove and may snap in place at the rail to limit or substantially preclude the movable window panel from being dislodged from the rails.

Figure 64A:
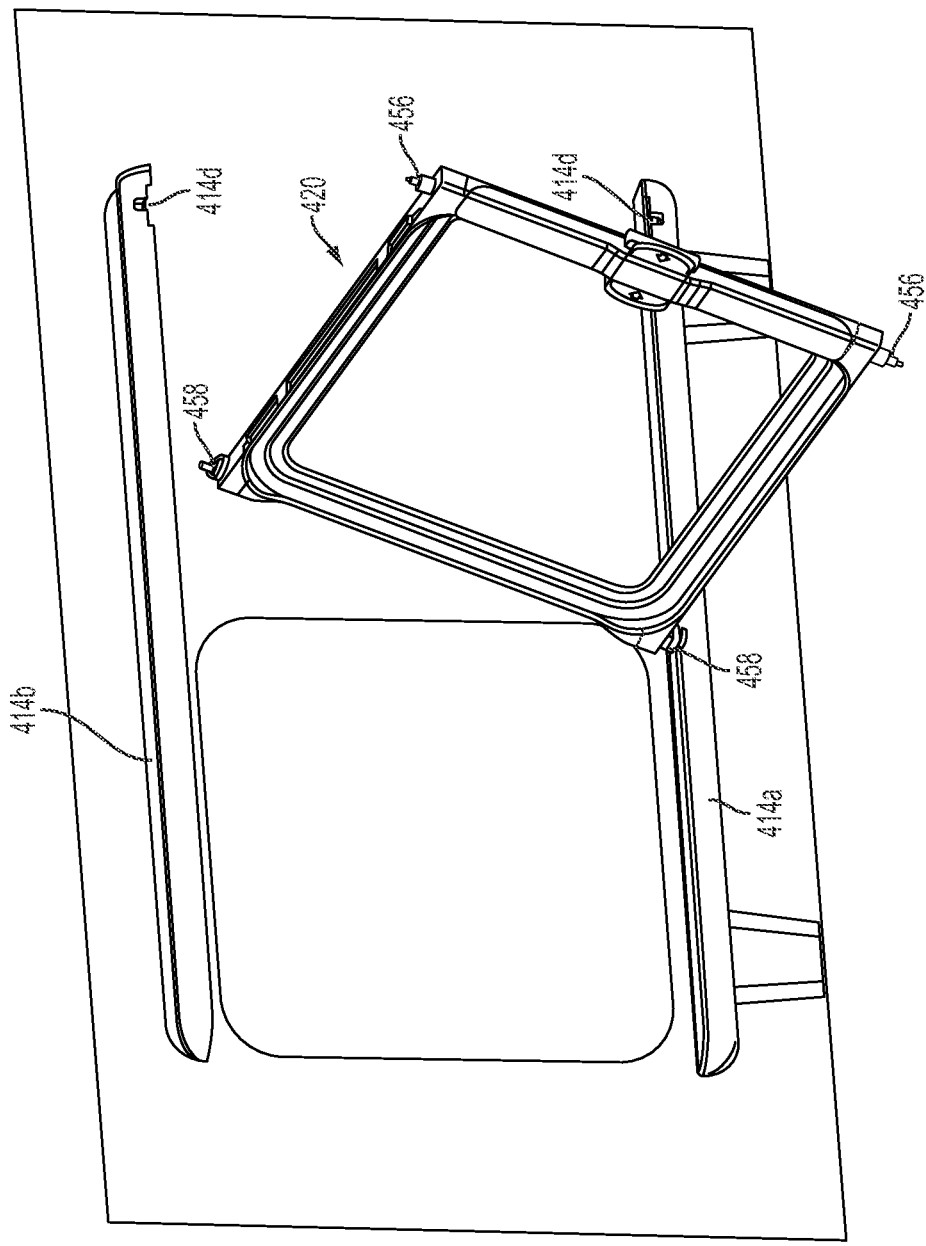
Figure 64B:
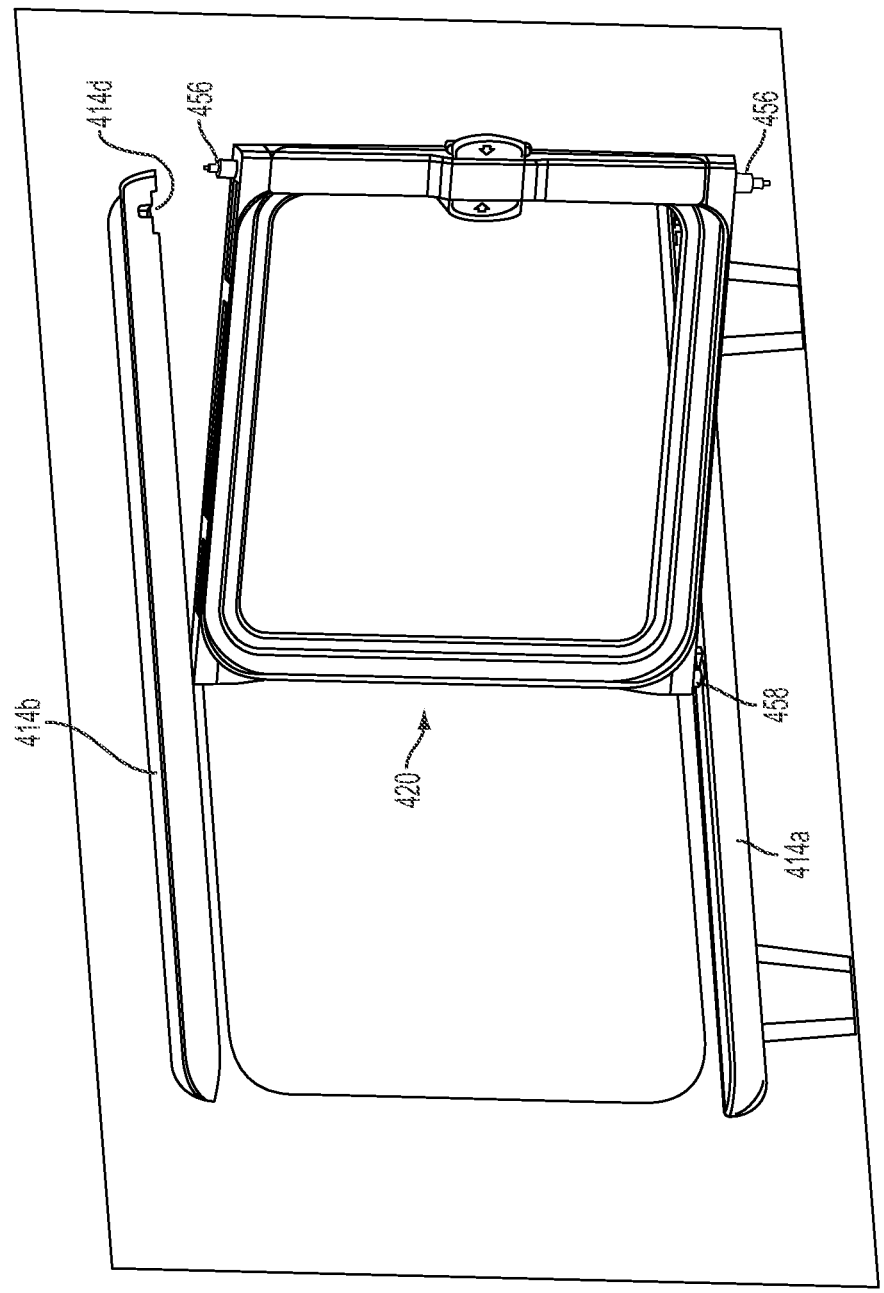
Figure 64D:
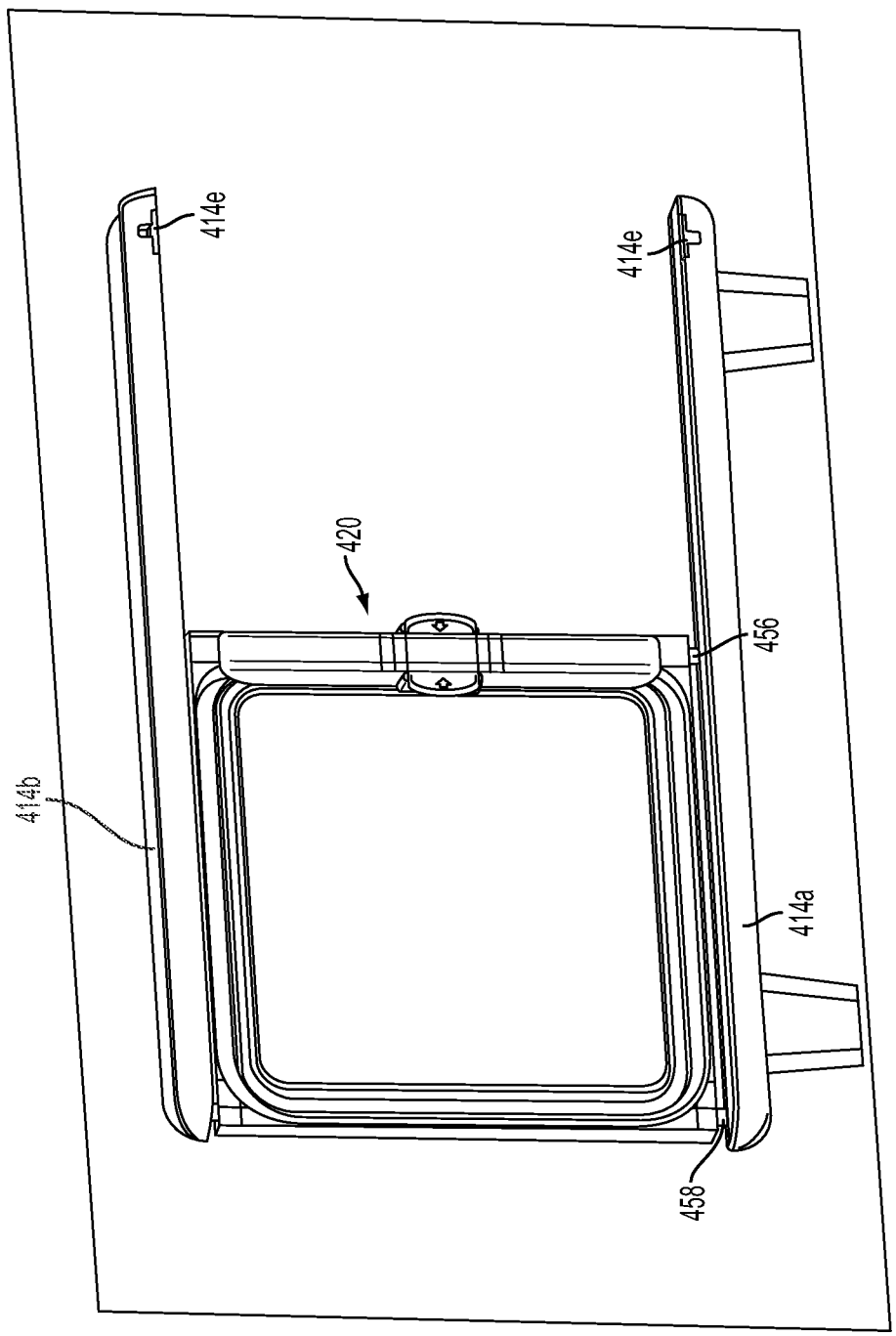

For example, and with reference to FIGS. 64A-D, the movable window panel assembly 420 may be angled relative to the channels or rails 414a, 414b so that first a lower channel follower 458 may be inserted into the channel of lower rail 414a (such as shown in FIG. 64A), and then the movable window panel assembly 420 may be pivoted to align the upper channel follower 458 with the channel of the upper rail 414b and then further pivoted so that the upper channel receives or partially receives the upper channel follower 458 therein (such as shown in FIG. 64B). As shown in FIG. 64B, this is done while the pin followers and pins 456 are pivoted away from the rails 414a, 414b. After the channel followers 458 are received in their respective channels, the movable window panel assembly 420 may be moved along the rails and pivoted to position the pin followers 456 generally at the slots or grooves 414d at the upper and lower rails 414b, 414a (such as shown in FIG. 64B). The movable window panel assembly 420 may then be pivoted to move the pin followers 456 through the grooves 414d and into the respective channels of the rails 414a, 414b (such as shown in FIG. 64C) and, after the movable window panel is so loaded onto or into the rails, the rail covers 414e may be pushed into the grooves 414d and may be snapped in place or otherwise retained at the rails 414a, 414b (such as shown in FIG. 64D) to limit or substantially preclude the movable window panel from being dislodged from the rails. Although shown in FIGS. 64A-D as a window assembly having a hole in a fixed window panel and a movable window panel assembly that moves relative to the single fixed window panel, clearly, the installation method and means shown in FIGS. 64A-D are applicable to any flush rear slider window assembly (such as a rear slider window assembly having a single fixed panel or dual fixed panels or the like, such as discussed herein) or flush side slider window assembly (such as the types described above) or the like, while remaining within the spirit and scope of the present invention.

Optionally, and as shown in FIGS. 66-74, the rear slider window assembly 410' may comprise a powered heater slider window assembly with a cable drive system operable to move the movable window panel between its opened and closed positions, as discussed below. Because rear slider window assembly 410' is otherwise substantially similar to rear slider window assembly 410, discussed above, the same reference numbers are used for the similar or common components of the window assemblies. As shown in FIGS. 66, 67 and 72-74, rear slider window assembly 410' includes heater grids at one or more of the window panels. For example, the fixed window panels 416, 418 may include heater grids 422, 423, while the movable window panel 420a may include a heater grid 424. The heater grids may include terminals for connection to a vehicle power source and busbars and/or a jumper wire or the like, such as described above. Because the movable window panel is guided along curved tracks or channels and is moved from a plane rearward of and along the fixed window panel or panels to a plane that is generally coplanar with the fixed window panels, the flexible connectors described above may not be suitable to provide power to the heater grid of the movable window panel. Thus, optionally, and desirably, the rear slider window assembly 410' may include a flexible electrical connector 468 for establishing electrical connection between the heater grid 422 of fixed window panel 416 and the heater grid 424 of movable window panel 420a by extending through one of the pins or channel followers of the movable window panel assembly 420. In the illustrated embodiment, a portion of the flexible connector 468 is disposed partially along the upper rail 414b and along or adjacent to the upper trailing channel 462, and another portion of the flexible connector is routed down and through the upper pin or channel follower 458 to connect to the heater grid of the movable window panel 420a.

Figure 75A:
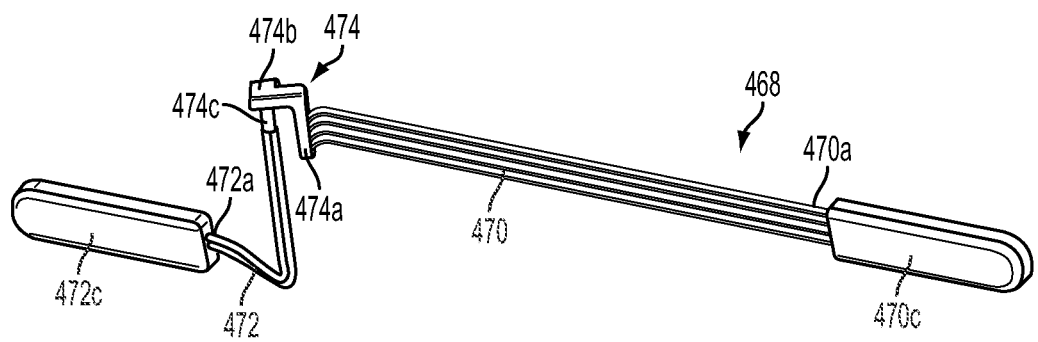
FIGS. 75A and 75B are perspective views of the flexible wiring that electrically connects terminals at the fixed window panel to terminals at the movable window panel in accordance with the present invention.
Figure 75B:
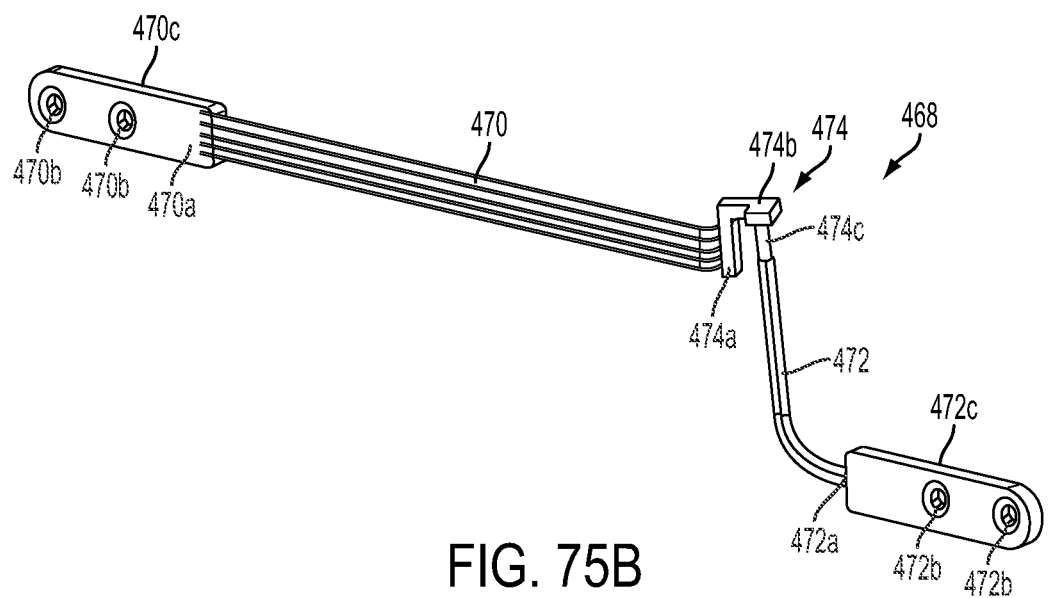

As can be seen with reference to FIGS. 75A and 75B, flexible connector 468 comprises a flexible flat cable or ribbon cable 470 at one end portion and a pair of wires 472 at the other end portion, with the ribbon cable 470 electrically connecting to the pair of wires 472 at a guide element 474 (and with the wiring connected at the guide element via any suitable means and optionally, with the guide element comprising a plastic or polymeric element that has electrical conductors insert molded therein to provide electrical connection between the ribbon cable 470 and the pair of wires 472). A fixed end 470a of ribbon cable 470 of flexible connector 468 includes a pair of terminals 470b, which are attached at respective terminals at fixed window panel 416, while a connecting end 472a of wires 472 includes a pair of terminals 472b, which are attached at respective terminals of heater grid 424 of movable window panel 420a. The terminals 470b, 472b may be covered or housed by a plastic or polymeric overmold 470c, 472c, to conceal the electrical connections at the respective heater grids or terminals. The terminals 470b, 472b may be snapped or otherwise secured to the respective terminals at the window panels, which may be soldered or otherwise electrically conductively attached or connected to the busbars at the window panels, such as in a similar manner as discussed above.

Figure 68:
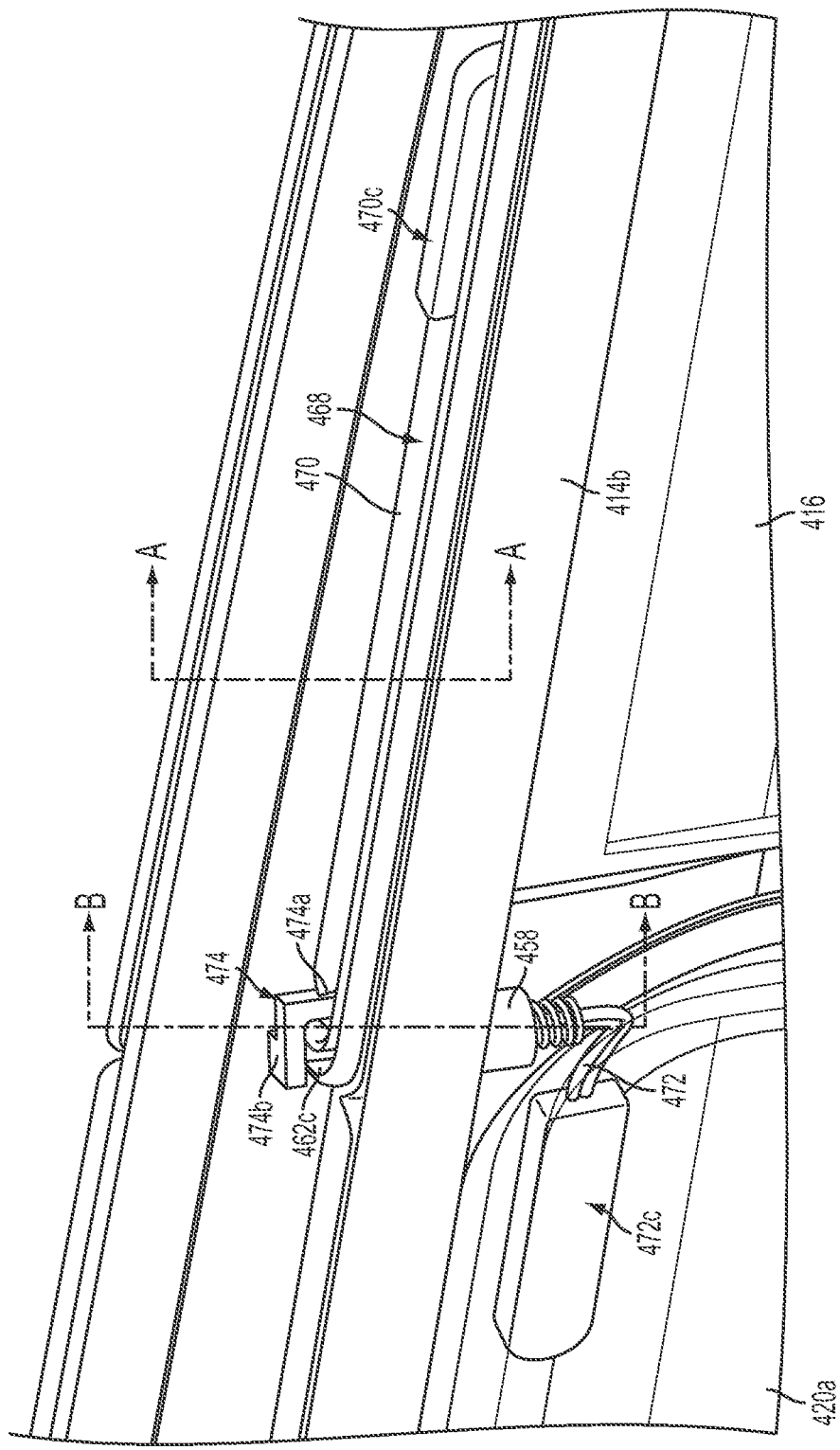
FIG. 68 is a perspective view of an upper rail of the rear slider window assembly of FIGS. 66 and 67.
Figure 68B:
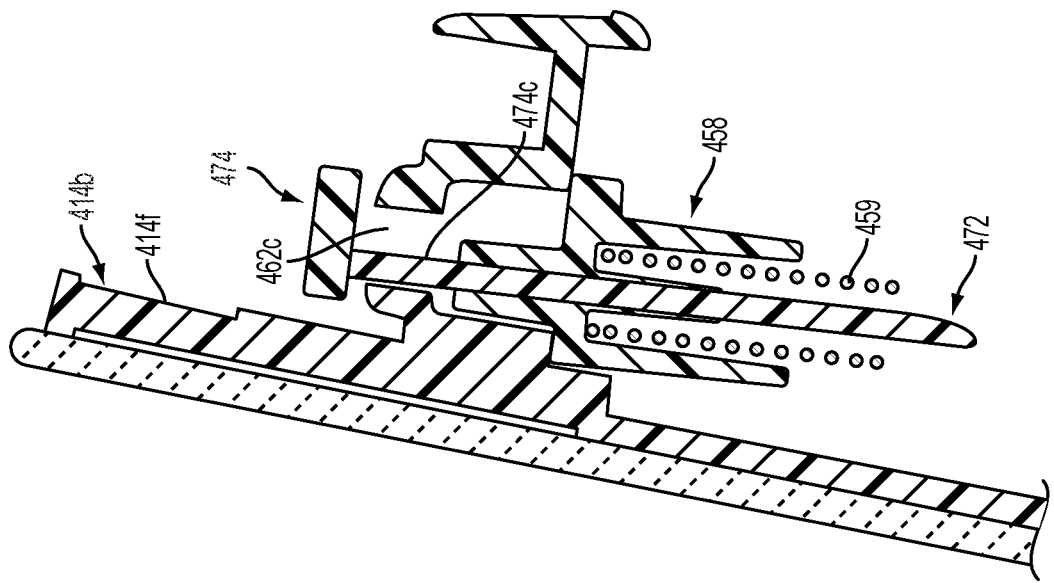
FIG. 68B is a sectional view of the rear slider window assembly taken along the line B-B in FIG. 68.
Figure 68A:
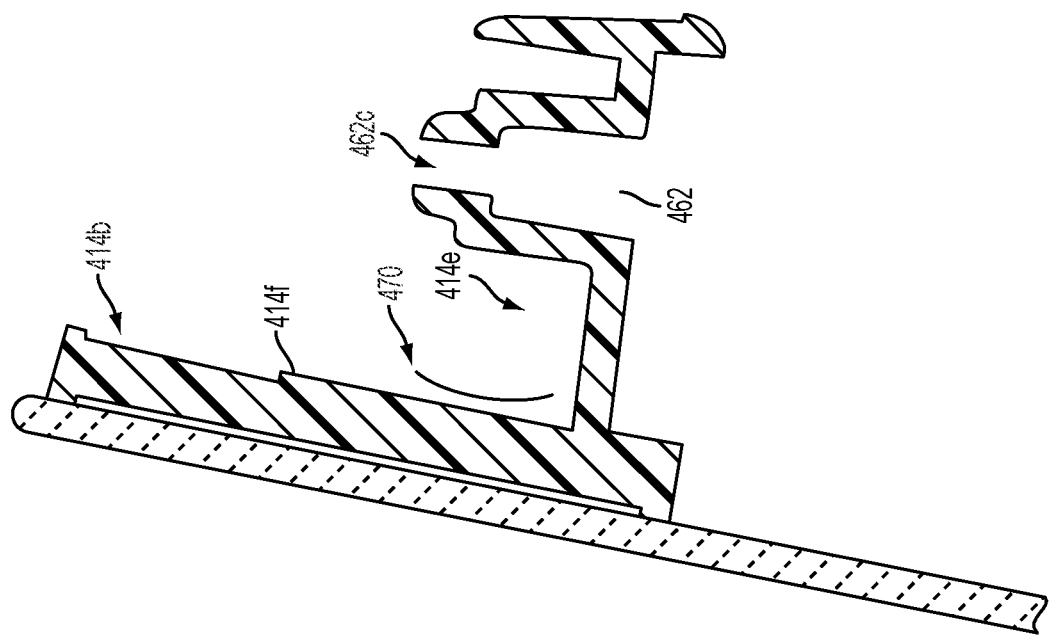
FIG. 68A is a sectional view of the rear slider window assembly taken along the line A-A in FIG. 68.
Figure 69:
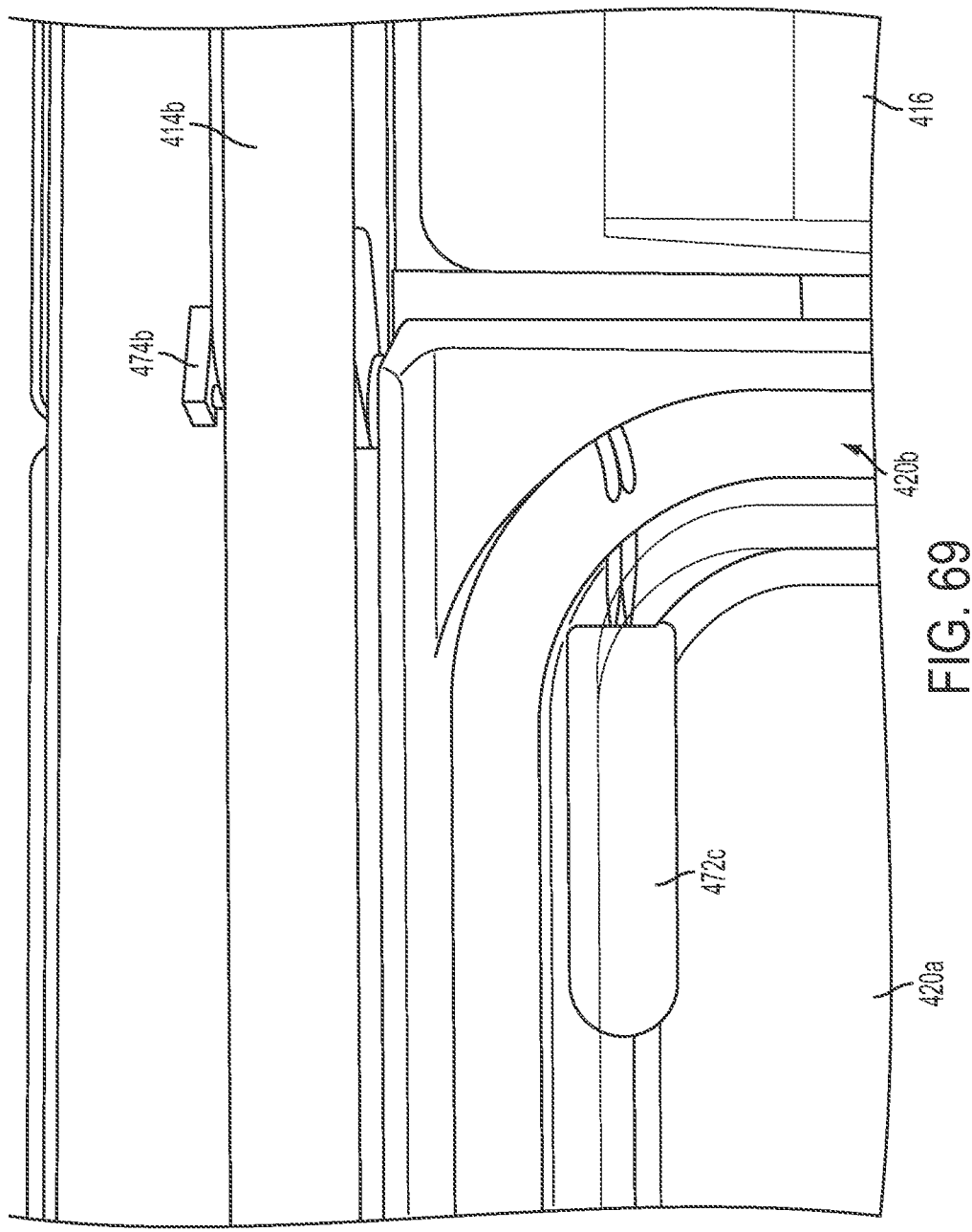
FIG. 69 is another perspective view of a portion of the rear slider window assembly of FIGS. 66 and 67.
Figure 70:
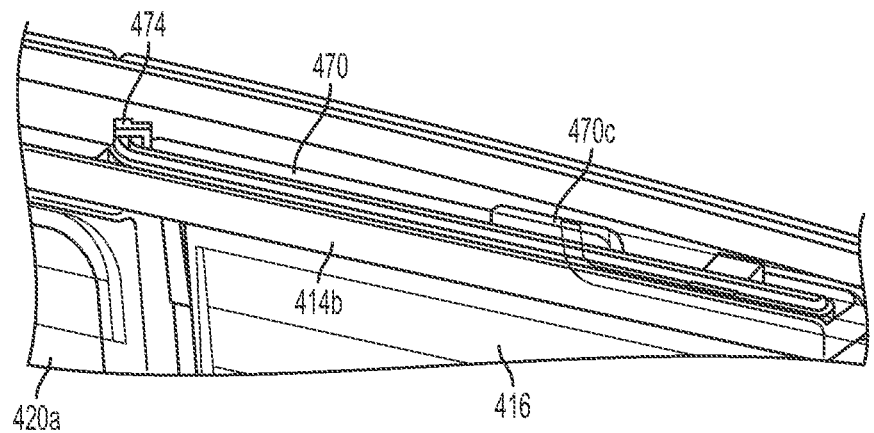
FIG. 70 is another perspective view of the upper portion of the rear slider window assembly of FIGS. 66 and 67.
Figure 71:
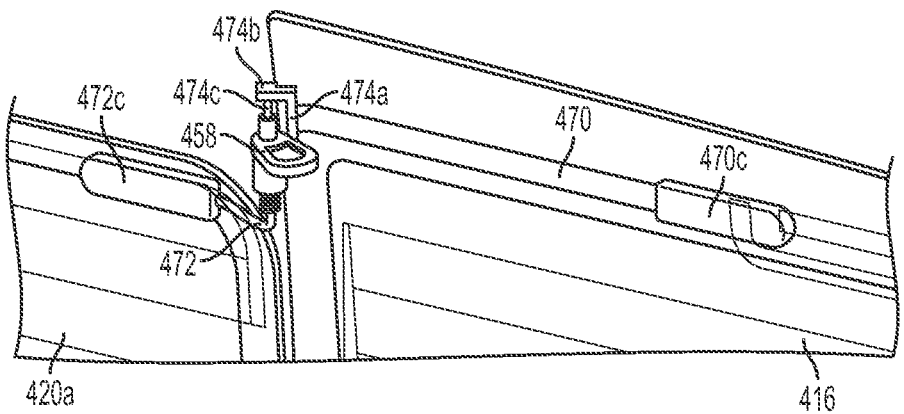
FIG. 71 is a perspective view similar to that of FIG. 70, but with the upper rail and appliqué and carrier frame removed to show details of the flexible wire connection to the movable window panel.
Figure 72:
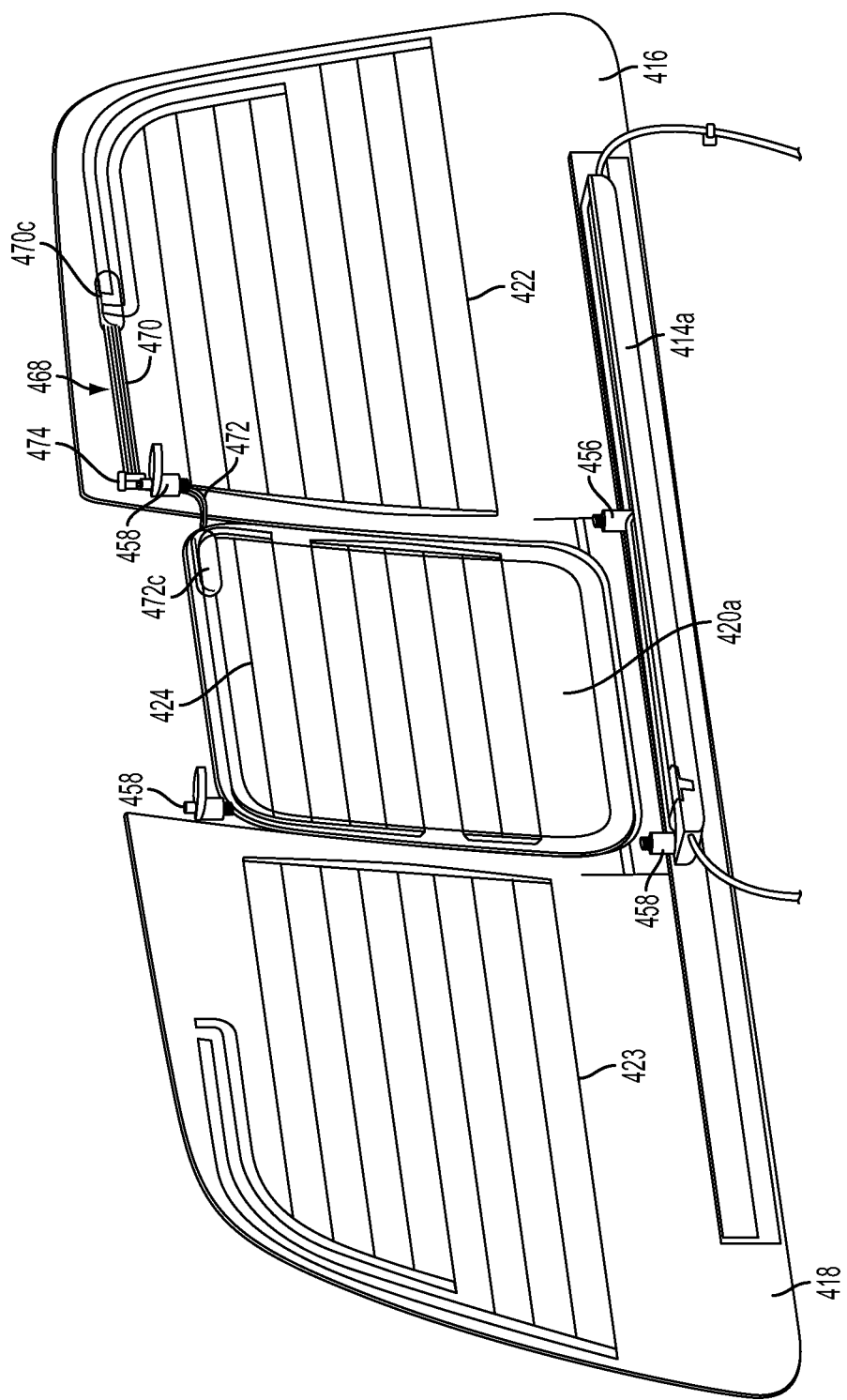
FIGS. 72-74 are perspective views of the rear slider window assembly of FIGS. 66 and 67, with various elements removed to show additional details.
Figure 73:
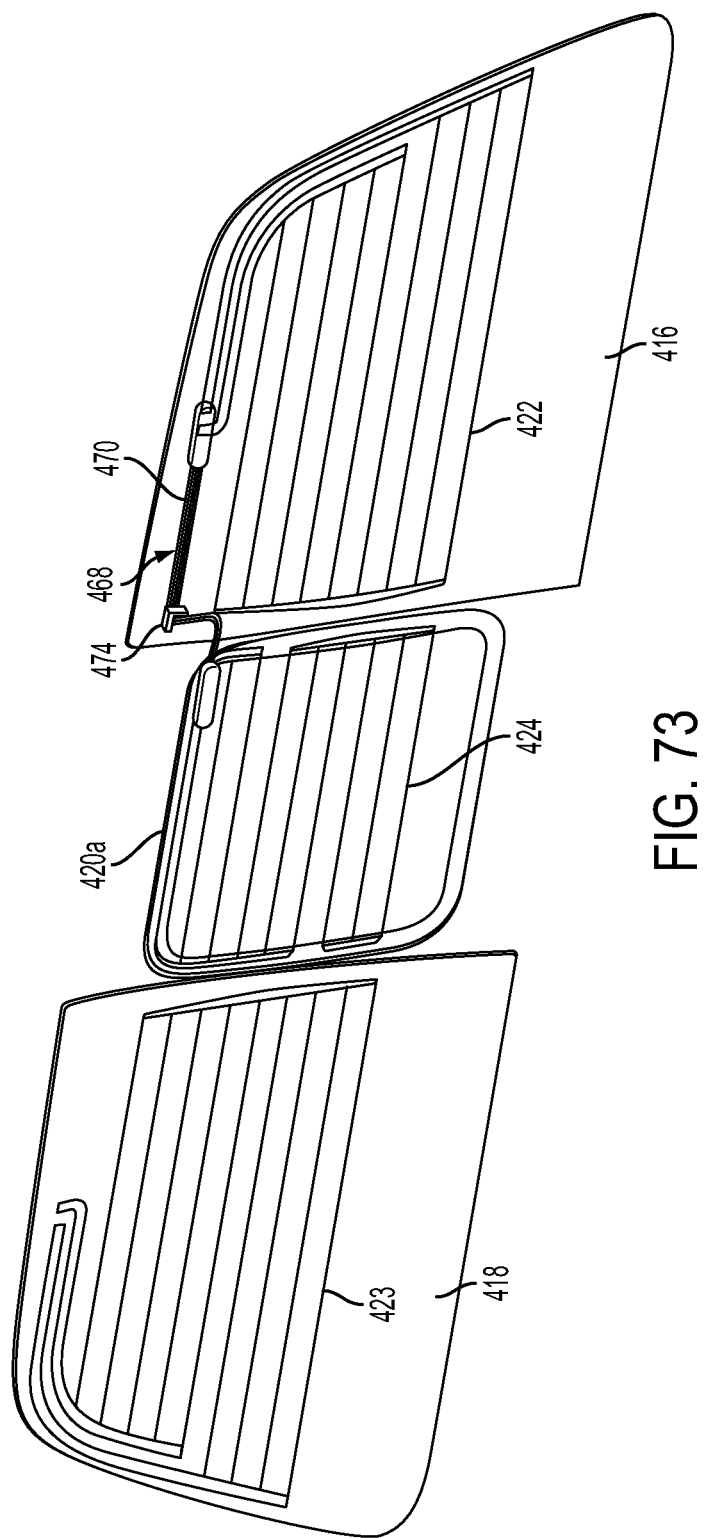
Figure 74:
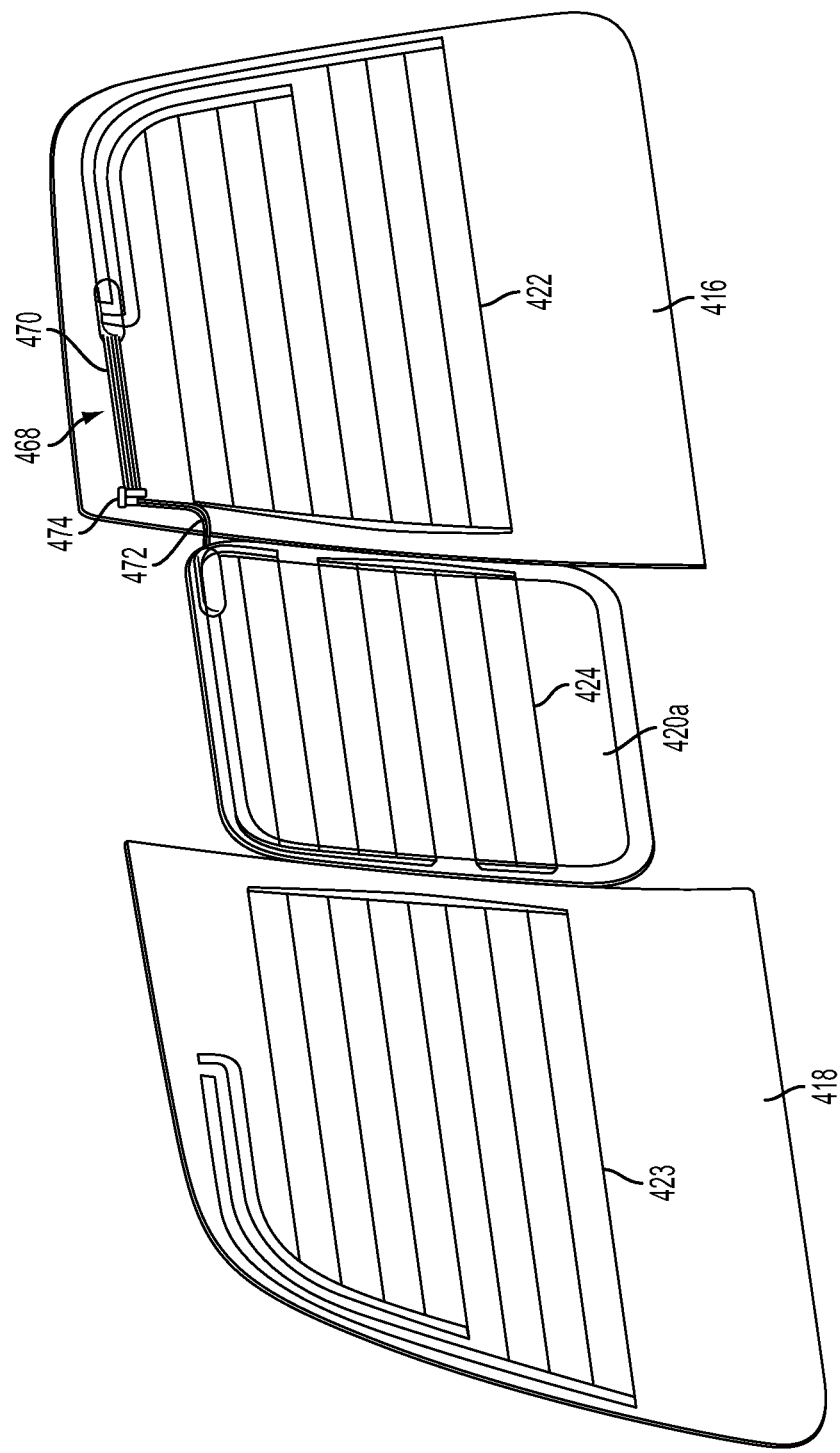

As best shown in FIGS. 68 and 68A, flexible ribbon cable 470 is disposed along upper rail 414a and along a channel or recess 414e established between the walls of upper trailing channel 462 and a mounting portion 414f of upper rail 414a. The guide element 474 moves along a groove 462c established through channel 462 and includes a first connecting portion 474a that connects to the ribbon cable 470 and an upper portion 474b that rides or slides along the rail 414a and a pin portion or second connecting portion 474c that protrudes through groove 462c, with the upper portion 474b joining or bridging between connecting portions 474a, 474c, and with electrically conductive elements extending through the connecting portions and upper portion to electrically conductively connect the wires or electrically conducting elements of ribbon cable 470 with the wires 472 at the movable window panel. As best shown in FIG. 68B, the wires 472 extend through the channel follower or pin at the upper trailing corner of the movable window assembly 420. Note that, because rear slider window assembly 410' is a powered slider window, a channel follower 458 is disposed at the upper trailing corner of the movable window assembly 420, but the wires may be routed through a pin 456 and partially along or around the detent pin 466a for applications of the heater grid powering system with a manually movable rear slider window assembly such as rear slider window assembly 410, discussed above.

Thus, the guide element 474 is moved along the channel 462 as the movable window panel is moved between its opened and closed positions. The flexible ribbon cable 470 flexes and folds over itself as the movable window is opened (such as in a similar manner as the flexible cables described above, and optionally with similar guiding means and attaching means as discussed above), while the wires 472 make the electrical connection from the guide element 474 to the terminals at the movable window panel. The wires 472 extend through the pin or channel follower 458 and through the frame 420b and to the glass surface of the window panel at or near the upper trailing corner of the window panel 420a. The frame 420b may be modified or configured encase or house or cover the overmold or cover 472c at the attachment of the wires 472 to the terminals at the movable window panel 420a. The flexible connector 468 thus establishes electrically conductive connection between the electrical terminals at the fixed window panel (or optionally at the frame or other fixed portion of the window assembly or vehicle) and the electrical terminals at the movable window panel to provide electrical power to the heater grid of the movable window panel irrespective of a position of the movable window panel relative to the fixed window panels of the flush rear slider window assembly.

Figure 76:
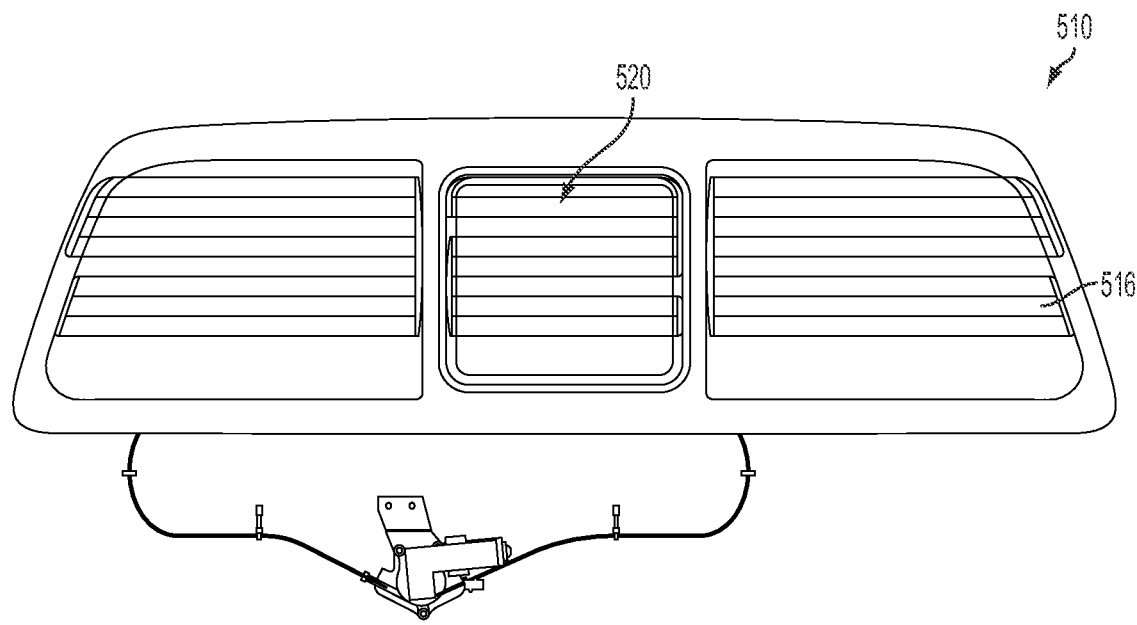
FIG. 76 is an exterior view of another flush rear slider window assembly in accordance with the present invention, with a single fixed window panel having a hole established therethrough.
Figure 77:
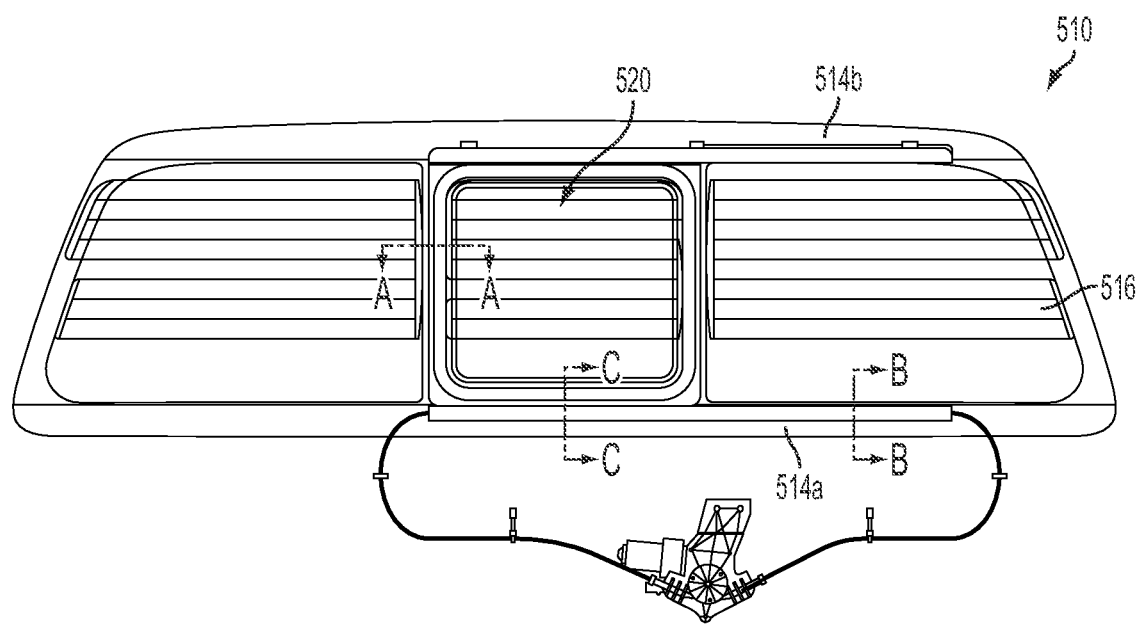
FIG. 77 is an interior view of the flush rear slider window assembly of FIG. 76.

Optionally, any of the rear slider window assembly exemplary embodiments of the present invention discussed above may comprise a single fixed window panel with a hole or opening established therethrough and with the rails bonded to or disposed along the single panel to provide for movement of the movable window panel relative to the single fixed panel to open and close the window opening. For example, and with reference to FIGS. 76-78, a rear slider window assembly 510 includes a single fixed window panel 516 and a movable window panel assembly 520 that is movable along rails 514a, 514b adhered or bonded or attached to the fixed window panel 516, such as in a similar manner as described above. In the illustrated embodiment, the rear slider window assembly 510 comprises a flush rear slider window assembly similar to rear slider window assemblies 410, 410', discussed above. Because many of the elements and aspects of the rear slider window assembly 510 are similar to rear slider window assemblies 410, 410', a detailed discussion of the window assemblies need not be repeated herein. The common or substantially similar components or elements of the window assemblies are referenced with like reference numbers, but with 100 added to the reference numbers in FIGS. 76-79.

Figure 77A:
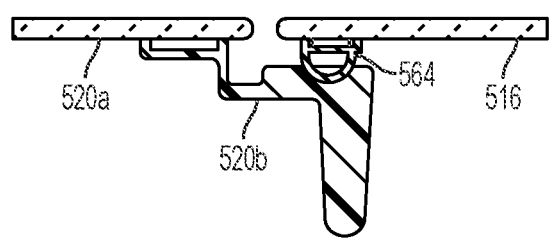
FIG. 77A is a sectional view taken along the line A-A in FIG. 77.
Figure 77B:
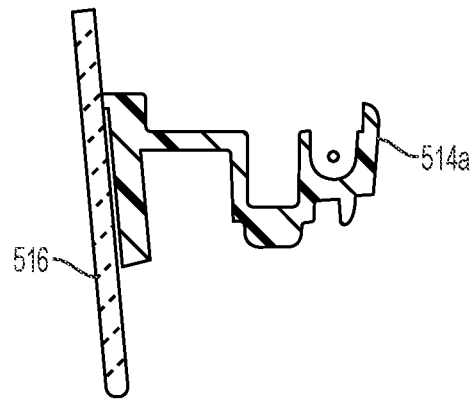
FIG. 77B is a sectional view taken along the line B-B in FIG. 77.
Figure 77C:
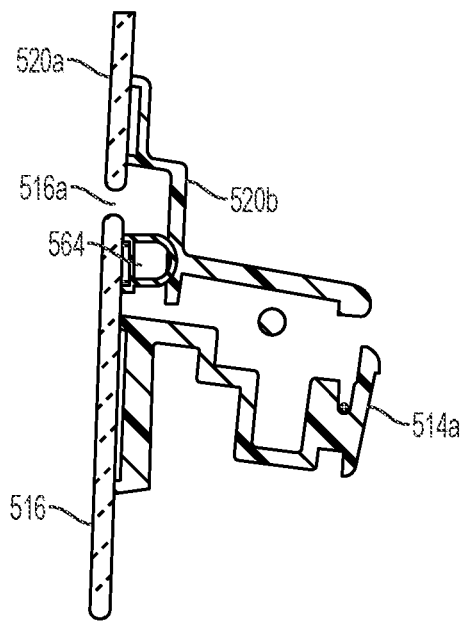
FIG. 77C is a sectional view taken along the line C-C in FIG. 77.
Figure 77D:
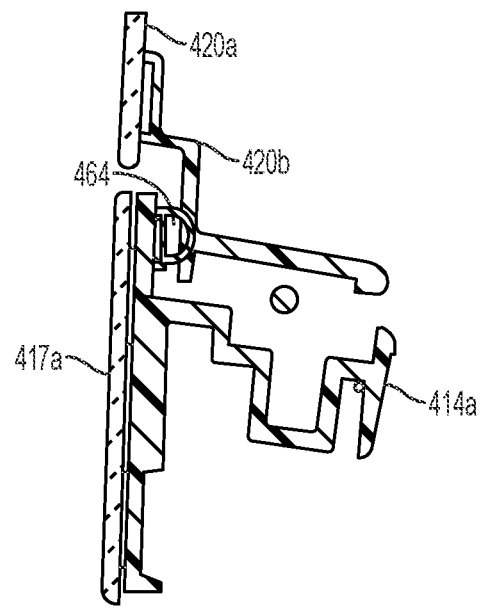
FIG. 77D is a sectional view similar to FIG. 77C, but showing the appliqué that is present between two spaced apart fixed window panels, such as for the rear slider window assembly of FIGS. 52 and 53.

As shown in FIGS. 77A-C, the lower frame 514a is bonded to the fixed window panel 516 generally below the opening 516a established through fixed window panel 516, with the perimeter sealing element 564 bonded or adhered to the fixed panel 516 around the opening 516a, such that the frame 520b of the movable window assembly 520 engages the seal 564 when the movable window panel is moved to its closed position, with the movable panel 520a being disposed in the opening 516a and generally coplanar with the fixed window panel 516. Optionally, and with reference to FIG. 77D, for window assembly 410', discussed above, the lower rail 414a may be bonded to the appliqué 417a, with the rail including the portion at which the sealing element 464 is disposed.

Figure 79:
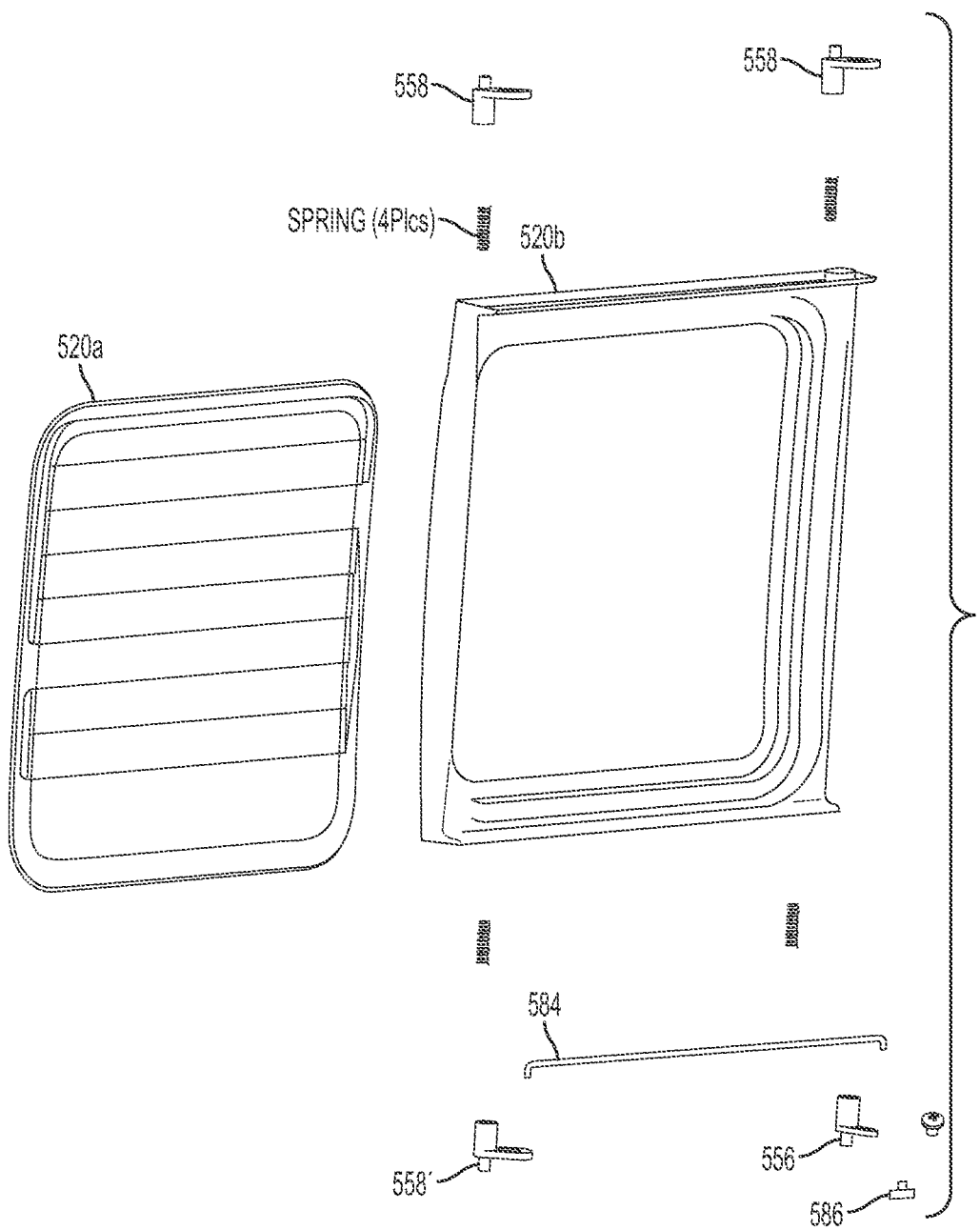
FIG. 79 is an exploded perspective view of the movable panel and carrier assembly of the flush rear slider window assembly of FIGS. 76 and 77.

In the illustrated embodiment, rear slider window assembly 510 comprises a powered slider window assembly, with a powered cable drive system 580 operable to open and close the movable window assembly 520 between its opened and closed positions. Because the movable window assembly 520 of rear slider window assembly 510 is moved via a cable drive system, the detent springs and latching mechanism are not incorporated into the movable window assembly 520, and instead, and as shown in FIG. 79, movable window assembly 520 includes three channel followers 558, 558' disposed at the upper and lower leading corners of the frame 520b and at the upper trailing corner of the frame 520b (where a flexible heater grid wiring assembly 568 may be disposed to provide electrical power to a heater grid at the movable window panel 520a, such as in a similar manner as described above).

The drive assembly or system 580 may comprise a cable 582 that is attached at a connector at or near one of the pins or channel followers of the movable window panel, whereby movement of the cable or cables in either direction causes movement of the movable window panel between its opened and closed positions. For example, and as can be seen with reference to FIGS. 78-83, the cable 582 may attach or connect at a lower following or trailing pin 556 of the movable window panel (that follows or trails the lower leading pin as the movable window panel is moved towards its closed position), and a link 584 may be connected between the following or trailing pin 556 and the leading pin and/or channel follower 558'. The link 584 functions to exert a pushing or pulling force at the leading pin and/or channel follower 558' as the movable window assembly 520 is moved between its opened and closed positions, and may be connected at the leading channel follower 558' at a slot 558c established at least partially along and at least partially through the lobe 558b of the leading channel follower 558'.

In the illustrated embodiment, pin 556 includes a lobe or tab 556a that has an aperture or hole for receiving or connecting to an end of link 584. A cable connector 586 is attached at an outer portion of the tab 556a and is connected to cable 582, such as via fixedly attaching to opposed ends of the cable or otherwise fixedly attaching to the cable such that movement of the cable or cables along rail 514a imparts a corresponding movement of the cable connector 586 and pin 556 and movable window assembly 520. Link 584 extends from pin 556 and generally along the lower rail 514a and is received in the slot 558c of the lobe or tab 558b of the channel follower 558'.

Figure 84A:
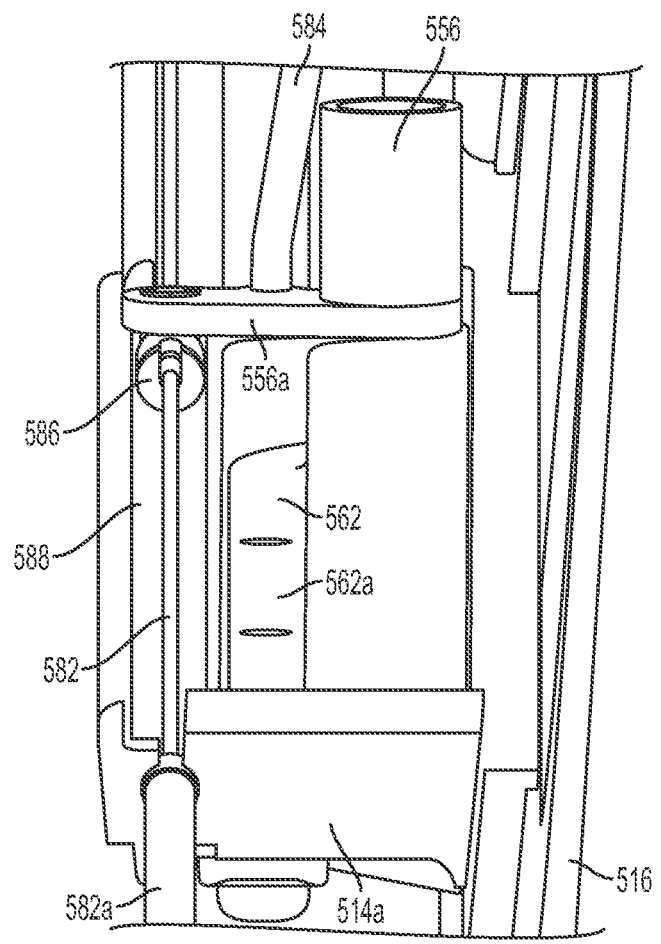
FIGS. 84A-C are perspective views showing the linkage connections and cable routing for the power linkage system of FIG. 80.
Figure 84B:
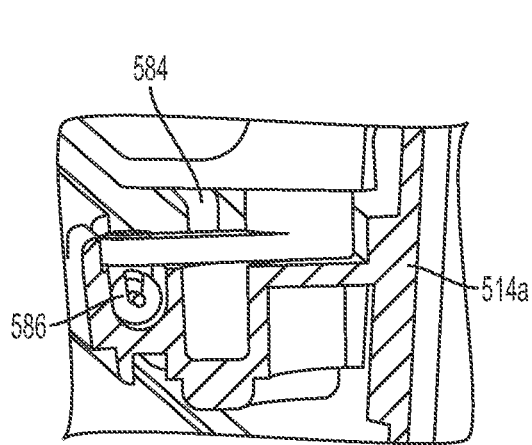
Figure 84C:
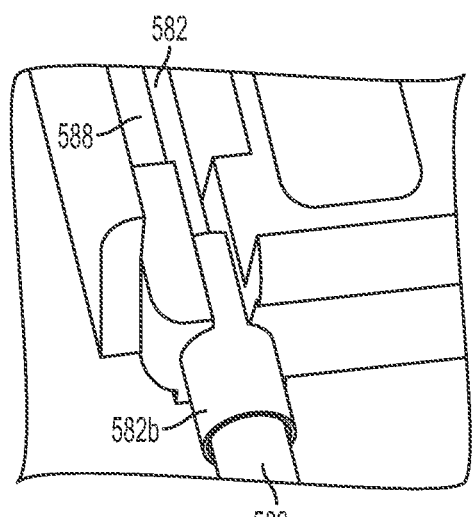

As can be seen with reference to FIGS. 79-81 and 54A-C, link 584 extends along rail 514a above the lower channels 560, 562 (where the pins and channel followers and link and rails may be covered or encased by suitable trim or cover elements to conceal the moving parts of the rear slider window assembly in a known manner). As shown in FIGS. 84A-C, lower rail 514a includes a cable routing channel 588 established generally along the rail and generally parallel to the elongated straight portion 562a of lower channel 562. The cable 582 and cable connector 586 move along the channel 588 pulling the window assembly in either direction responsive to the drive motor 580a of the cable drive system 580. As shown in FIG. 84C, the cable conduit 582a may be secured at opposite ends of the channel 588 and/or rail 514a, such as via a bushing and end cap 582b fitted into a recessed area at the ends of the rail 514a, which retains the cable so as to maintain the cable in a substantially straight line throughout the motion of opening or closing of the movable window panel.

Thus, responsive to actuation of the drive motor 580a, the cable 582 pulls at the cable connector 586 in one direction or the other to move the cable connector 586 and pin 556 along the channel 562. When pin 556 is moved via pulling of the cable to close the movable window panel 520a, pin 556 may pivot and move and push link 584 along slot 558c of channel follower 558', whereby link 584 pushes against channel follower 558' to assist in smoothly moving the movable window assembly 520 along the channels and rails to its closed position. When the cable drive motor is actuated to open the window, the cable 582 pulls at cable connector 586 and pin 556 in the opposite direction, whereby pin 556 may rotate and move to open the window, and whereby link 584 may move back along slot 558c of channel follower 558' and pull at an outer portion of the lobe 558b to retract the channel follower 558' from the curved end 560b of leading channel 560. The slot configuration thus allows for some pivotal movement of pin 556 when the cable is moved in either direction and may assist in retracting the channel follower from its locked position at the curved end 560b of the channel 560 to enhance the opening of the movable window panel. Thus, the powered rear slider window assembly 510 provides enhanced control of the opening and closing of a flush movable window panel relative to the rails and fixed window panel or panels.

Thus, the rear slider window assembly for a vehicle may include a frame portion having an upper rail and a lower rail, a fixed window panel that is fixed relative to the frame portion, and a movable window panel that is movable along the upper and lower rails, wherein the movable window panel is movable between a closed position and an opened position. The upper and lower rails comprise channels and the movable window panel comprises pins and channel followers to track and guide the movable window panel along the upper and lower rails between the closed position and the opened position, and, when closed, the movable window panel is generally flush or coplanar with the fixed window panel. The movable window panel is movable between the closed position and the opened position via a powered cable drive system, which comprises at least one cable attached to a connector at a pin of the movable window panel, whereby movement of the at least one cable in either direction moves the movable window panel between the closed position and the opened position. The pin is disposed at a lower region of the movable window panel and is linked to the channel follower at the lower region of the movable window panel via a linkage connected to the pin and to the channel follower. Optionally, the linkage may be received in a slot established partially along a tab of the channel follower and the linkage may push at the channel follower at one end of the slot when the powered cable drive system operates to close the movable window panel and the linkage may pull at the channel follower at the other end of the slot when the powered cable drive system operates to open the movable window panel.

Optionally, the window assembly may include means for establishing and maintaining electrical connection to a heater grid of the movable window panel throughout the range of motion of the movable window panel may be implemented while remaining within the spirit and scope of the present invention, such as discussed above. The electrical connection means may comprise a flexible cable that is routed along one of the rails, such as an upper rail, and is routed along and/or through one of the guide pins and channel followers to the electrical connection at the movable window panel, such as also discussed above.

Optionally, the heater grid layouts or configurations for the window panels of the rear slider window assemblies of the present invention may comprise any suitable configuration or routings. As discussed above, the heater grids may be configured to have one or two generally vertical busbars along one side of the panel and two generally vertical busbars along the opposite side to enhance current flow through and along the heater grids. Optionally, it is envisioned that other heater grid configurations may be implemented while remaining within the spirit and scope of the present invention.

Figure 85:
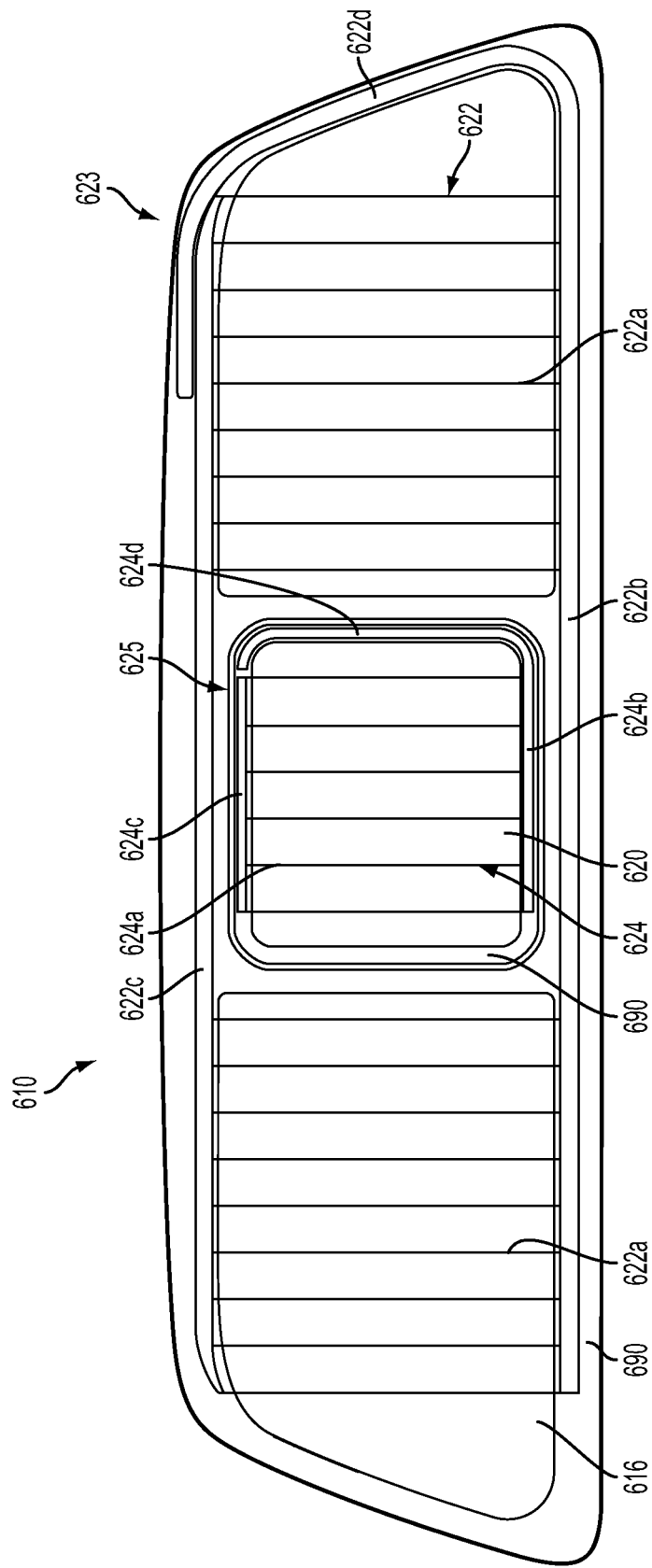
FIG. 85 is a plan view of another rear slider window assembly in accordance with the present invention, shown with busbars across the fixed window panel and vertical heater grids established at the window panels.
Figure 86:
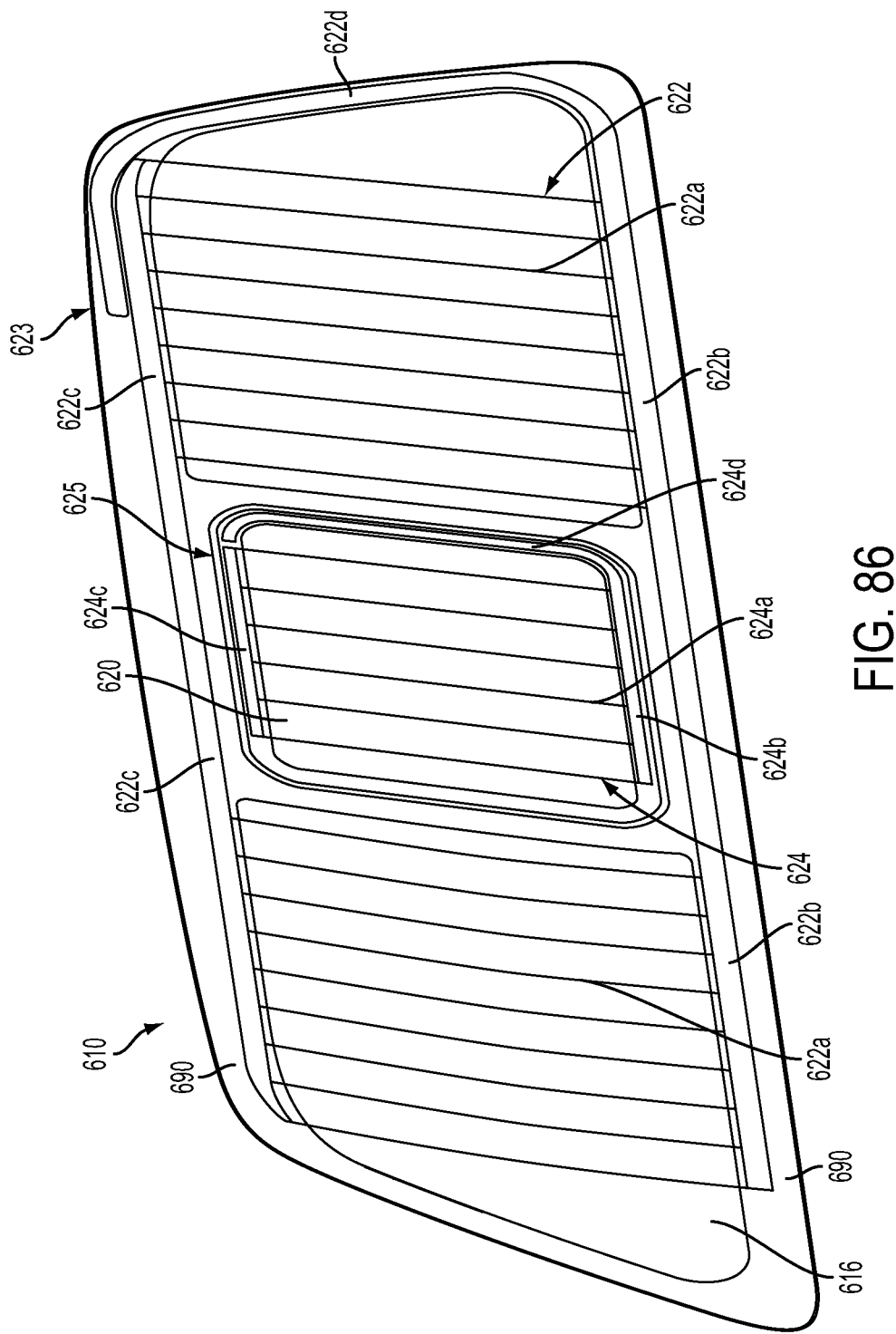
FIG. 86 is a perspective view of the rear slider window assembly of FIG. 85.
Figure 87:
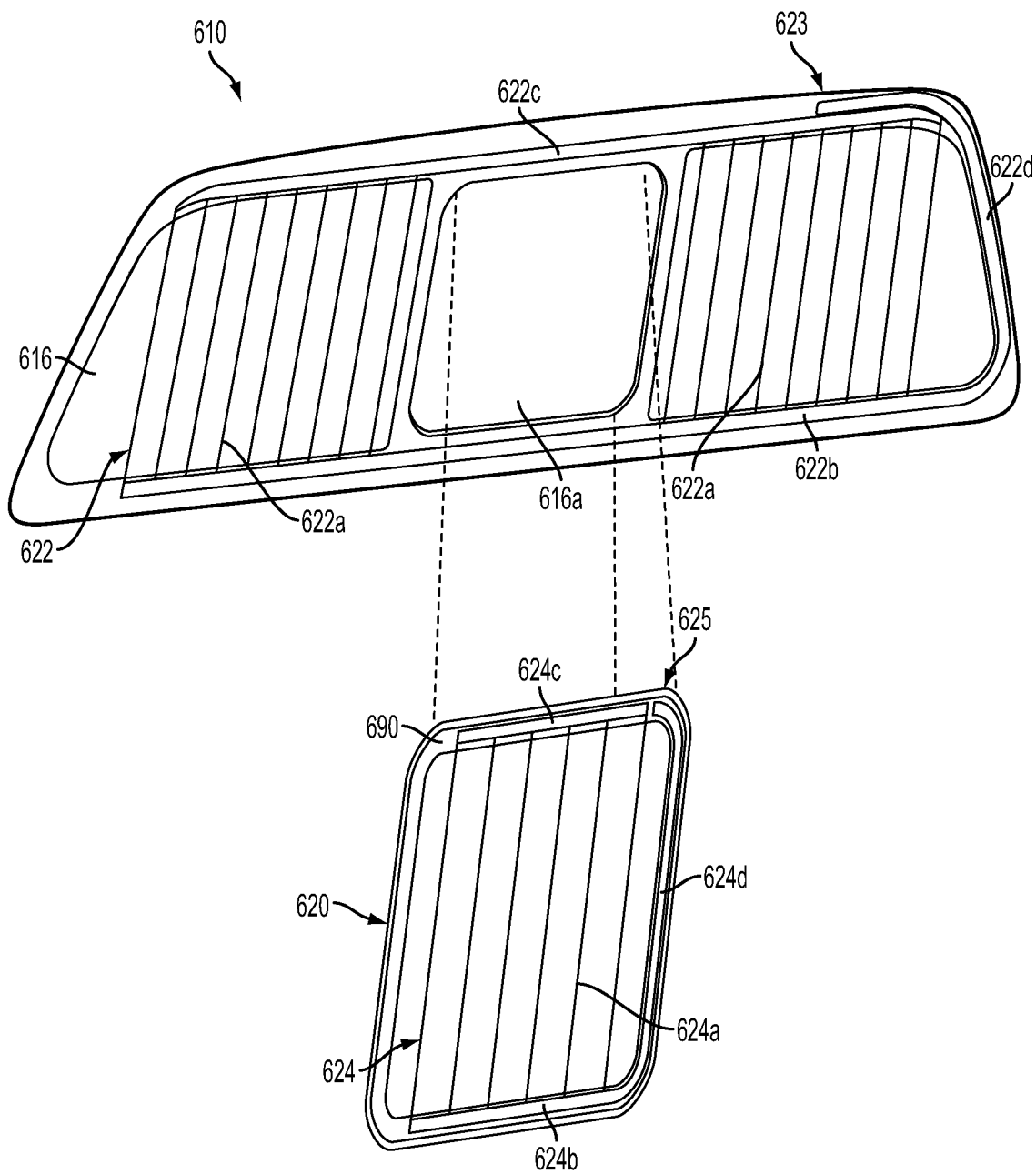
FIG. 87 is an exploded perspective view of the rear slider window assembly of FIGS. 85 and 86, shown with the movable panel removed and enlarged relative to the fixed panel.

For example, and with reference to FIGS. 85-87, a rear slider window assembly 610 may comprise a single fixed window panel 616 with an opening or hole 616a established therethrough and a movable window panel 620 that is movable relative to the fixed window panel between opened and closed positions, such as in a similar manner as described above. Note that the window assembly of FIGS. 85-87 is shown without the rails and without the movable window assembly frame and other components, in order to clearly show the window panels 616, 620 and their respective electrically conductive heater grids. The window assembly may comprise a flush window assembly similar to window assembly 510, discussed above, or may comprise a non-flush window assembly, while remaining within the spirit and scope of the present invention. Also, the window assembly may comprise a powered drive window assembly or a manually opening/closing window assembly, while remaining within the spirit and scope of the present invention.

In the illustrated embodiment, fixed window panel 616 includes a heater grid 622 having vertically oriented traces 622a at opposite sides of the panel, while movable window panel 620 includes a heater grid 624 having vertically oriented traces 624a. Fixed window panel 616 includes a lower busbar 622b extending across the fixed panel and electrically conductively connecting to the lower ends of the vertical traces 622a at either side region of the fixed window panel, and fixed window panel 616 further includes an upper busbar 622c extending across the fixed panel and electrically conductively connecting to the upper ends of the vertical traces 622a at either side region of the fixed window panel. One of the busbars 622b, 622c may extend along an outer perimeter region of the fixed panel 616 so as to provide a connecting region where a vehicle wiring harness may connect to both busbars at a common area (such as at a corner of the window assembly). For example, and as in the illustrated embodiment, a portion 622d of the lower busbar 622b extends along a side perimeter region of the fixed panel and is disposed partially along and adjacent to (yet spaced from and electrically isolated from) upper busbar 622c to establish a connecting region 623 for electrically connecting the busbars to a vehicle wiring harness or the like, such as via any suitable manner.

Similarly, the movable window panel 620 includes a lower busbar 624b extending across the movable panel and electrically conductively connecting to the lower ends of the vertical traces 624a and further includes an upper busbar 624c extending across the movable panel and electrically conductively connecting to the upper ends of the vertical traces 624a. One of the busbars 624b, 624c may extend along an outer perimeter region of the movable panel 620 so as to provide a connecting region where a flexible connector or cable may connect to both busbars at a common area (such as at a corner of the movable window panel). For example, and as in the illustrated embodiment, a portion 624d of the lower busbar 624b extends along a side perimeter region of the movable panel and is disposed partially along and adjacent to (yet spaced from or electrically isolated from) upper busbar 624c to establish a connecting region 625 for electrically connecting the busbars to the flexible connector, such as described above. In the illustrated embodiment, the window assembly comprises a flush movable window panel that is generally flush with the fixed panel when closed, but aspects of the heater grid configuration are suitable for non-flush window assemblies such as also described above, where a flexible ribbon cable or the like may provide electrical power to a corner region of the movable window panel.

Figure 88:
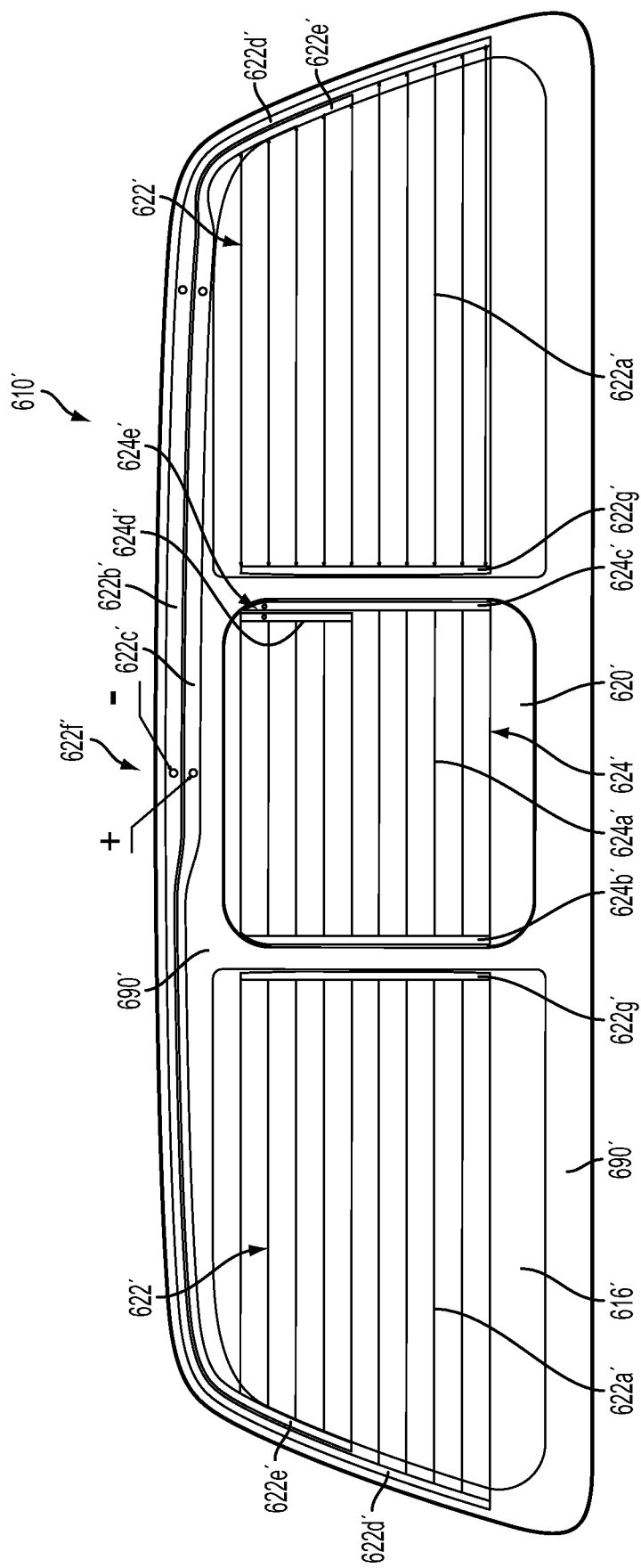
FIG. 88 is a plan view of another rear slider window assembly in accordance with the present invention, shown with busbars across the fixed window panel and horizontal heater grids established at the window panels.

Optionally, and with reference to FIG. 88, a rear slider window assembly 610' may comprise a single fixed window panel 616' with an opening or hole established therethrough and a movable window panel 620' that is movable relative to the fixed window panel between opened and closed positions, such as in a similar manner as described above, with horizontal heater grids, as discussed below. Note that the window assembly of FIG. 88 is shown without the rails and without the movable window assembly frame and other components, in order to clearly show the window panels 616', 620' and their respective electrically conductive heater grids. The window assembly may comprise a flush window assembly similar to window assembly 510', discussed above, or may comprise a non-flush window assembly, while remaining within the spirit and scope of the present invention. Also, the window assembly may comprise a powered drive window assembly or a manually opening/closing window assembly, while remaining within the spirit and scope of the present invention.

In the illustrated embodiment, fixed window panel 616' includes a heater grid 622' having horizontally oriented traces 622a' at opposite sides of the panel, while movable window panel 620' includes a heater grid 624' having horizontally oriented traces 624a'. Fixed window panel 616' includes a first upper busbar 622b' extending across the fixed panel and electrically conductively connecting to the upper ends of side busbars 622d' (or unitarily formed or established with the side busbars 622d') at either side/end region of the fixed window panel, and fixed window panel 616' further includes a second upper busbar 622c' extending across the fixed panel and electrically conductively connecting to the upper ends of side busbars 622e' at either side/end region of the fixed window panel. The busbars 622b', 622c' provide a connecting region 622f' where a vehicle wiring harness may connect to both busbars at a common area (such as at a generally central region of the window assembly or at a corner region or the like), such as via any suitable manner. For example, a positive terminal may be provided at upper busbar 622c' and a negative terminal may be provided at upper busbar 622b', such as shown in FIG. 88. The fixed window panel 616' further includes vertical busbars 622g' along or near the opening, such that some of the horizontal heater traces 624a' are electrically connected between side busbar 622e' and busbar 622g' and others of the horizontal heater traces 624a' are electrically connected between busbar 622g' and side busbar 622d'.

Similarly, the movable window panel 620' includes a side busbar 624b' extending generally vertically along one side region of the movable panel and electrically conductively connecting to the respective ends of the horizontal traces 624a' and further includes a second busbar 624c' extending generally vertically along the opposite side region of the movable panel and electrically conductively connecting to the respective ends of some of the vertical traces 624a', and a third busbar 624d' that extends generally vertically and partially along the opposite side region of the movable panel and electrically conductively connecting to the respective ends of the others of the vertical traces 624a'. The busbars 624c', 624d' provide a connecting region 624e' where a flexible connector or cable may connect to both busbars at a common area (such as at a corner of the movable window panel), such as in the manners described above. Thus, electrical current may flow along some of the horizontal traces 624a' between busbars 624c' and 624b' and electrical current may flow along others of the horizontal traces 624a' between busbars 624b' and 624d'. In the illustrated embodiment, the window assembly comprises a flush movable window panel that is generally flush with the fixed panel when closed, but aspects of the heater grid configuration are suitable for non-flush window assemblies such as also described above, where a flexible ribbon cable or the like may provide electrical power to a corner region of the movable window panel.

Thus, by establishing the busbars across the upper and lower regions of the single fixed panel, the window assembly of the present invention obviates the need for a jumper wire or additional vehicle wiring connectors or the like, and provides enhanced current flow and heating at both side regions of the fixed window panel. The busbars may be established at or along the surface of the glass panels and a concealing layer, such as an opaque or substantially opaque frit layer 690, 690' may be disposed at the perimeter regions of the fixed and movable glass panels to substantially hide or conceal the busbars from view to a person viewing the window assembly when the window assembly is normally mounted in the vehicle. Although shown as having the vehicle connection at an upper corner of the fixed window panel (in FIGS. 85-87) or at an upper, generally central location (FIG. 88), clearly the electrical connection area may be anywhere around the perimeter region of the window assembly, such as at another corner than shown, or such as at a side region (where the upper busbar may be disposed partially downward along the side region and the lower busbar may be disposed partially upward along the side region) or at two separate regions (such as where a vehicle positive feed connects to either the upper or lower busbar at an upper or lower portion of the window and a vehicle negative feed connects to either the lower or upper busbar at a lower or upper portion of the window), while remaining within the spirit and scope of the present invention. Thus, the window assembly of the present invention (with the conductive busbars extending across the upper and lower regions of the fixed panel) provides enhanced flexibility for electrically connecting the heater grid to the vehicle wiring harness, since various connecting locations may be used depending on the particular application of the window assembly and the desired wiring of the vehicle at which the window assembly is installed.

Changes and modifications to the specifically described embodiments may be carried out without departing from the principles of the present invention, which is intended to be limited only by the scope of the appended claims, as interpreted according to the principles of patent law.

The invention claimed is:

1. A vehicular rear slider window assembly, the vehicular rear slider window assembly comprising:
    a first fixed window panel and a second fixed window panel spaced from the first fixed window panel, wherein the first fixed window panel is at one side of an opening through a central region of the vehicular rear slider window assembly, and wherein the second fixed window panel is at an opposite side of the opening;
    a frame portion comprising an upper rail and a lower rail fixedly attached at the first and second fixed window panels;
    a movable window panel that is movable along the upper and lower rails, wherein the movable window panel is movable between a closed position and an opened position relative to the opening, and wherein the movable window panel is disposed at the opening when in the closed position;
    a first heater grid disposed at a surface of the first fixed window panel, wherein the first heater grid has a first positive jumper connection and a first negative jumper connection at the first fixed window panel;
    a second heater grid disposed at the a surface of the second fixed window panel, wherein the second heater grid has a second positive jumper connection and a second negative jumper connection at the second fixed window panel;
    a jumper electrical connector comprising (i) a first end that electrically connects to the first positive jumper connection and the first negative jumper connection of the first heater grid and (ii) a second end that electrically connects to the second positive jumper connection and the second negative jumper connection of the second heater grid;
    a third heater grid disposed at a surface of the movable window panel;
    a flexible electrical connector comprising (i) a first end that makes electrical connection to electrical contacts at the first fixed window panel or the second fixed window panel and (ii) a second end that makes electrical connection to electrical contacts of the third heater grid of the movable window panel;
    wherein the first fixed window panel has a positive terminal and a negative terminal at the first heater grid, and wherein the positive terminal and the negative terminal are configured to electrically connect to at least one electrical connector of a vehicle wire harness when the vehicular rear slider window assembly is installed at a vehicle; and
    wherein, when the positive and negative terminals of the first fixed window panel are electrically connected to the at least one electrical connector of the vehicle wire harness and electrically powered, electrical power is provided to (i) the first heater grid, (ii) the second heater grid via the jumper electrical connector and (iii) the third heater grid via the flexible electrical connector.

2. The vehicular rear slider window assembly of claim 1, wherein the first end of the flexible electrical connector makes electrical connection at the second positive jumper connection and the second negative jumper connection of the second heater grid.

3. The vehicular rear slider window assembly of claim 1, wherein the first end of the flexible electrical connector makes electrical connection near the second positive jumper connection and the second negative jumper connection of the second heater grid.

4. The vehicular rear slider window assembly of claim 1, wherein the first end of the flexible electrical connector makes electrical connection at the first positive jumper connection and the first negative jumper connection of the first heater grid.

5. The vehicular rear slider window assembly of claim 1, wherein the first end of the flexible electrical connector makes electrical connection near the first positive jumper connection and the first negative jumper connection of the first heater grid.

6. The vehicular rear slider window assembly of claim 1, wherein the jumper electrical connector comprises a pair of electrically conductive wires.

7. The vehicular rear slider window assembly of claim 1, wherein the jumper electrical connector comprises a pair of electrically conductive traces established at the surface of the first fixed window panel and the surface of the second fixed window panel and least partially across the first and second fixed window panels.

8. The vehicular rear slider window assembly of claim 7, wherein the first and second fixed window panels are part of a single fixed window panel having the opening therethrough, and wherein the pair of electrically conductive traces are established across an upper or lower window panel portion that spans between and joins the first and second fixed window panels.

9. The vehicular rear slider window assembly of claim 1, wherein the first and second fixed window panels are part of a single fixed window panel having the opening therethrough.

10. The vehicular rear slider window assembly of claim 1, wherein the first fixed window panel is separate from the second fixed window panel, and wherein (i) an upper panel portion is disposed above the opening and (ii) a lower panel portion is disposed below the opening.

11. The vehicular rear slider window assembly of claim 1, wherein the first heater grid comprises a plurality of electrically conductive traces disposed at the surface of the first fixed window panel, and wherein the second heater grid comprises a plurality of electrically conductive traces disposed at the surface of the second fixed window panel, and wherein the third heater grid comprises a plurality of electrically conductive traces disposed at the surface of the movable window panel.

12. The vehicular rear slider window assembly of claim 11, wherein, when the positive and negative terminals of the first fixed window panel are electrically connected to the at least one electrical connector of the vehicle wire harness and electrically powered, electrical current flows in a single direction across the plurality of electrically conductive traces of the first heater grid and across the plurality of electrically conductive traces of the second heater grid.

13. The vehicular rear slider window assembly of claim 1, wherein the vehicular rear slider window assembly comprises no more than the positive terminal and the negative terminal of the first fixed window panel for electrically powering the first heater grid, the second heater grid and the third heater grid when the vehicular rear slider window assembly is mounted at the vehicle.

14. A vehicular rear slider window assembly, the vehicular rear slider window assembly comprising:
  a fixed window panel comprising (i) an opening through a central region of the fixed window panel, (ii) a first fixed panel at one side of the opening, (iii) a second fixed panel at another side of the opening, (iv) an upper portion above the opening and a (v) a lower portion below the opening;
  a frame portion comprising an upper rail and a lower rail fixedly attached at the fixed window panel;
  a movable window panel that is movable along the upper and lower rails, wherein the movable window panel is movable between a closed position and an opened position relative to the opening of the fixed window panel, and wherein the movable window panel is disposed at the opening when in the closed position;
  a first heater grid disposed at a surface of the first fixed panel, the first heater grid comprising a plurality of electrically conductive traces extending at least partially across the first fixed panel;
  a second heater grid disposed at a surface of the second fixed panel, the second heater grid comprising a plurality of electrically conductive traces extending at least partially across the second fixed panel;
  a third heater grid disposed at a surface of the movable window panel;
  a flexible electrical connector comprising (i) a first end that makes electrical connection to electrical contacts at the first fixed panel or the second fixed panel and (ii) a second end that makes electrical connection to electrical contacts of the third heater grid of the movable window panel;
  a first busbar disposed at the first fixed panel and electrically connecting at a first end of the plurality of electrically conductive traces of the first heater grid;
  a second busbar disposed at the second fixed panel and electrically connecting at a first end of the plurality of electrically conductive traces of the second heater grid;
  wherein the first busbar has a positive terminal disposed thereat, and wherein the second busbar has a negative terminal disposed thereat;
  wherein the positive terminal and the negative terminal are configured to electrically connect to at least one electrical connector of a vehicle wire harness when the vehicular rear slider window assembly is installed at a vehicle;
  wherein, when the positive terminal and the negative terminal of the first fixed panel are electrically connected to the at least one electrical connector of the vehicle wire harness and electrically powered, electrical power is provided to (i) the first heater grid, (ii) the second heater grid and (iii) the third heater grid; and
  wherein, when the positive terminal and the negative terminal of the first fixed panel are electrically connected to the at least one electrical connector of the vehicle wire harness and electrically powered, electrical current flows in a single direction across the fixed window panel from the first busbar to the second busbar.

15. The vehicular rear slider window assembly of claim 14, wherein the positive terminal is at the first fixed panel, and wherein the negative terminal is at the first fixed panel.

16. The vehicular rear slider window assembly of claim 15, wherein the second busbar extends at least partially across the fixed window panel above or below the opening.

17. The vehicular rear slider window assembly of claim 14, wherein the first busbar and the second busbar extend horizontally at least partially across the fixed window panel.

18. The vehicular rear slider window assembly of claim 17, wherein the plurality of electrically conductive traces of the first heater grid extend vertically at least partially across the first fixed panel, and wherein the plurality of electrically conductive traces of the second heater grid extend vertically at least partially across the second fixed panel.

19. The vehicular rear slider window assembly of claim 18, wherein the first busbar electrically connects at a second end of the plurality of electrically conductive traces of the second heater grid that is opposite the first end of the electrically conductive traces of the second heater grid that electrically connect at the second busbar.

20. The vehicular rear slider window assembly of claim 19, wherein the second busbar electrically connects at a second end of the plurality of electrically conductive traces of the first heater grid that is opposite the first end of the electrically conductive traces of the first heater grid that electrically connect at the first busbar.

21. The vehicular rear slider window assembly of claim 20, wherein one of the first busbar or the second busbar extends across the upper portion of the fixed window panel above the opening and another of the first busbar or the second busbar extends across the lower portion of the fixed window panel below the opening.

22. The vehicular rear slider window assembly of claim 14, wherein the vehicular rear slider window assembly comprises no more than the positive terminal at the first busbar and the negative terminal at the second busbar for electrically powering the first heater grid, the second heater grid and the third heater grid when the vehicular rear slider window assembly is mounted at the vehicle.

23. The vehicular rear slider window assembly of claim 22, wherein the positive terminal is at the first fixed panel, and wherein the negative terminal is at the first fixed panel.

* * * * *

UNITED STATES PATENT AND TRADEMARK OFFICE
CERTIFICATE OF CORRECTION

PATENT NO. : 11,425,798 B2  
APPLICATION NO. : 16/949814  
DATED : August 23, 2022  
INVENTOR(S) : Darin J. Snider et al.

Page 1 of 1

It is certified that error appears in the above-identified patent and that said Letters Patent is hereby corrected as shown below:

In the Claims

<u>Column 41</u>  
Line 44, Claim 1, "disposed at the a surface" should be --disposed at a surface--

Signed and Sealed this  
Thirteenth Day of September, 2022

Katherine Kelly Vidal  
*Director of the United States Patent and Trademark Office*